(12) United States Patent
Voss

(10) Patent No.: US 6,337,127 B1
(45) Date of Patent: Jan. 8, 2002

(54) PLASTIC SECTION FOR SEALING AIR GAPS BETWEEN PARTS OF THE BODY OF A MOTOR VEHICLE

(75) Inventor: Klaus-Wilhelm Voss, Uetersen (DE)

(73) Assignee: Vosschemie GmbH, Uetersen (DE)

( * ) Notice: Subject to any disclaimer, the term of this patent is extended or adjusted under 35 U.S.C. 154(b) by 0 days.

(21) Appl. No.: 09/269,965

(22) PCT Filed: Jul. 24, 1997

(86) PCT No.: PCT/EP97/04021

§ 371 Date: Apr. 8, 1999

§ 102(e) Date: Apr. 8, 1999

(87) PCT Pub. No.: WO98/16631

PCT Pub. Date: Apr. 23, 1998

(30) Foreign Application Priority Data

| Oct. 11, 1996 | (DE) | 296 17 703 U |
| Dec. 31, 1996 | (DE) | 296 22 573 U |
| Dec. 31, 1996 | (DE) | 296 22 574 U |
| Jan. 11, 1997 | (DE) | 297 00 403 U |
| Jan. 27, 1997 | (DE) | 297 01 262 U |
| Feb. 11, 1997 | (DE) | 297 02 317 U |
| Mar. 4, 1997 | (DE) | 297 03 878 U |
| Mar. 20, 1997 | (DE) | 297 05 114 U |

(51) Int. Cl.$^7$ .................................. B32B 7/12
(52) U.S. Cl. ............... 428/317.1; 428/317.5; 156/247
(58) Field of Search ............. 156/247; 428/317.1, 428/317.5

(56) References Cited

U.S. PATENT DOCUMENTS

| 4,973,371 A | 11/1990 | Parker ................... 156/79 |
| 5,128,176 A | 7/1992 | Schmidt ................ 427/140 |
| 5,885,395 A | * 3/1999 | Western ................ 156/247 |

FOREIGN PATENT DOCUMENTS

| DE | 4106960 | 9/1992 |
| EP | 0083443 | 7/1983 |
| WO | 8807415 | 10/1988 |
| WO | 9012653 | 11/1990 |
| WO | 9420584 | 9/1994 |
| WO | 9521700 | 8/1995 |
| WO | 95/21700 | * 8/1995 |
| WO | 9626789 | 9/1996 |

OTHER PUBLICATIONS

Patent Abstracts of Japan, vol. 10, No. 310, (C–379), Oct. 22, 1986 JP 61 120665 A (Toyota), Jun. 7, 1986.

* cited by examiner

*Primary Examiner*—Yogendra N. Gupta
*Assistant Examiner*—Charles Boyer
(74) *Attorney, Agent, or Firm*—Friedrich Kueffner

(57) ABSTRACT

For sealing the gap, especially the air gap between two body parts (14, 15) of motor vehicles, a plastic profile in the form of a foam strip (10') with a fixing means (100) is proposed which has at least two legs (16, 18) which are hinged together, whereby a first leg (16) is joined to the foam strip (10') by means of a first adhesive layer and a second leg (18) is provided with a second adhesive layer for joining to a gap inner side (20).

6 Claims, 45 Drawing Sheets

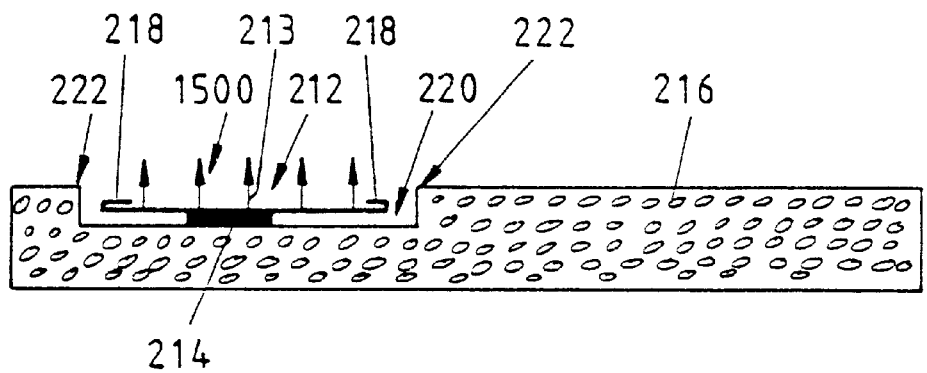
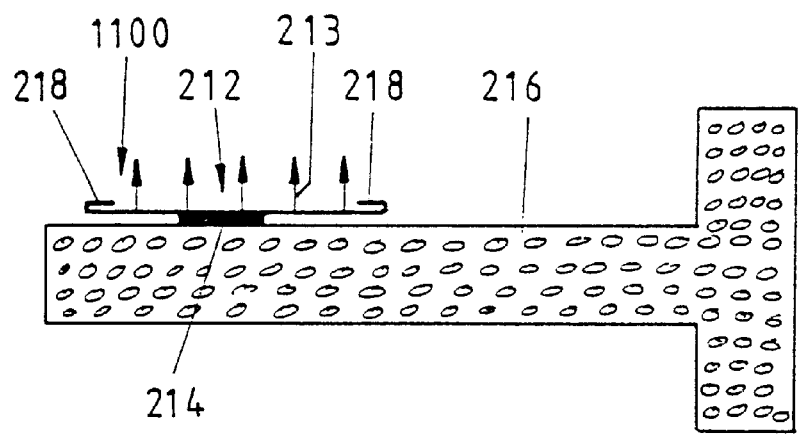
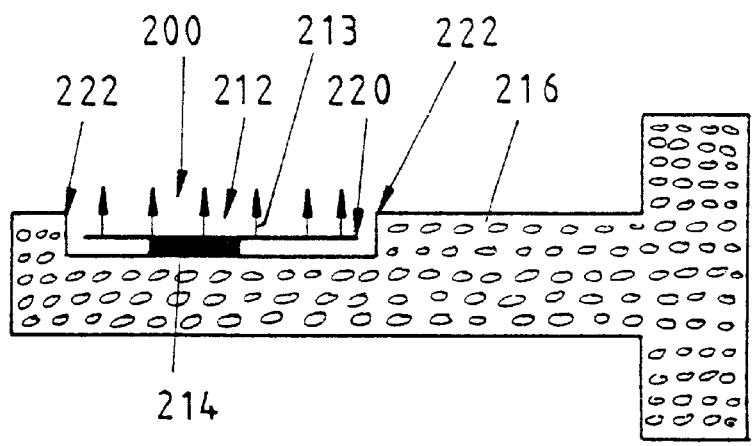

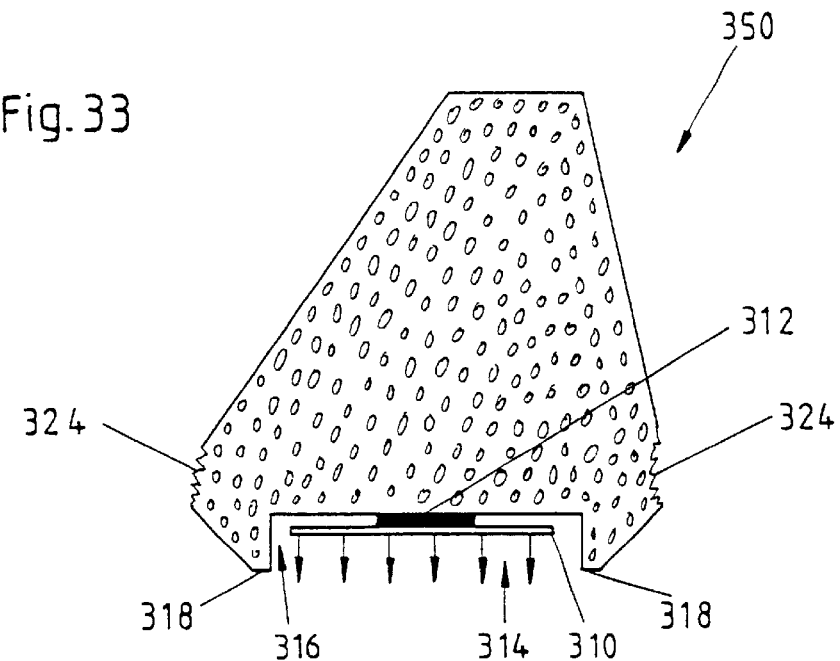
Fig. 33
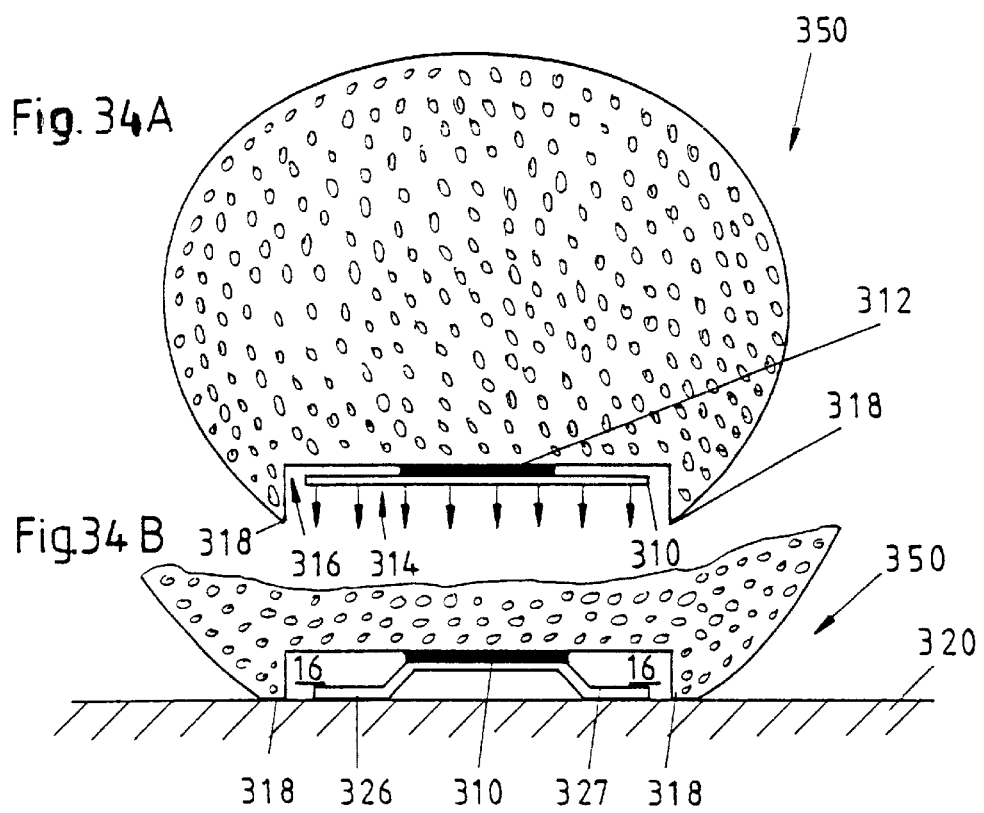
Fig. 34A
Fig. 34B

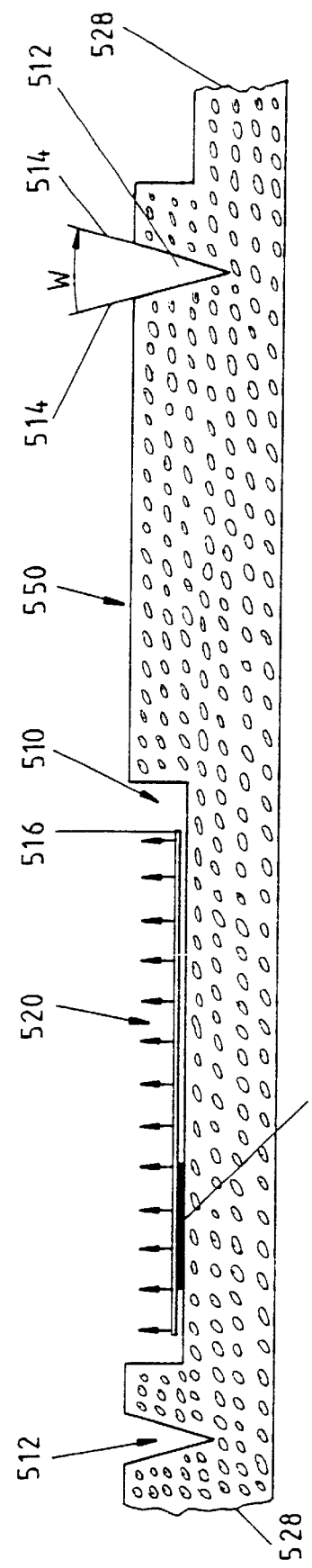
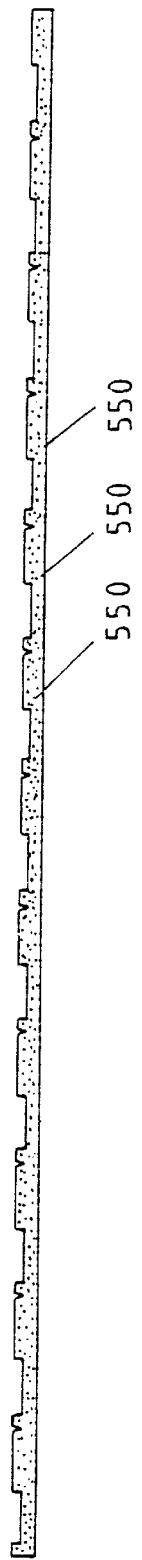
Fig. 37
Fig. 38

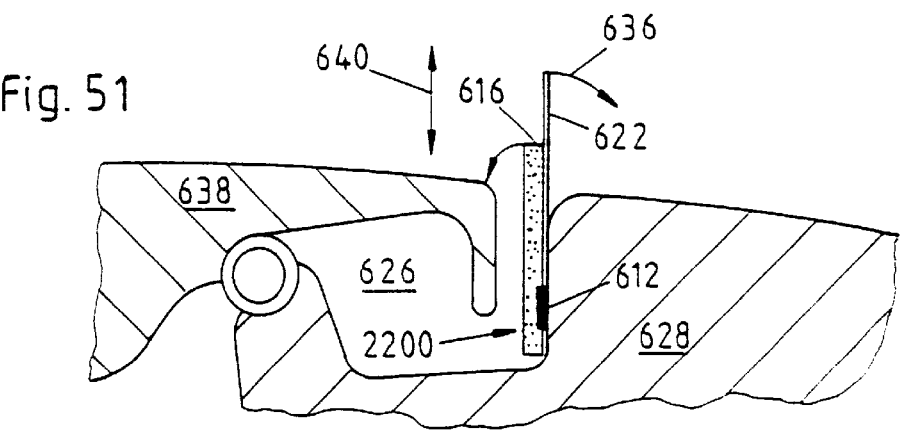
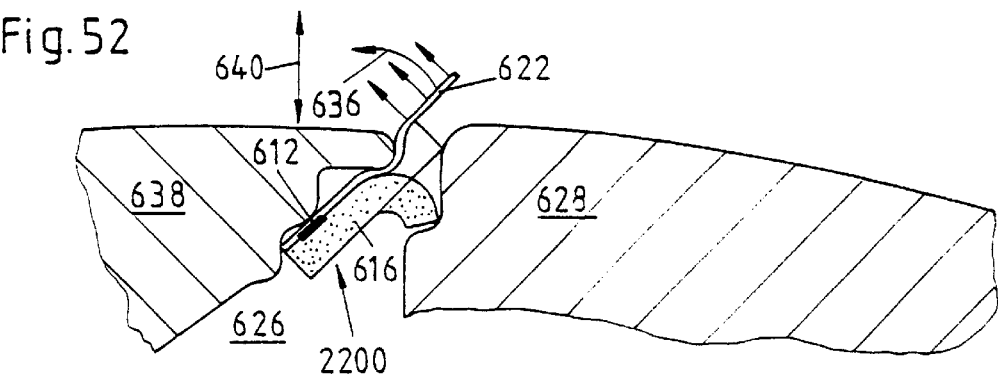
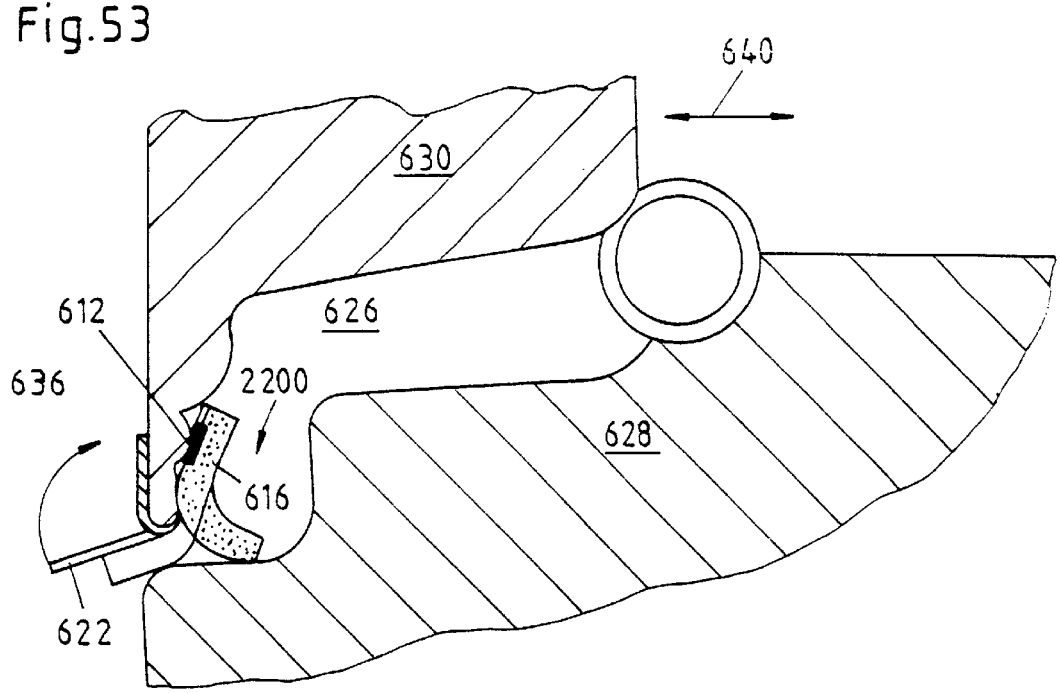

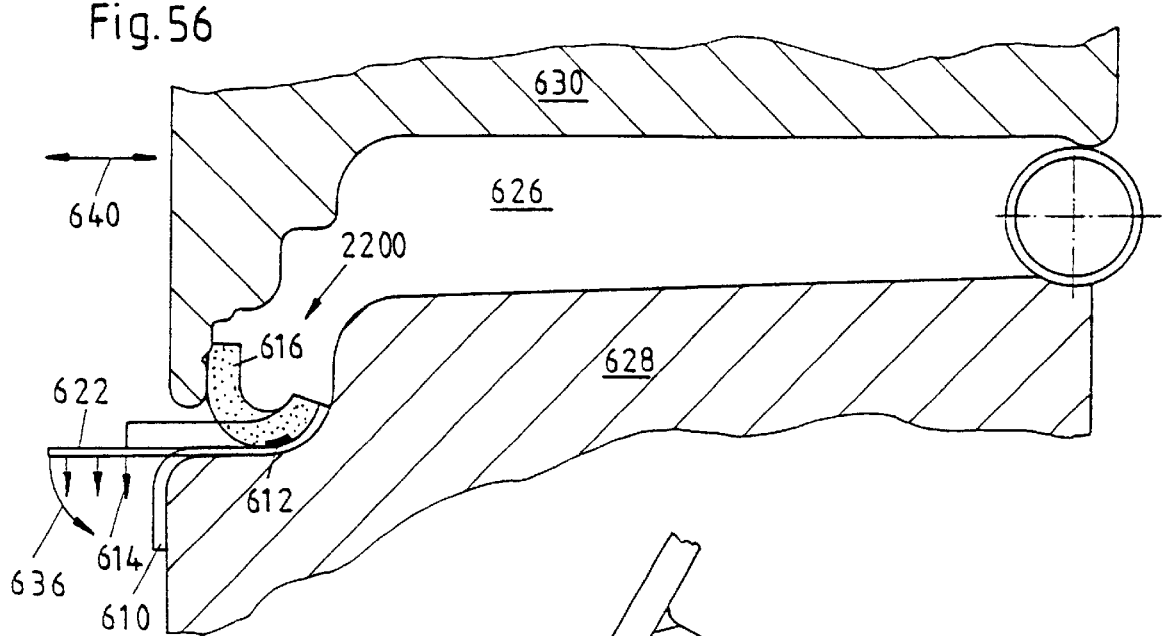
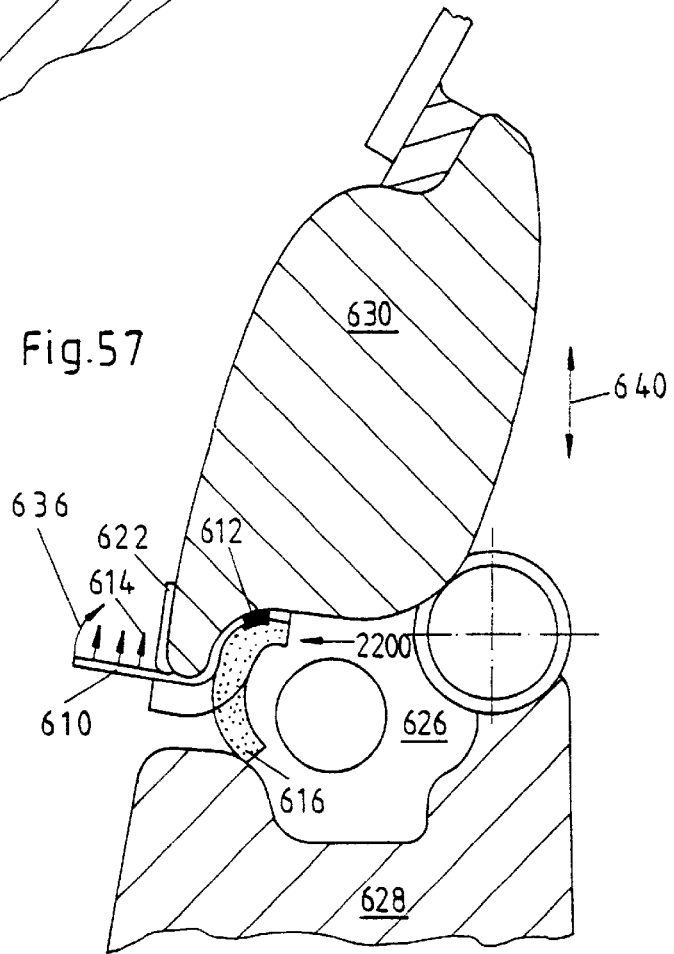

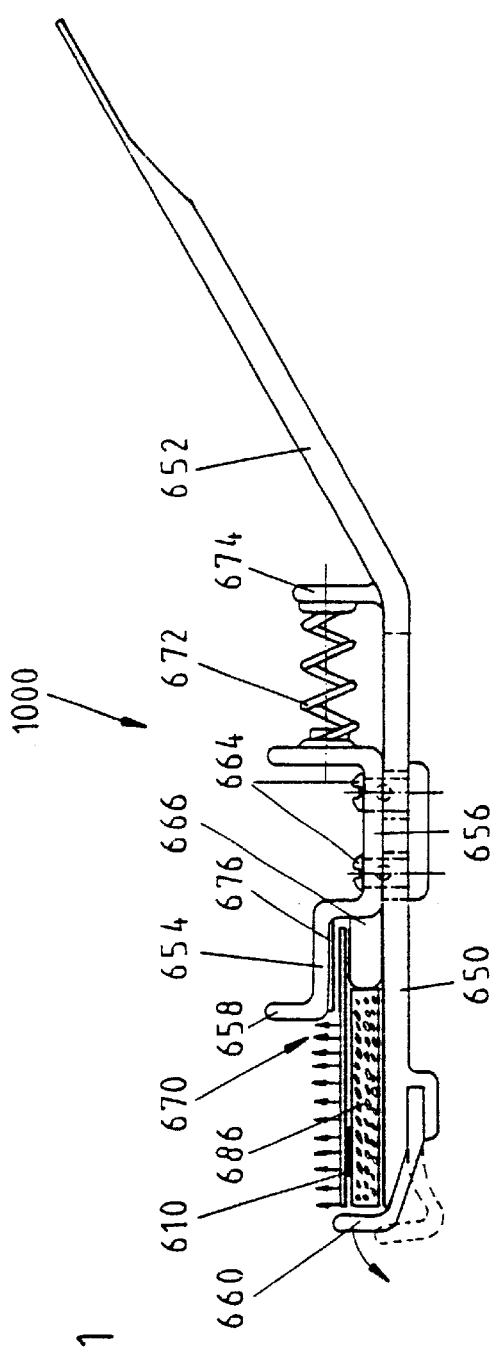
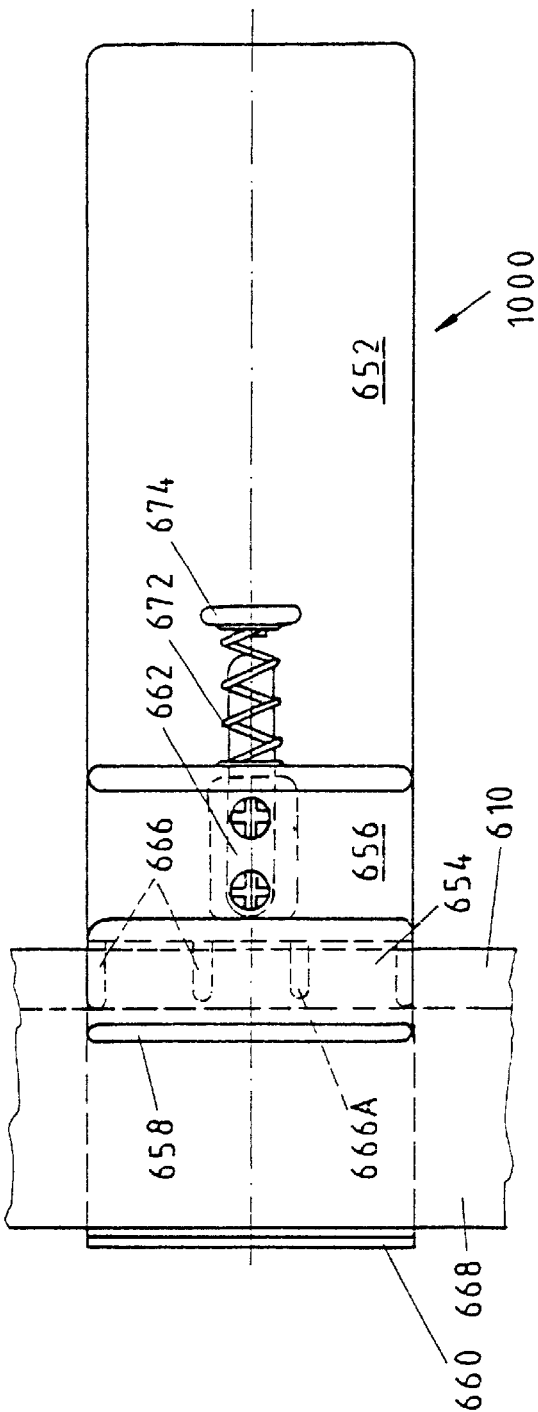
Fig.81
Fig.82

PLASTIC SECTION FOR SEALING AIR GAPS BETWEEN PARTS OF THE BODY OF A MOTOR VEHICLE

BACKGROUND OF THE INVENTION

1. Field of the Invention

The invention relates to a plastic profile in the form of a foam strip for sealing a gap, especially for sealing the air gap between body parts of motor vehicles, whereby the surface of the foam strip is partially provided with an adhesive layer, as well as to an applicator to bring in a foam profile, especially a rectangular, a L-shaped or a T-shaped foam profile which is provided with an adhesive layer at least on one side, into a gap to be sealed or into a joint to be sealed, especially into a gap or a joint between a fixed body part and a movable body part of a vehicle.

2. Description of the Related Art

Numerous embodiments of foam strips are known for being used as sealing and/or masking strips, for example for the partial enamelling of motor vehicles or the like. In this respect, not only the penetration of colour mist into a gap of car body parts should be avoided. On the contrary, it should also be avoided that soil particles are ejected out from the joints by air whirling when colour mist has been oversprayed. Such soil particles can precipitate on the fresh distributed enamel and lead to a defective enamel spot.

So, for example, foam strips with a rectangular section are known, whereby one side of the foam strip is provided with an adhesive layer to fix the strip at the desired place of the object to be sealed. Such strips are also used for the sealing of windows and doors.

Other section profiles are also disclosed by the state of the art, such as circular or approximately circular foam strips which also have an adhesive layer for fixing. These strips can also be configured as hollow parts so as to obtain a better compressibility.

Nevertheless, a drawback of the known foam strips for sealing and masking is to be found in the fact that the application possibilities of a specific foam strip are limited to a certain problem task, since the foam strip can only be used for a defined joint width or the like because of the dimensioning and the plastic moulding of the specific foam strip.

Furthermore, the fixing or the inserting of the strips into a gap to be sealed is difficult and complicated, since the foam strip has to be much bigger than the gap to be sealed for a firm support of the foam strip. However, this oversize must first be pressed through the gap which is much narrower. Because of its big dimensions to ensure a sufficient sealing, the foam strip is exposed, in its final position, to high bending loads which have an effect on an adhesive joint between the foam strip and a car body wall. In unfavourable cases, it comes to a peeling off of the adhesive joint so that, already after a short time, the foam strip works loose from the car body part and does not guarantee an effective sealing of the gap any longer. When preparing a car body for example for a repair enamelling, it is generally necessary to mask certain parts or sections so that they do not come into contact with a spray enamel during the later enamelling operation. Adhesive strips, plastic strips and/or foam strips are adequate means for this purpose.

When positioning such strips or combinations of foam strips with paper adhesive strips, the sticking work often has to be performed under very confined conditions in which the hollow spaces are so narrow that a perfect sticking can only be obtained with a correspondingly designed applicator. Especially at places of difficult access, there are special difficulties, because of this lack of space, since it comes again and again to unintended contacts between the foam strip or between the foam strip lined with adhesive paper and surfaces of the spots to be sealed, for example of a car body.

When fitting plastic profiles for gap sealing which are joined with glue or with a paper adhesive strip to a surface of a gap inner side, it has thus proved to be a problem that these plastic profiles are difficult to handle with, since, when positioning the sealing profile in a gap to be sealed, the adhesive layer comes into contact prematurely, i.e. before the sealing profile is in the desired final position, with a surface and adheres thereto. This makes difficult or, in the unfavourable cases, prevents an exact positioning of the plastic profile in a gap to be sealed.

SUMMARY OF THE INVENTION

Therefore, the aim of the invention is to create an efficiently adhering plastic profile, preferably in form of a foam strip, which can, however, easily be detached from a car body part, as well as to make available an applicator for inserting the foam strip, whereby a safe and durable support of the foam profile in a gap to be sealed is guaranteed, even if the foam strip is exposed to high bending loads, and simultaneously a simple mounting of the strip is possible. Moreover, the plastic profile should be easy to handle with and should be applicable without a great deal of time, even by unskilled staff, to seal the gap between two components, especially between two body parts of vehicles.

For this purpose, according to the invention, the fixing means has at least two legs which are hinged together, whereby a first leg is connected to the foam strip by means of a first adhesive layer and a second leg is provided with a second adhesive layer for the connection with a gap inner side.

This has the advantage that the adhesive surface on the gap inner side can be configured with any variable size and that it is not exposed to any bending load. This prevents a shearing off, and the adhesive joint has a high durableness or is stable at least for the duration of the application. Because the first and the second adhesive layer are placed on one side of the fixing means, a hinge-type arrangement of the fixing means is possible which spans even narrow bending radii of the foam strip and so diverts lateral power from the adhesive joint with the gap inner side.

A connection which is particularly strong and reliable can be obtained between the foam strip and the fixing means by placing an additional nondetachable adhesive joint between the fixing means and the foam strip. This adhesive joint is preferably stronger than the inherent strength of the foam strip and of the fixing means.

Preferably, the fixing means is folded up before the foam strip is placed. The fact that sides of the legs of the fixing means which are opposite to the first and second adhesive layer are respectively provided with a third and a fourth adhesive layer efficiently prevents the fixing means from unfolding, before the foam strip is placed.

The third and fourth adhesive layer are preferably redetachable or at least redetachable in an easier way than the first and second adhesive layer. This guarantees the unfolding of the fixing means, after the foam strip has been inserted into a gap to be sealed.

Moreover, according to the invention, the fixing means has a first layer and a second layer, whereby the second layer has a redetachable adhesive coating for fixing to a gap inner side and the first layer is a nondetachable adhesive joint between the second layer and the foam strip.

This has the advantage that the adhesive surface on a gap inner side can be configured with any variable size and is not exposed to any bending load. This prevents a shearing off, and the adhesive joint has a high durableness or is stable at least for the duration of the application.

A particularly durable and reliable joint between the foam strip and the fixing means is obtained by the fact that the nondetachable adhesive joint is stronger than the inherent strength of the foam strip and of the second layer. The second layer is preferably a paper strip or a plastic strip and advantageously contains a textile ply.

For a foam strip of the above stated art, it is provided for that the adhesive layer as a fixing means is configured according to at least one of the assigned claims.

For an applicator of the above stated art, it is provided for that the applicator has a handle part and a receptacle part for the foam profile, whereby the receptacle part has, at one end opposite to the handle part, an elastic element to hold the foam profile. This helps advantageously for the introduction and the fixing of the foam strip in a gap to be sealed, since the elastic element allows for a firm pressing of the foam strip onto a gap inner wall.

Since the elastic element is L-shaped and at least partially encloses an end of a foam profile which is contained in the receptacle part, the elastic element has, in addition to this, a retaining function for the foam strip and thus efficiently prevents from a premature dropping of the foam strip out of the applicator.

Furthermore, an applicator according to the invention is configured such that the receptacle part has a guiding rail which encloses the foam profile at one end opposite to the adhesive layer, whereby the rail has a longitudinal slot out of which projects an end which carries the adhesive layer, whereby a first stopper is also configured along the longitudinal slot, stopper which supports the part of the foam profile which is projecting out of the longitudinal slot on a side opposite to the adhesive layer. This advantageously results in a device with which a foam profile can easily and quickly be brought into a joint or a gap.

A maximal functionality of the elastic element is obtained by the fact that the elastic element is placed at the end of the stopper which is opposite to the handle part and that it preferably rises above the stopper.

With a second stopper which is placed at an end of the handle part which is turned toward the guiding rail, we obtain an easy handling in a particularly advantageous way, since the insertion depth of the foam profile is determined by the stopper and has not to be manually adjusted.

A second adjustable stopper advantageously allows an adaptation of the applicator to different gap and joint types.

A handle which is bent off relative to the first stopper advantageously improves the handling of the applicator. Since an antiadhesive layer is placed at one end of the handle which is opposite to the guiding rail, the handle can also be used for the complete insertion of the foam profile into the gap. This reduces the number of required tools for the fixing of the foam profile.

Sliding paddings on the first and/or on the second stopper prevent a scratching of the adjacent car body parts.

To this end, according to the invention, a fixing means is provided for on the plastic profile, fixing means on which or adjacent to which at least a prominence is so placed that it projects over an adhering surface of the fixing means and avoids an unintended contact of the adhering surface with a surface.

This has the advantage that the positioning and handling of a plastic profile equipped with this fixing means is considerably improved, since the fixing means does not adhere to surfaces in an unintended manner, until the desired position of the plastic profile in a gap to be sealed is reached. Thereby a lateral displacement of the plastic profile along a surface is possible without premature adhering of the fixing means.

The premature adhering of the fixing means to a surface is still avoided by the fact that at least two prominences are placed adjacent to the fixing means.

A selective adhering of the fixing means at a desired position without the risk of premature adhering is obtained by the fact that the prominence which at least exists is configured in such a way that, for the bonding of the fixing means with a surface, a predetermined power onto the fixing means is necessary to overcome the resistance of the prominence.

Advantageously, the prominence which at least exists is flexibly deformable and especially compressible.

To obtain a simple construction, the prominence which at least exists is configured as a single piece with the plastic profile or a single piece with the fixing means. However, combinations of both advantageous embodiments are possible.

The adhering surface of the fixing means is advantageously an adhesive surface, the plastic profile a foam profile and/or the fixing means a paper adhesive strip with a first adhesive layer and a second adhesive layer, whereby the second adhesive layer for fixing to a gap inner side is a redetachable adhesive coating on the paper adhesive strip and the first adhesive layer is a nondetachable adhesive joint between the paper adhesive strip and the plastic profile, whereby particularly preferably the prominence which exists at least is configured as at least one bent end of the paper adhesive strip.

In a particularly advantageous way, the prominence which exists at least is a padding coating on the fixing means.

A simple assembly with low manufacturing costs can be obtained by configuring the prominence adjacent to the fixing means as an edge of a sunk joint of the plastic profile for receiving the fixing means.

Hereby, it is particularly preferred that the edge is configured circulating around the fixing means and/or as a lateral prominence adjacent to at least two ends of the fixing means.

For the plastic profile of the above stated art, according to the invention, the adhesive agent is designed as described above.

Advantageously, the plastic profile is a foam strip and has a sunk joint, preferably on at least one side.

The adhesive agent is advantageously placed in the joint which exists at least.

Advantageously, the plastic profile has a T-profile, a circular profile, a trapezoidal profile, a triangular profile, a polygonal profile, a hexagonal profile, a Y-profile or a rectangular profile.

For this purpose, according to the invention, at least one sunk joint is configured to receive the adhesive agent on the plastic profile, the surface of which is at least partially provided with an adhesive agent.

This has the advantage that the positioning and handling of a plastic profile equipped with this fixing means is considerably improved, since the fixing means does not adhere to surfaces in an unintended manner, until the desired position of the plastic profile in a gap to be sealed is reached. Thereby a lateral displacement of the plastic profile along a surface is possible without premature adhering of the fixing means.

Advantageously, a paper strip is placed as an adhesive element in the sunk joint with a first adhesive layer and a second adhesive layer, whereby the second adhesive layer for fixing to a gap inner side is a redetachable adhesive coating on the paper strip and the first adhesive layer is a nondetachable adhesive joint between the paper strip and the plastic profile. This results in a simple and efficient construction.

For a simple assembly and a simple manufacturing of a plastic profile according to the invention, an adhesive layer is placed as an adhesive element in the sunk joint directly on the surface of the plastic profile.

The adhesive layer ist advantageously a hot-melt glue.

To obtain a redetachable adhering between the plastic profile and a surface in a gap to be sealed, the adhesive layer further has, on its side opposite to the plastic profile, a glue layer of a redetachable glue.

The plastic profile is advantageously a foam strip.

Advantageously, the plastic profile has a T-profile, a circular profile, a trapezoidal profile, a triangular profile, a polygonal profile, a hexagonal profile, a Y-profile or a rectangular profile.

To obtain a simple producibility of the plastic profile according to the invention, the sunk joint is designed as a recess in the plastic profile over a whole width of the plastic profile.

To obtain a supplementary sealing of the adhesive element against the surroundings through a continuous border area, the sunk joint is designed as a slot with a predetermined width in the plastic profile.

The fact that at least one sunk joint is configured on the plastic profile has the advantage that such a plastic profile can be better processed when using the gap sealing.

Thus, the joint preferably has, for example, the form of a right parallelepiped, and especially its length is 10 mm to 20 mm, especially 15 mm.

In a further advantageous embodiment, the joint is cuneiform, whereby side walls of the cuneiform joint preferably enclose an angle of approximately 15 to 45 degrees, especially an angle of 30 degrees.

Preferably, the joint width is approximately 1 mm to 4 mm, preferably 1,5 mm or 2,5 mm.

An even better processing when using the plastic profile according to the invention is obtained by the fact that at least two joints with a different section are configured.

Preferably, the plastic profile has a rectangular profile with two cuneiform joints and a right parallelepiped shaped joint on a long side of the rectangular profile.

In a particularly preferred way, the right parallelepiped shaped joint is placed at a distance of approximately 0,5 to 3 mm, especially of 1,2 mm, from a cuneiform joint.

The plastic profile is preferably a foam profile.

An additional support through a corresponding adhesive force is obtained by the fact that a paper adhesive strip is placed as an adhesive element in the sunk joint, whereby the paper adhesive strip has a first adhesive layer and a second adhesive layer, whereby the second adhesive layer for fixating on a gap inner side is a redetachable adhesive coating on the paper adhesive strip and the first adhesive layer is a nondetachable adhesive joint between the paper adhesive strip and the plastic profile.

Alternatively, an adhesive layer is placed as an adhesive agent in the sunk joint directly on the surface of the plastic profile. Preferably, the adhesive layer has a hotmelt glue.

To obtain a detachable joint between the plastic profile and a surface in a gap to be sealed, the adhesive layer further has, on its side opposite to the plastic profile, a glue layer of a redetachable glue.

Advantageously, the plastic profile has a T-profile, a circular profile, a trapezoidal profile, a triangular profile, a polygonal profile, a hexagonal profile, a Y-profile or a rectangular profile.

To obtain a simple producibility of the plastic profile according to the invention, the sunk joint is configured as a recess in the plastic profile over a whole width of the plastic profile.

To obtain a supplementary sealing of the adhesive element against the surroundings through a continuous border area, the sunk joint is configured as a slot with a predetermined width in the plastic profile.

To this end, the invention provides for that the adhesive means is an adhesive strip with at least a first adhesive coating, whereby the adhesive strip is joined to the plastic profile only in a predetermined area which is smaller than the extension of the adhesive strip.

This has the advantage that such a plastic profile can be universally used and can be applied in practically any joint of any kind.

Preferably, the adhesive strip is a paper adhesive detachable strip and the plastic profile a foam strip or a joint sealing strip.

For a stable and operationally reliable construction, the joint between the adhesive strip and the plastic profile is a nondetachable adhesive joint, whereby the joint between the adhesive strip and the plastic profile is preferably performed by a glue, the strength of which is higher than the inherent strength of the material of the plastic profile.

Preferably, the joint between the adhesive strip and the plastic profile is a hot-melt adhesive joint.

A particularly effective and flexibly usable construction is obtained by the fact that the adhesive strip is a paper adhesive strip with a first adhesive layer and a second adhesive layer, whereby the second adhesive layer for fixing to a gap inner side is a redetachable adhesive coating on the paper adhesive strip and the first adhesive layer is the joint between the paper adhesive strip and the plastic profile.

For a simple transport without the risk of unintended adhering of the adhesive coating on a surface before application in a joint to be sealed, the first adhesive coating is covered by means of a detachable silicone paper.

The silicone paper advantageously has holes at predetermined intervals. These holes serve as adhesive spots for rolled up, ranged plastic profiles.

An advantageous supplementary covering of areas around the gap to be sealed is obtained by the fact that the adhesive strip projects over the dimensions of the plastic profile on at least one side.

A simple possibility of a further adhesive joint with covering means adjacent to the gap to be sealed is obtained by the fact that a second adhesive strip, which has a second adhesive coating, is placed on the adhesive strip.

Preferably, the second adhesive coating is orientated in the direction opposite to the first adhesive coating.

For a safe transport, the second adhesive coating is covered by a detachable silicone paper.

The silicone paper advantageously has holes at predetermined intervals. These holes serve as adhesive spots for rolled up, ranged plastic profiles.

Preferably, the ratio of one length of the adhesive joint between the adhesive strip and the plastic profile to one length of the adhesive strip is 1:2 to 1:20, especially 1:7, 1:8 or 1:12.

In a particularly advantageous way, the plastic profile has a trapezoidal section or has the shape of a prismoid. For special uses, a recess is preferably provided for in the plastic profile, recess in which the adhesive strip or the adhesive strips is(are) placed.

For a method of the above stated art according to the invention, following steps are provided for according to the invention
  (a) Insertion of the plastic profile into a gap to be sealed,
  (b) Realization of an adhesive joint between the first adhesive layer of the adhesive strip and the surface in the gap to be sealed
  (c) Bending off of the plastic profile into the gap into a position to be tightly sealed into a first predetermined direction and
  (d) Bending off of one end of the adhesive strip into a second predetermined direction, whereby the second predetermined direction is orientated opposite to the first predetermined direction.

A complete sealing and covering on desired spots is advantageously obtained by the following additional step:
  (e) Realization of a joint, especially of an adhesive joint, between the end of the adhesive strip which has been bent off at step (d) and additional covering means.

Especially for the carrying out of the above stated method, the invention provides for an applicator for a plastic profile for sealing a gap with a base plate for guiding the plastic profile in the gap to be sealed and a handle which is placed on a first side of the base plate, whereby a guiding rail is moreover placed on the base plate, whereby the guiding rail at least partially encompasses the plastic profile and has a stopper as a lateral guide for the plastic profile.

This applicator has the advantage that it enables a simple and quick fixing of the plastic profile.

The guiding rail is placed on the base plate movable thereto so as to be able, when moving the applicator along a gap to be sealed, to avoid any obstacles without having to set down the applicator.

The guiding rail is appropriately movable into a direction substantially perpendicuar to the longitudinal extension of the plastic strip relative to the base plate.

For a defined guiding, a recess is made in the base plate, recess through which the fixing means grip into the guiding rail so that the guiding rail is movable along the recess relative to the base plate.

A pretensioned element, which exercises a force onto the guiding rail in direction of the plastic profile, is placed on the guiding rail so as to obtain a continuous guiding for which the plastic profile is held or guided on the base plate by the guiding rail.

The pretensioned element is appropriately a spring which is preferably supported on an abutment on the handle.

The stopper of the guiding rail is appropriately designed as several spaced ribs, whereby the ribs run in the part of the guiding rail which partially encompasses the plastic profile.

The ribs are preferably orientated parallel the one to the other and an end of the ribs is respectively connected to the guiding rail and a respectively opposite end constitutes a stopping face for the plastic profile, whereby the latter ends of the ribs constitute several discrete stopping faces parallel to one side of the plastic profile.

In a further preferred embodiment, the stopper of the guiding rail is a L-shaped rail which is parallel to the guiding rail and on the guiding rail. A long leg of the L-shaped rail runs parallel to the base plate and is fixed to the guiding rail.

A gap is appropriately designed to receive a part of the plastic profile, for example a projecting adhesive strip, between the stopper and the guiding rail on one side which encompasses the plastic profile.

In a particularly preferred embodiment, the guiding rail is L-shaped, whereby a leg of the L-shaped rail is parallel to the base plate.

A further support for the fixing of the plastic profile in a gap to be sealed is obtained by the fact that an additional stopper is configured at an end of the guiding rail which is opposite to the handle part. Preferably, this additional stopper extends substantially perpendicular to the base plate, whereby it extends especially away from the guiding rail in direction of the base plate or away from the base plate.

For a troublefree uninterrupted guiding of the plastic profile in the applicator, an antiadhesive coating is at least partially configured on a surface of the guiding rail which is turned to the plastic profile.

The handle appropriately has a predetermined angle with the base plate.

A second guiding rail is placed at an end opposite to the handle for the additional guiding of the plastic profile on two sides of the base plate. This second guiding rail runs parallel to the stopper of the guiding rail. It is advantageous that the second guiding rail along the end of the base plate is tipped about a predetermined angle relative to the stopper of the guiding rail, whereby the second guiding rail is tipped towards the plastic profile or away from this plastic profile.

Further advantageous embodiments are indicated in the subclaims.

Short description of the drawings

The invention will be explained in detail below with reference to embodiments shown in the drawings.

FIGS. 14 to 17 respectively show sectional views of different embodiments of plastic profiles with fixing means.

FIGS. 18 to 29 respectively show sectional views of fixing means on different plastic profiles.

Figure 30:
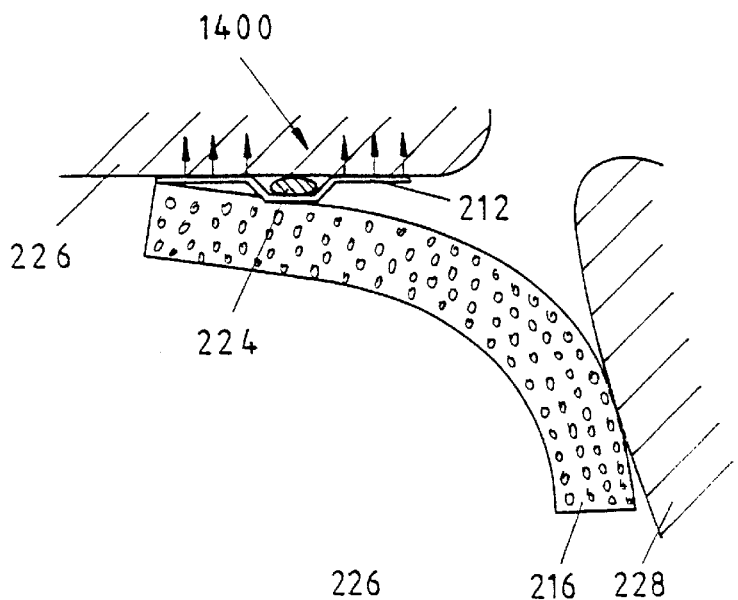
Figure 31:
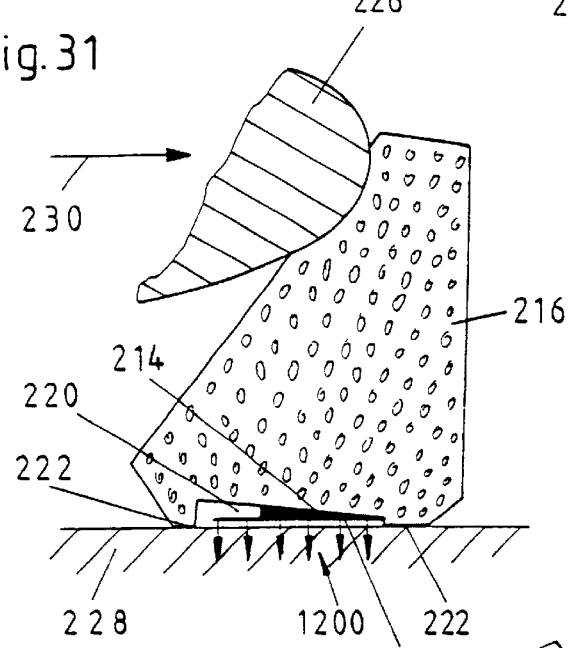
Figure 32:
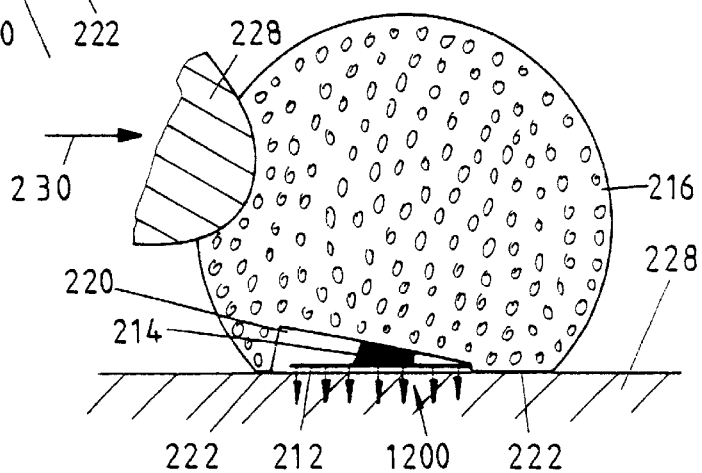

FIGS. 30 to 32 show sectional views of plastic profiles with fixing means after their positioning in a gap to be sealed.

FIGS. 33 shows a sectional view of a preferred embodiment of a plastic profile with a fixing means.

FIG. 34A shows a sectional view of a preferred embodiment of a plastic profile of FIG. 30 with another embodiment of the profile section.

Figure 14:
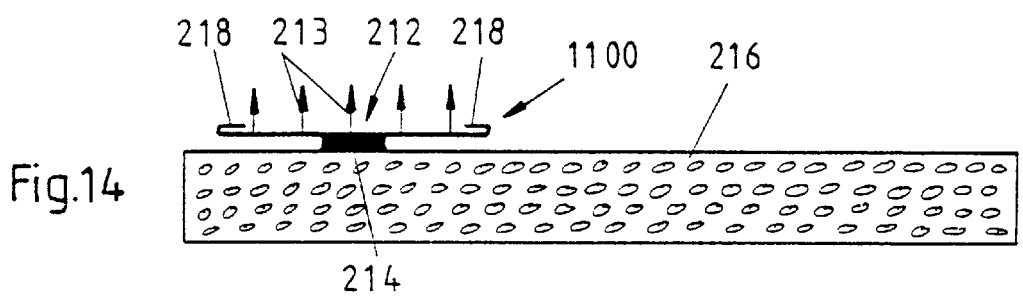

FIG. 34B shows a partial sectional view of the preferred embodiment of a plastic profile according to FIG. 14 when sticked on.

Figure 35:
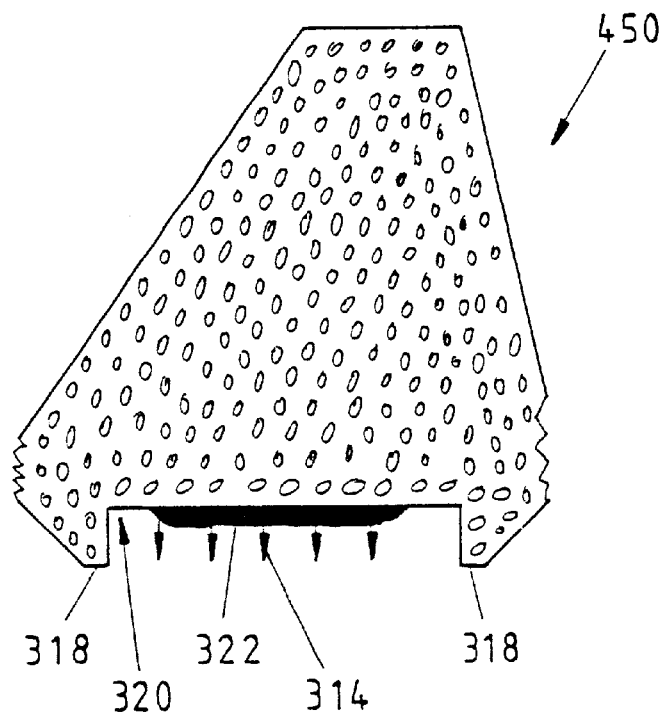

FIG. 35 shows a sectional view of a further preferred embodiment of a plastic profile.

Figure 36A:
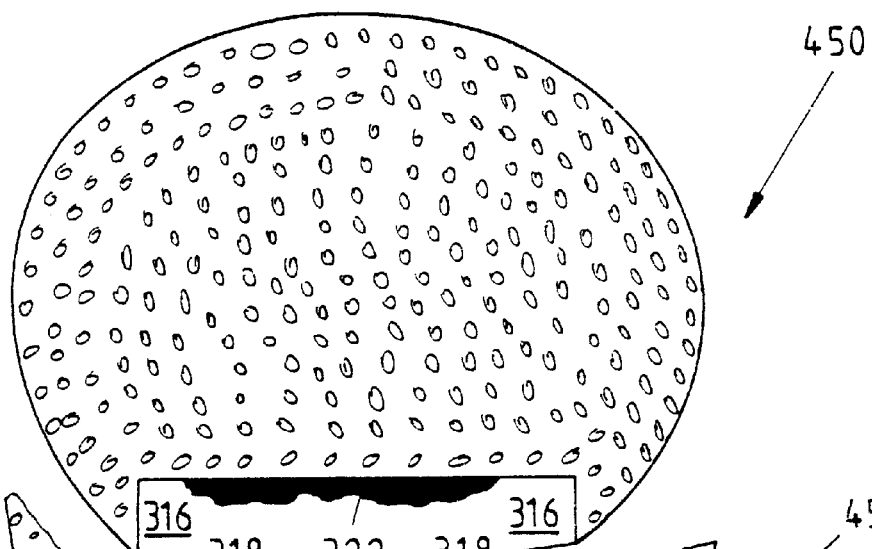

FIG. 36A shows a sectional view of the embodiment of the plastic profile according to FIG. 35 with another embodiment of the profile section.

Figure 36B:
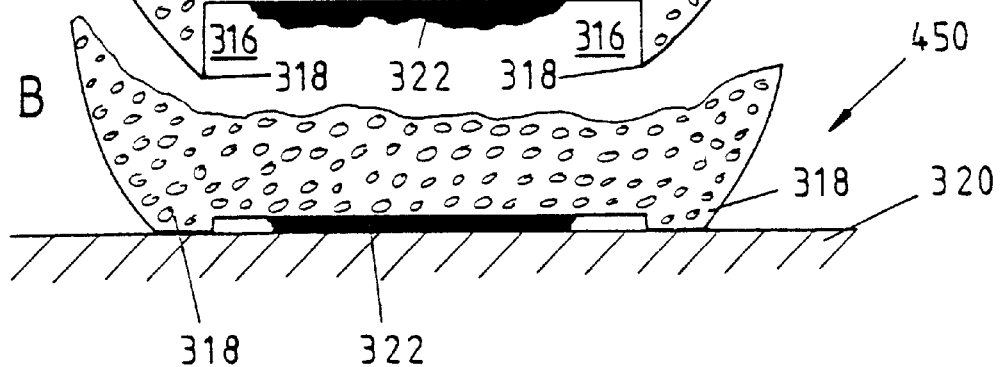

FIG. 36B shows a sectional view of the embodiment of the plastic profile according to FIG. 36A when sticked on.

FIG. 37 shows a sectional view of a further embodiment of a plastic profile with a cuneiform recess.

FIG. 38 shows a sectional view of an arrangement of several plastic profiles with lateral tearoff edges.

Figure 39:
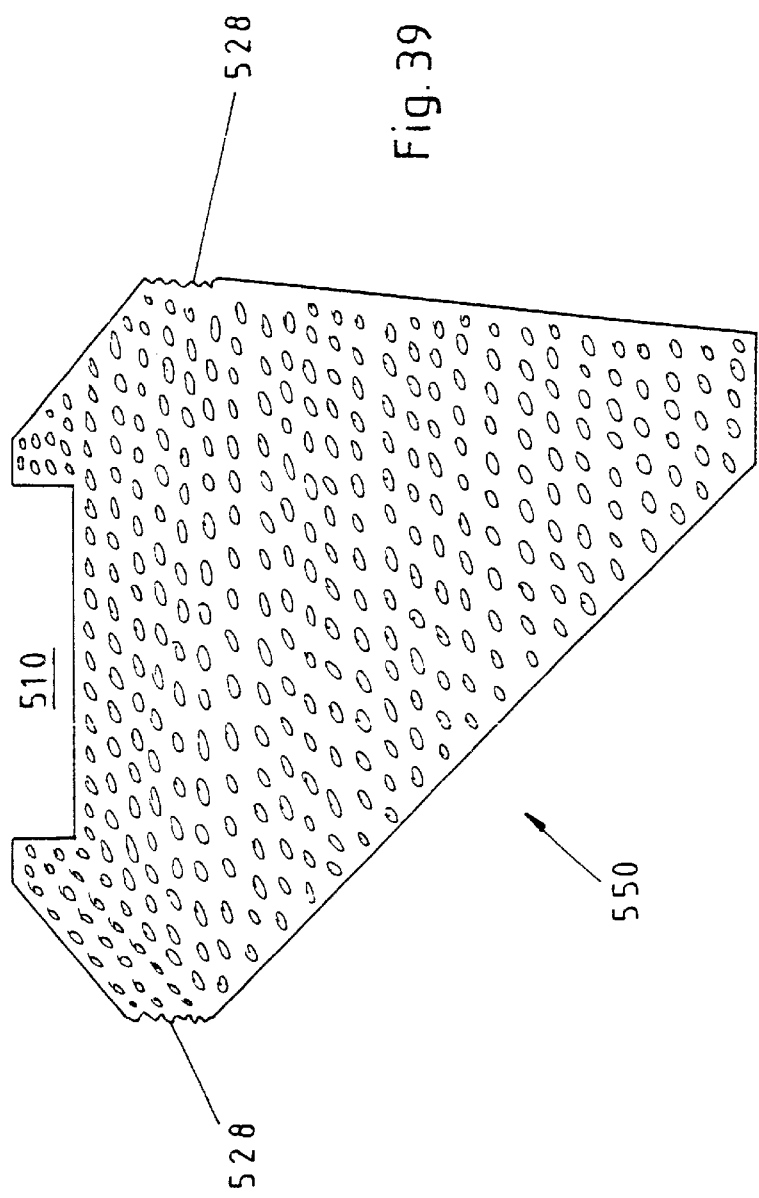
Figure 40:
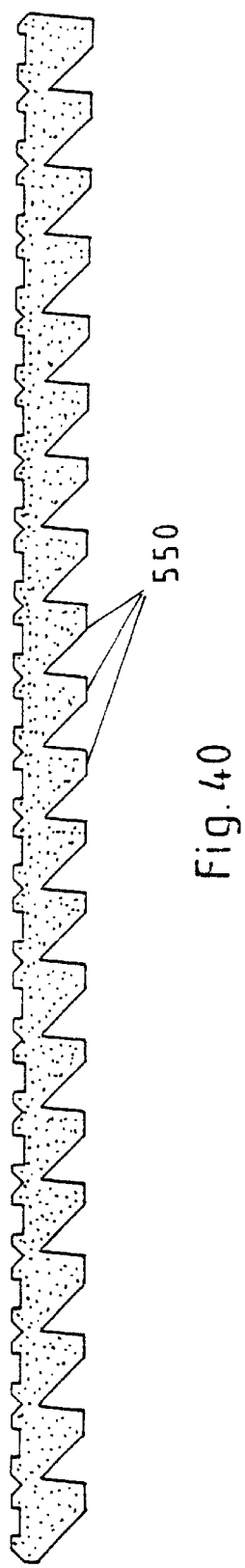

FIG. 40 shows a sectional view of an arrangement of plastic profiles according to the second embodiment according to FIG. 39.

Figure 41:
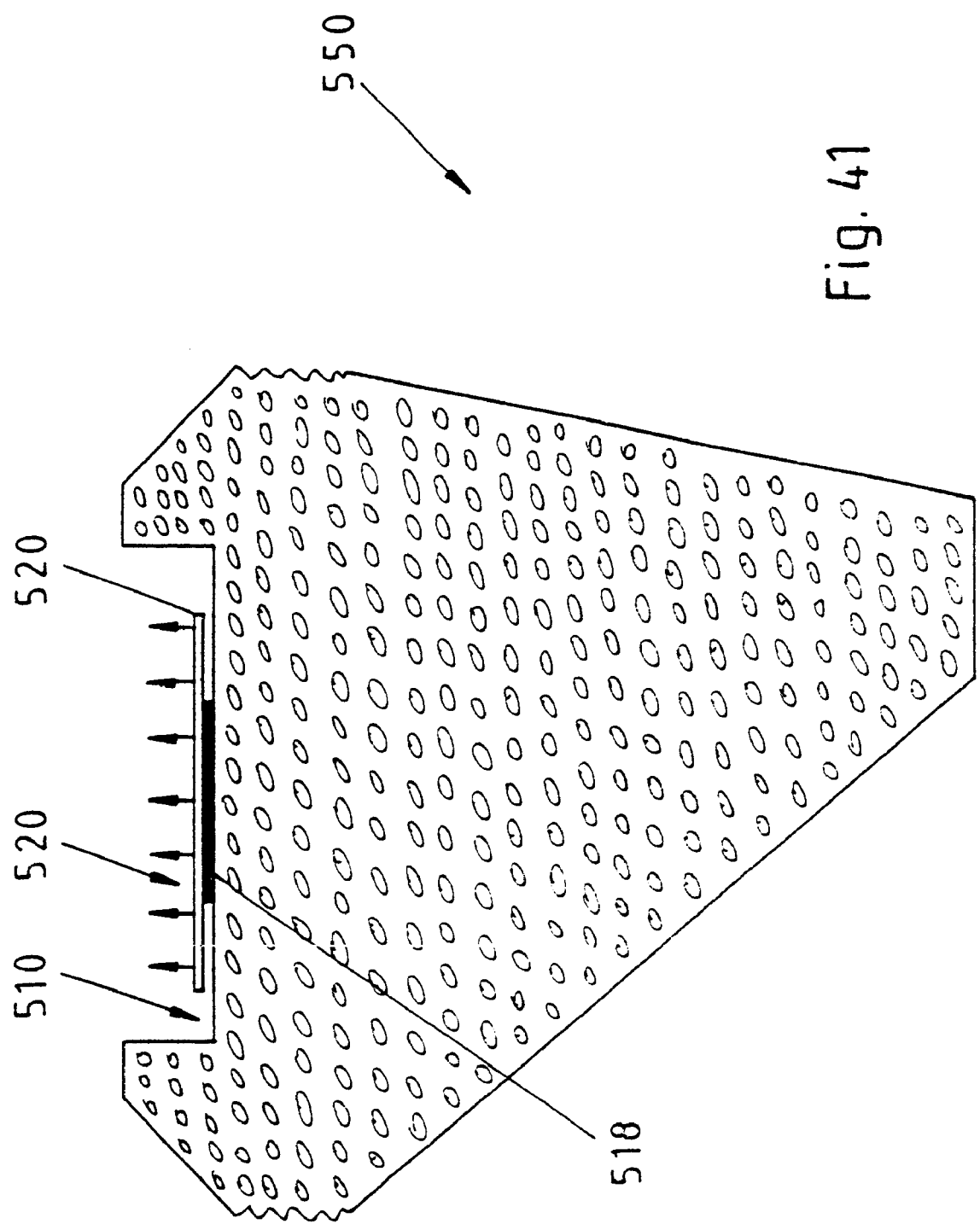

FIG. 41 shows a sectional view of the embodiment according to FIG. 39 with a paper adhesive strip.

Figure 42:
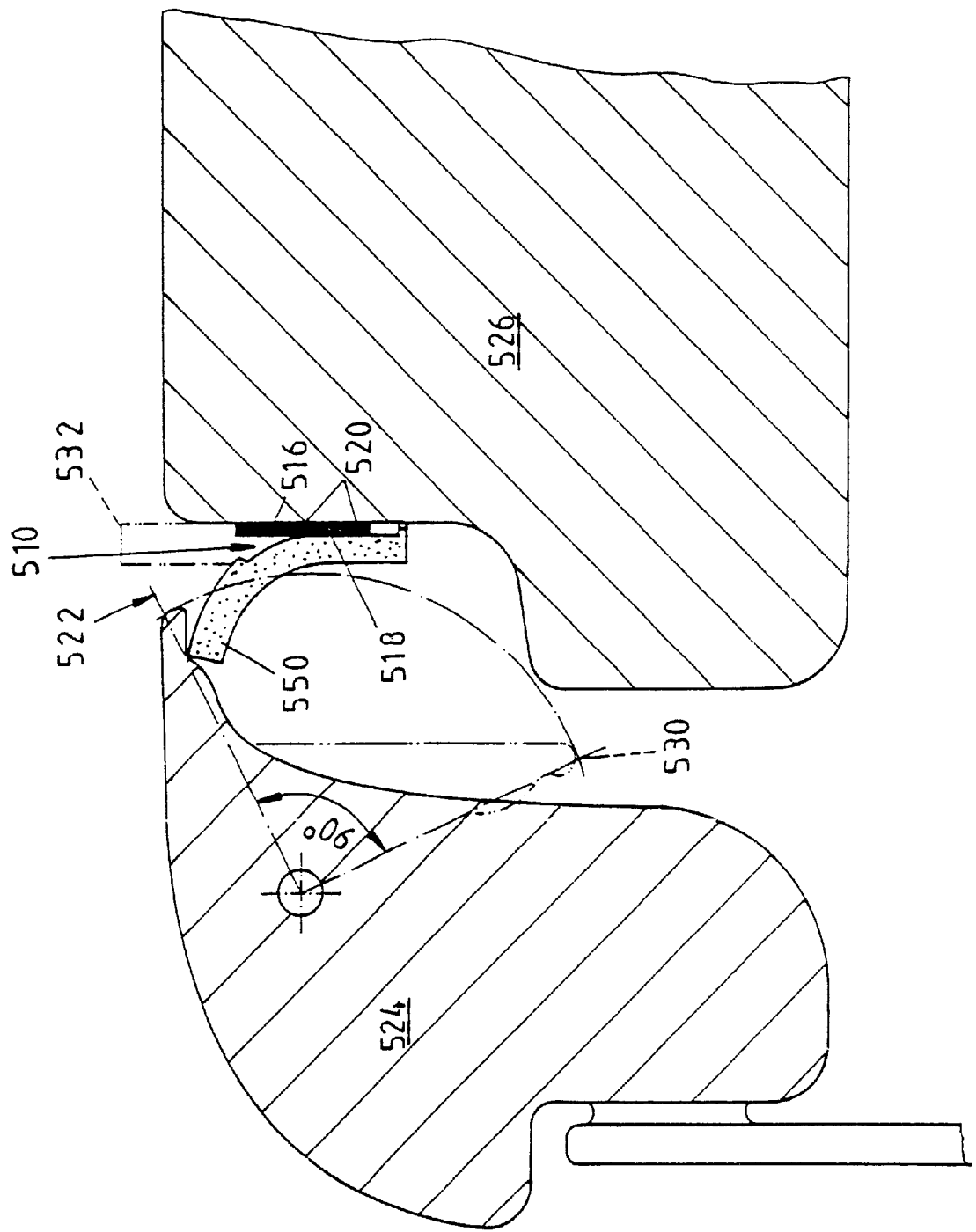

FIG. 42 shows a schematic representation of the use of a plastic profile according to the embodiment according to FIG. 37.

Figure 43:
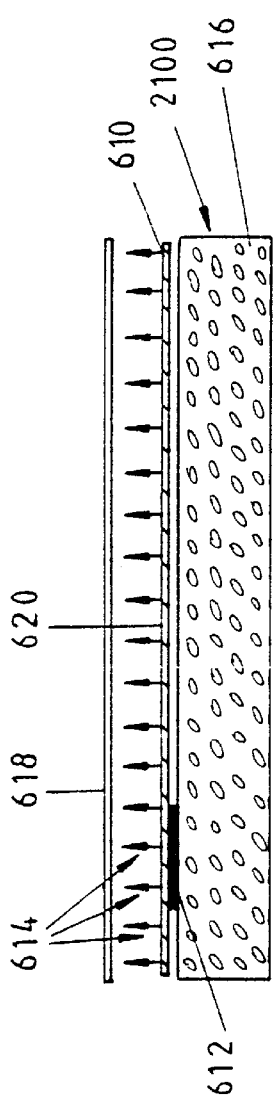

FIG. 43 shows a sectional view of a further embodiment of a plastic profile.

Figure 44:
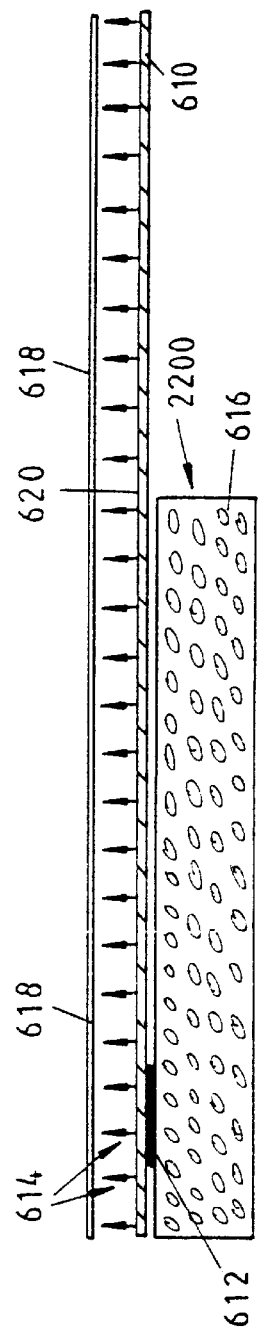

FIG. 44 shows a sectional view of a further embodiment of a plastic profile.

Figure 45:
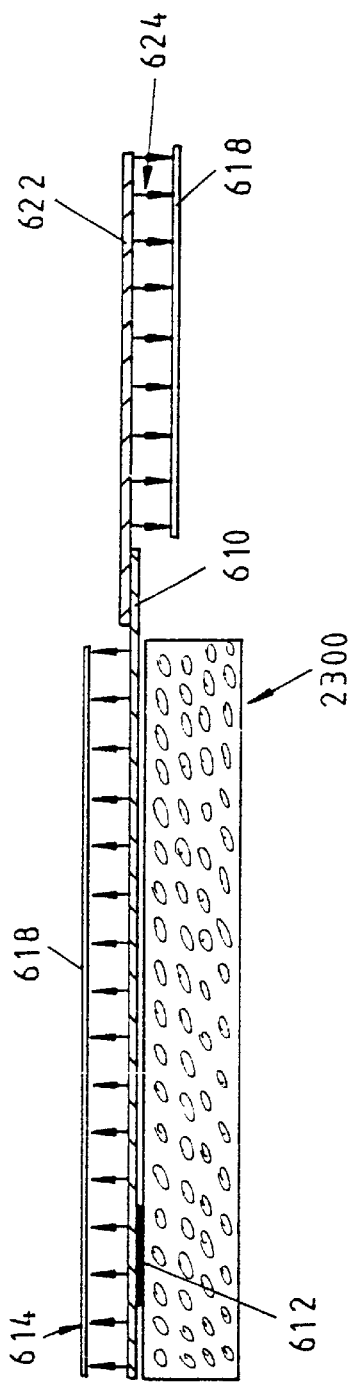

FIG. 45 shows a sectional view of a further embodiment of a plastic profile.

Figure 46:
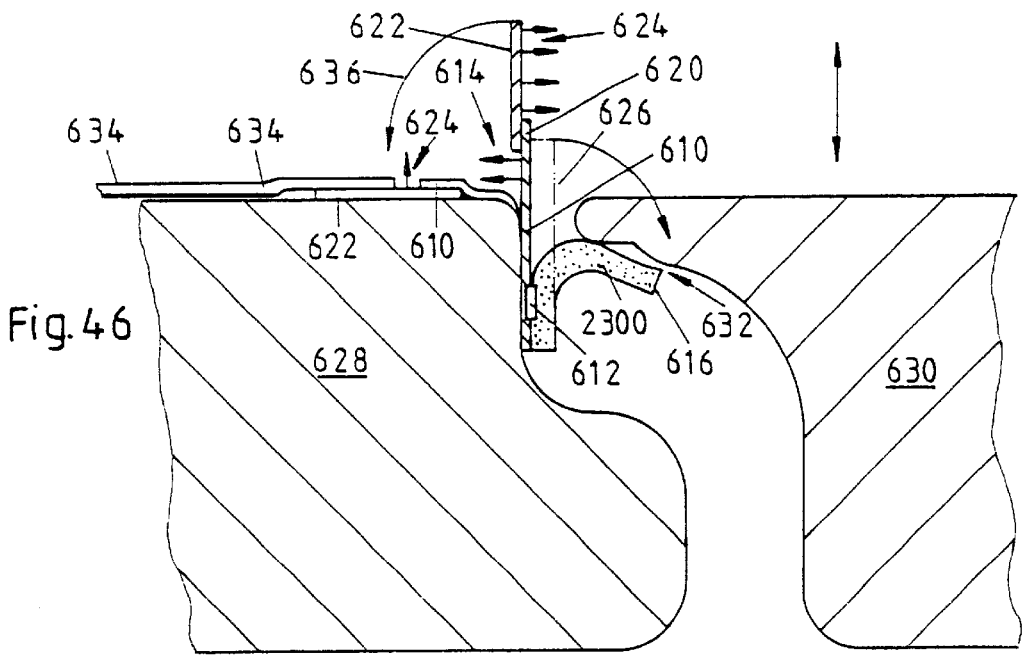

FIG. 46 shows a sectional view of an example of application of a plastic profile according to the embodiment of FIG. 45.

Figure 47:
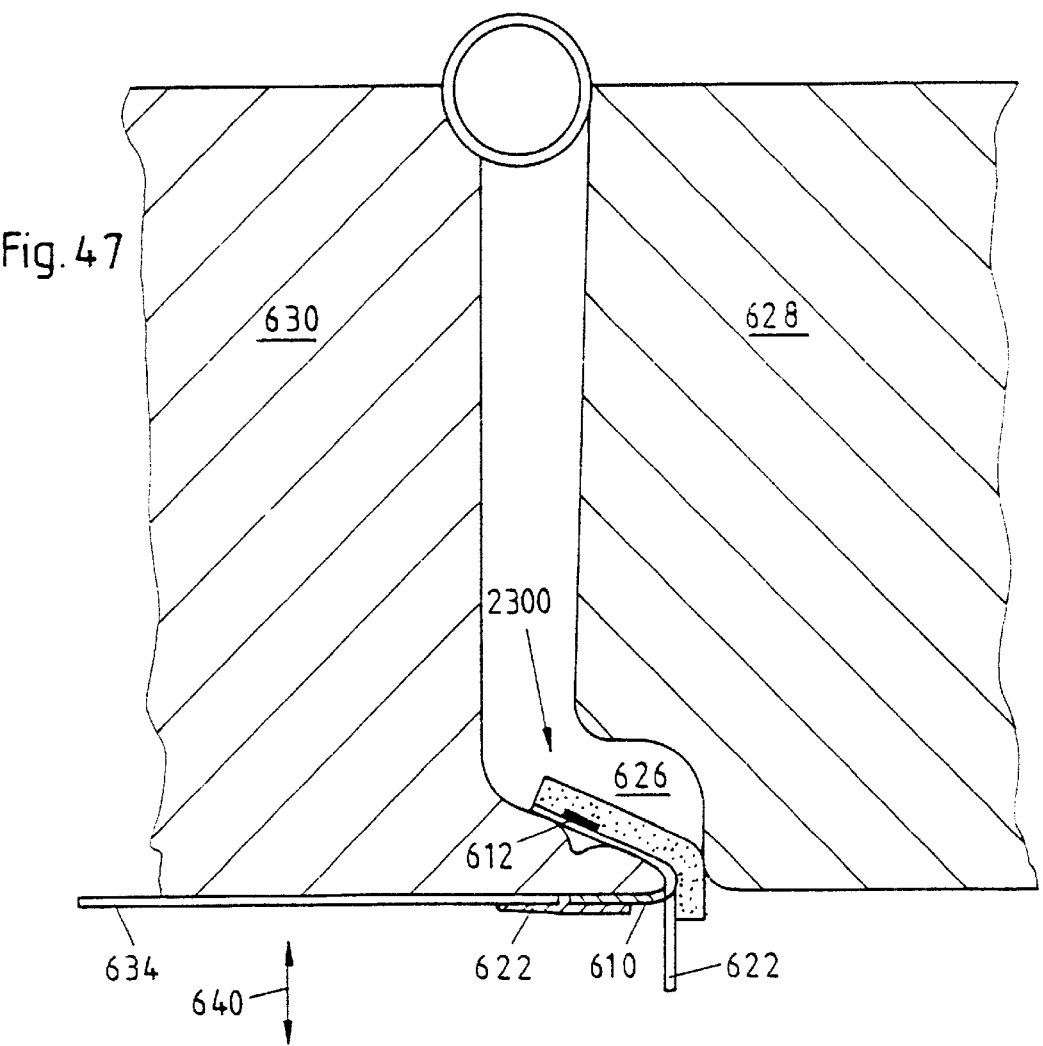

FIG. 47 shows a sectional view of an example of application of a plastic profile in the gap between a door on lock level and a car body part.

Figure 48:
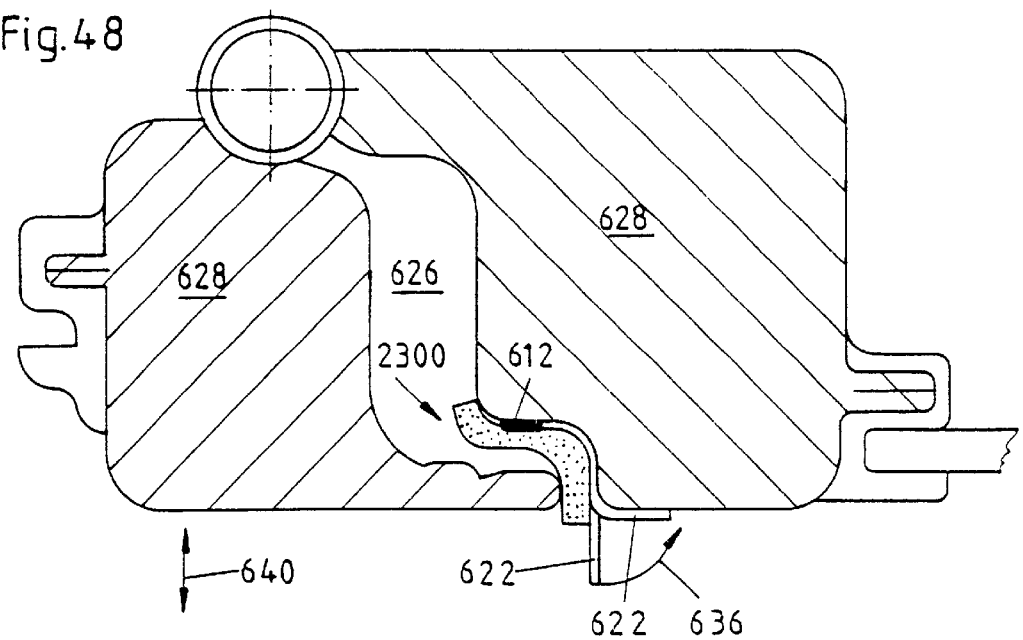

FIG. 48 shows a sectional view of an example of application of a plastic profile in the gap between the door and a door sleeper B-column.

Figure 49:
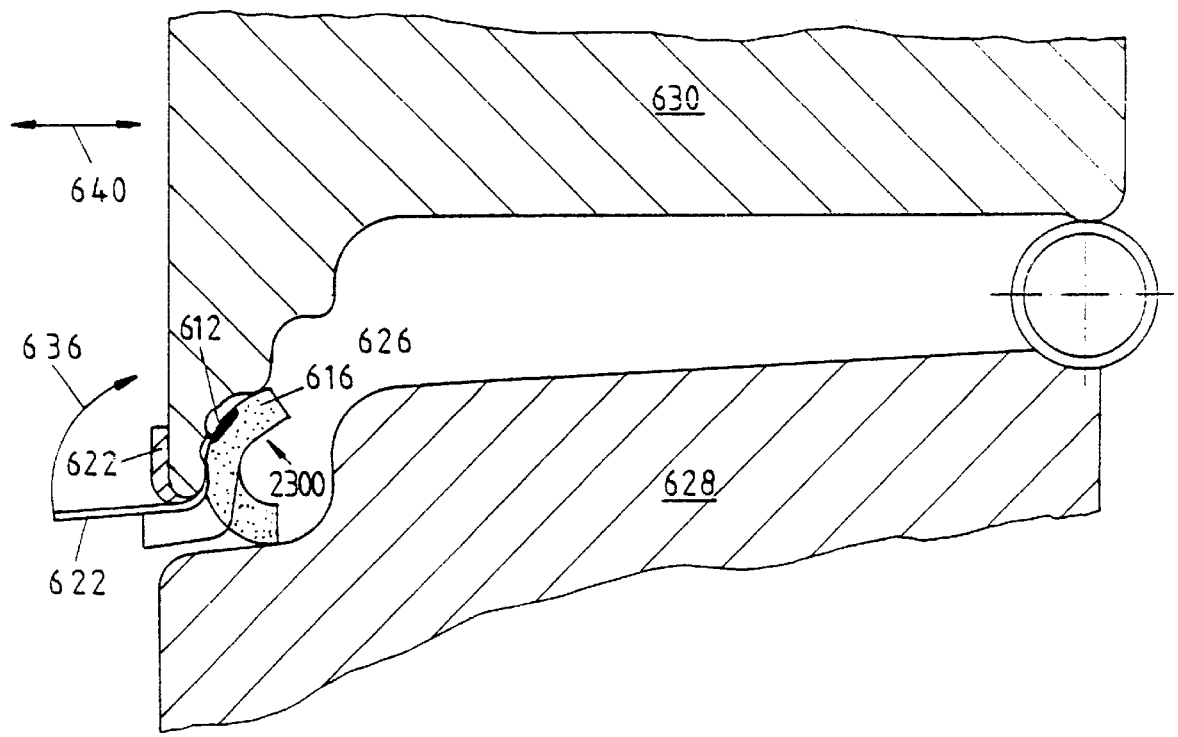

FIG. 49 shows a sectional view of an example of application of a plastic profile in the gap between the door on door middle level and a car body part.

Figure 50:
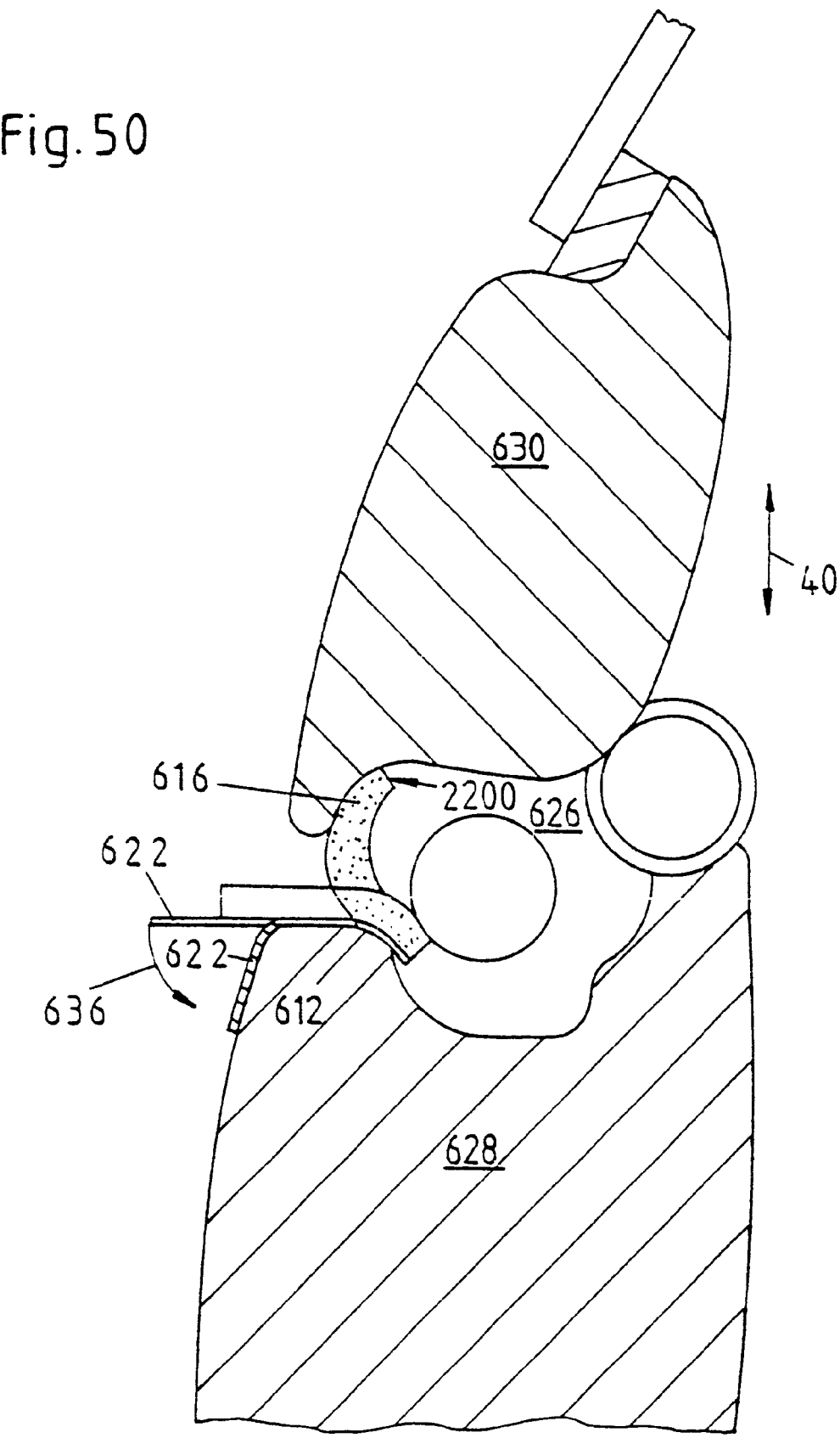

FIG. 50 shows a sectional view of an example of application of a plastic profile in the gap between a door in the area lateral to a back window and a car body part.

FIG. 51 shows a sectional view of an example of application of a plastic profile in the gap between an engine bonnet and a mud guard.

FIG. 52 shows a sectional view of an example of application of a plastic profile in the gap between an engine bonnet and a mud guard.

FIG. 53 shows a sectional view of an example of application of a plastic profile in the gap between a door in the lower area and a of a floor body part.

Figure 54:
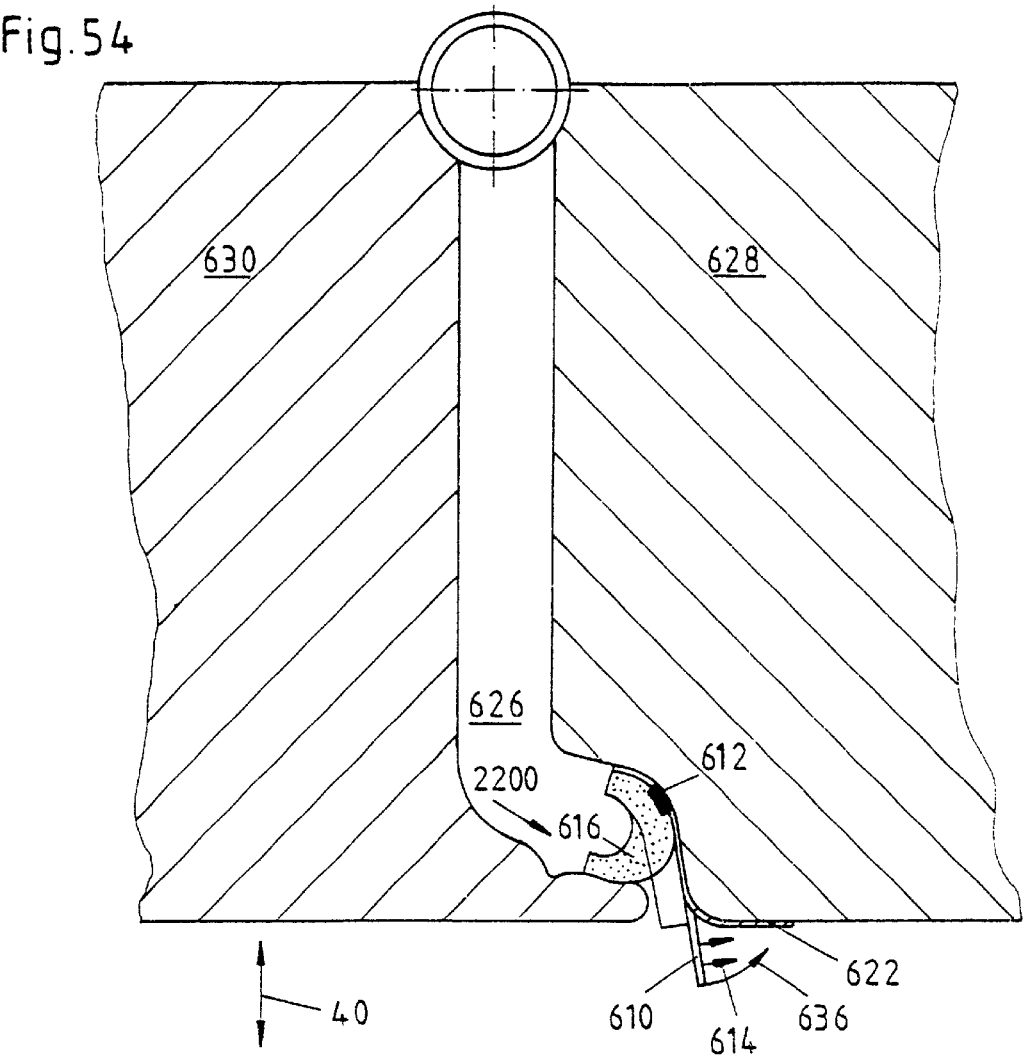

FIG. 54 shows a sectional view of an example of application of a plastic profile in the gap between a door on lock level and a car body part.

Figure 55:
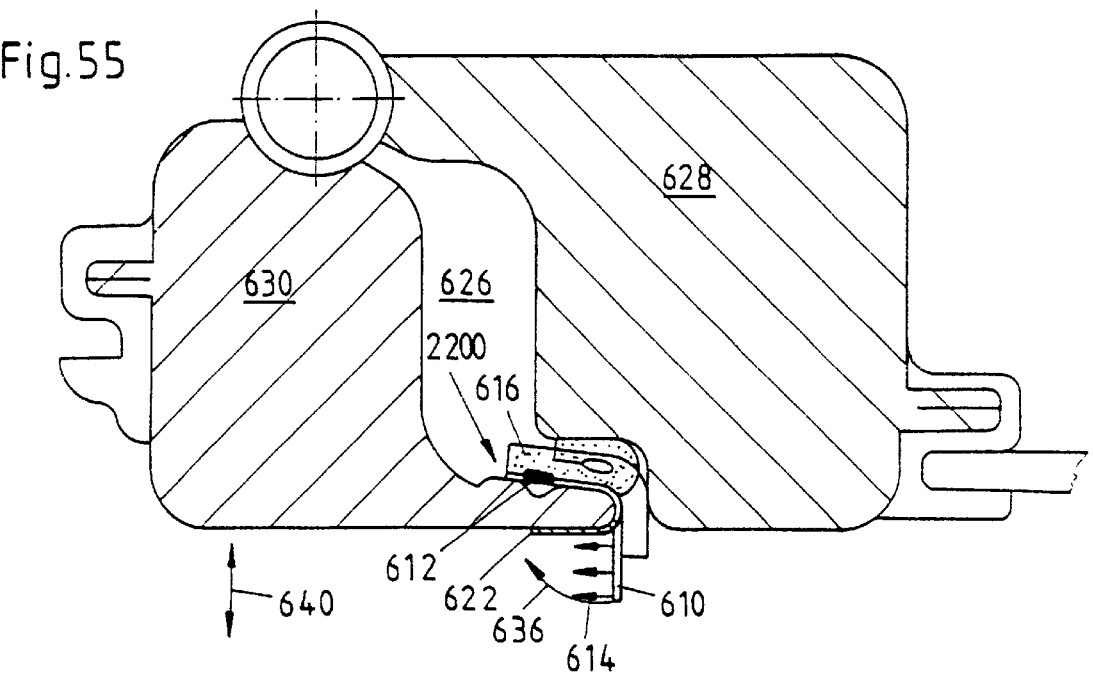

FIG. 55 shows a sectional view of an example of application of a plastic profile in the gap between the door and a door sleeper Bcolumn.

FIG. 56 shows a sectional view of an example of application of a plastic profile in the gap between door on door middle level and a car body part.

FIG. 57 shows a sectional view of an example of application of a plastic profile in the gap between a door in the are lateral to a back window and a car body part.

Figure 58:
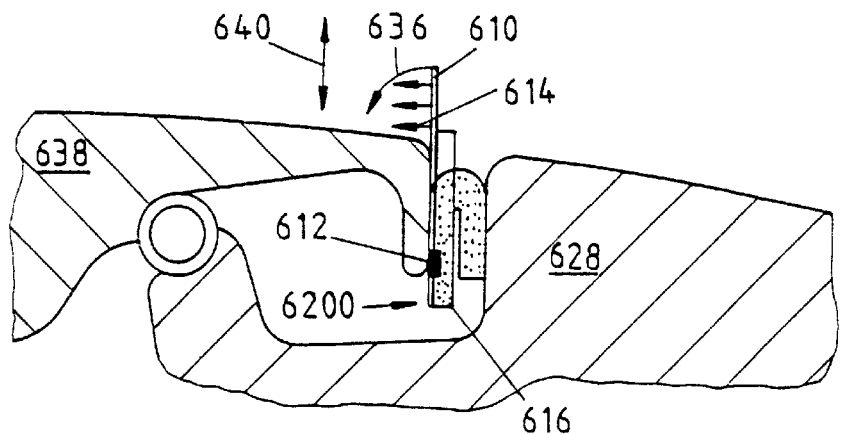

FIG. 58 shows a sectional view of an example of application of a plastic profile in the gap between an engine bonnet and a mud guard.

Figure 59:
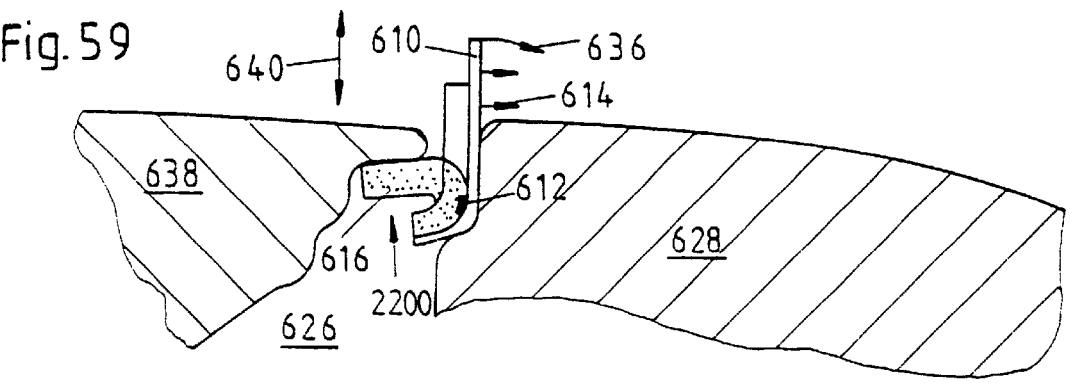

FIG. 59 shows a sectional view of an example of application of a plastic profile in the gap between an engine bonnet and a mud guard.

Figure 60:
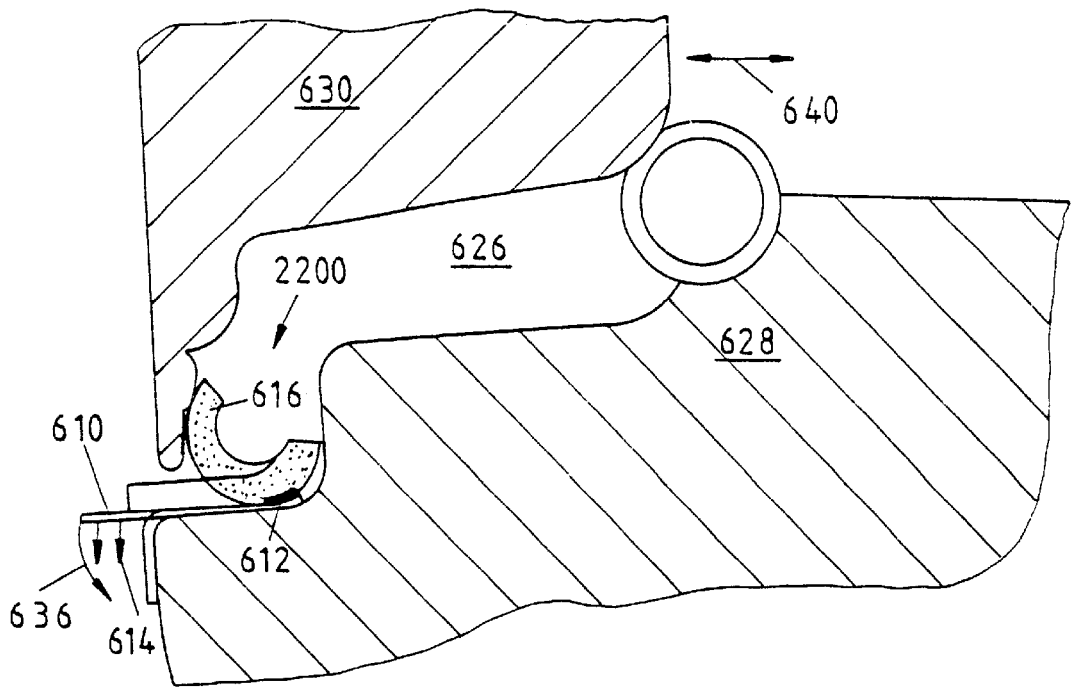

FIG. 60 shows a sectional view of an example of application of a plastic profile in the gap between a door in the lower area and a floor body part.

Figure 61:
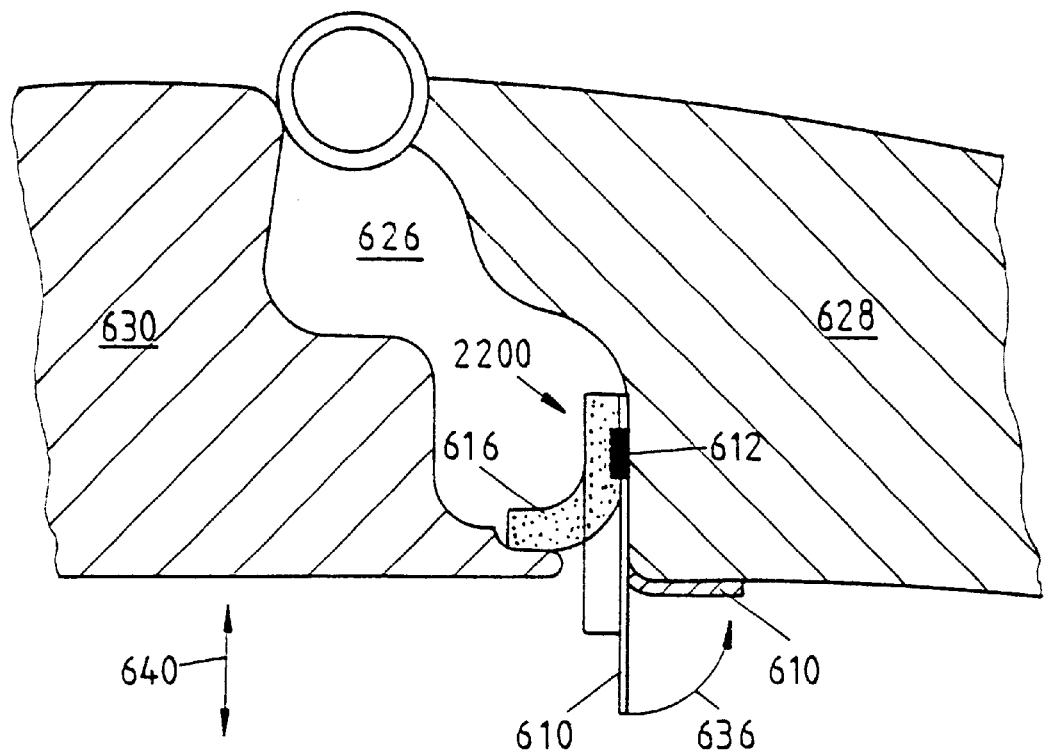

FIG. 61 shows a sectional view of an example of application of a plastic profile in the gap between a door in the area lateral/over the lock and a car body part.

Figure 62:
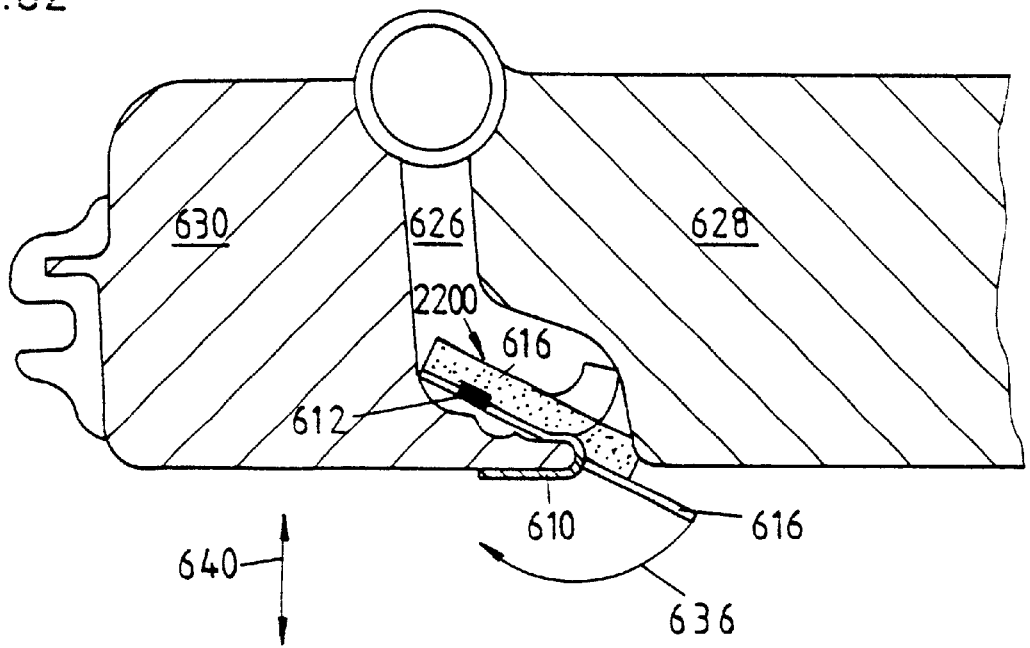

FIG. 62 shows a sectional view of an example of application of a plastic profile in the gap between a door in the area middle/window and a car body part.

Figure 63:
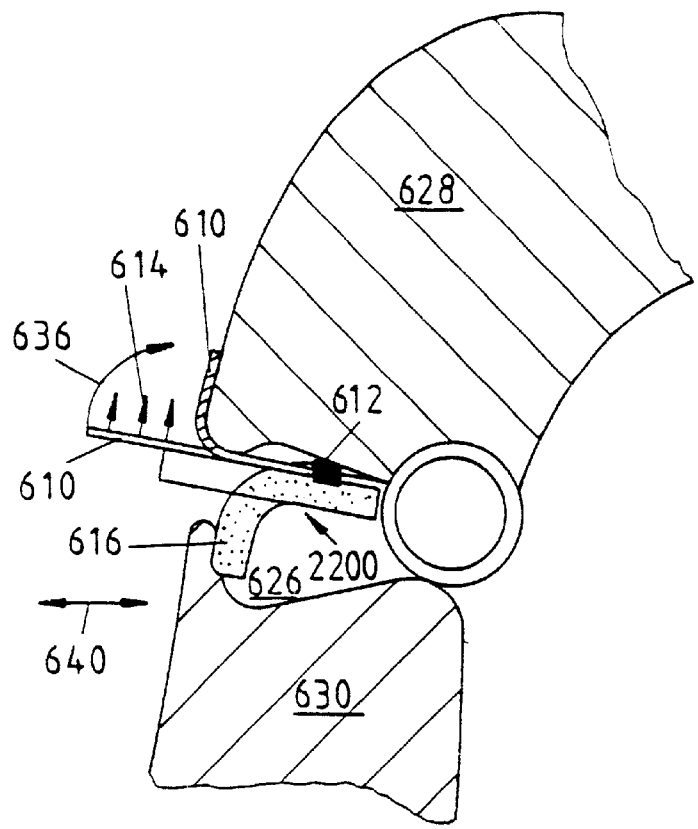

FIG. 63 shows a sectional view of an example of application of a plastic profile in the gap between a door in the upper area and a top body part.

Figure 64:
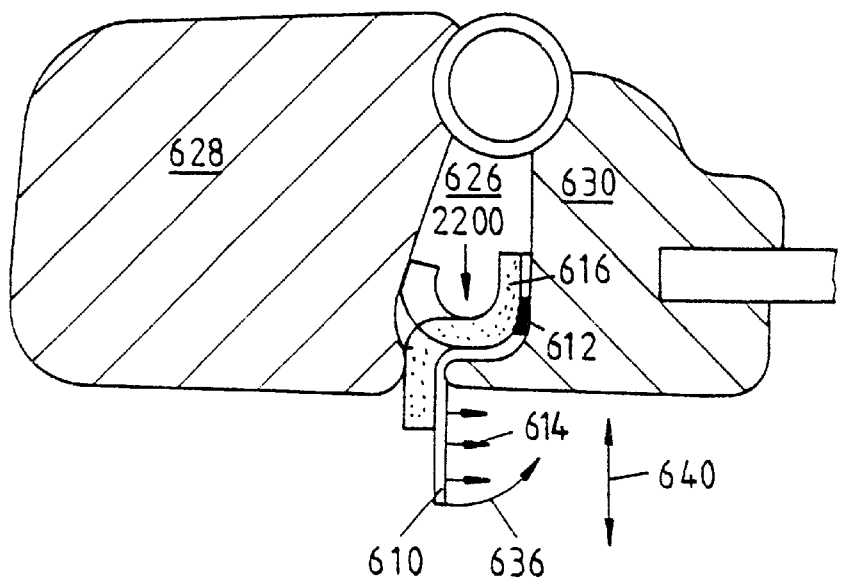

FIG. 64 shows a sectional view of an example of application of a plastic profile in the gap between a door in the upper area and a vertical window pillar.

Figure 65:
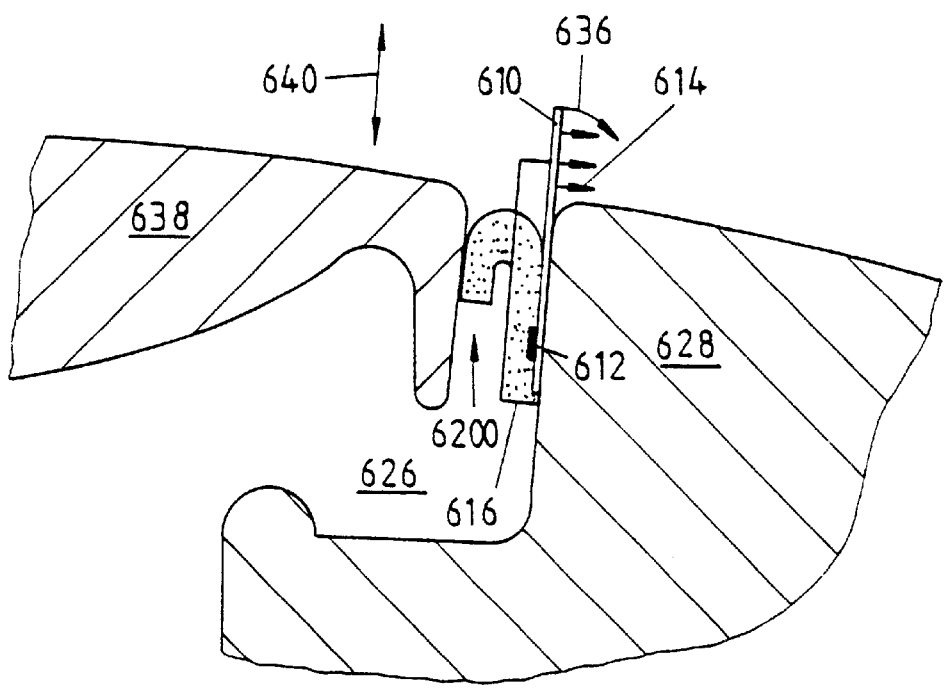

FIG. 65 shows a sectional view of an example of application of a plastic profile in the gap between an engine bonnet and a mud guard.

Figure 66:
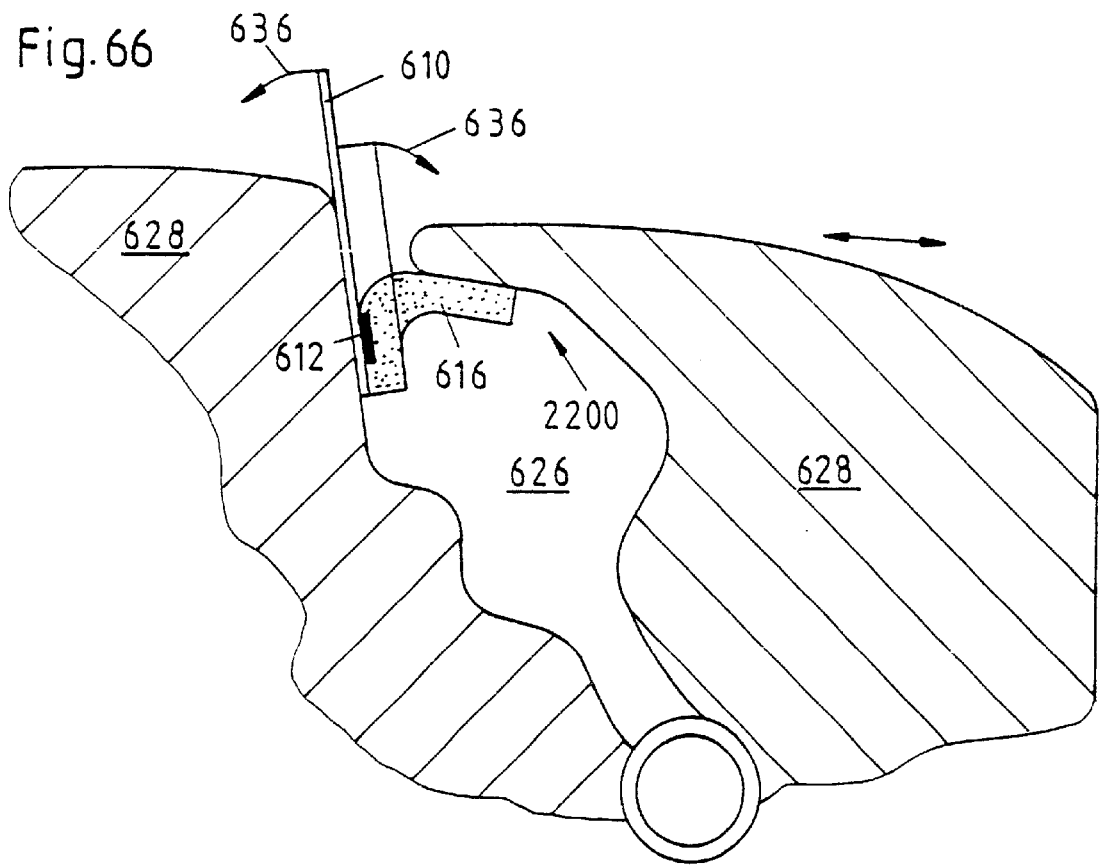

FIG. 66 shows a sectional view of an example of application of a plastic profile in the gap between a back flap in the lateral area and a car body part.

Figure 67:
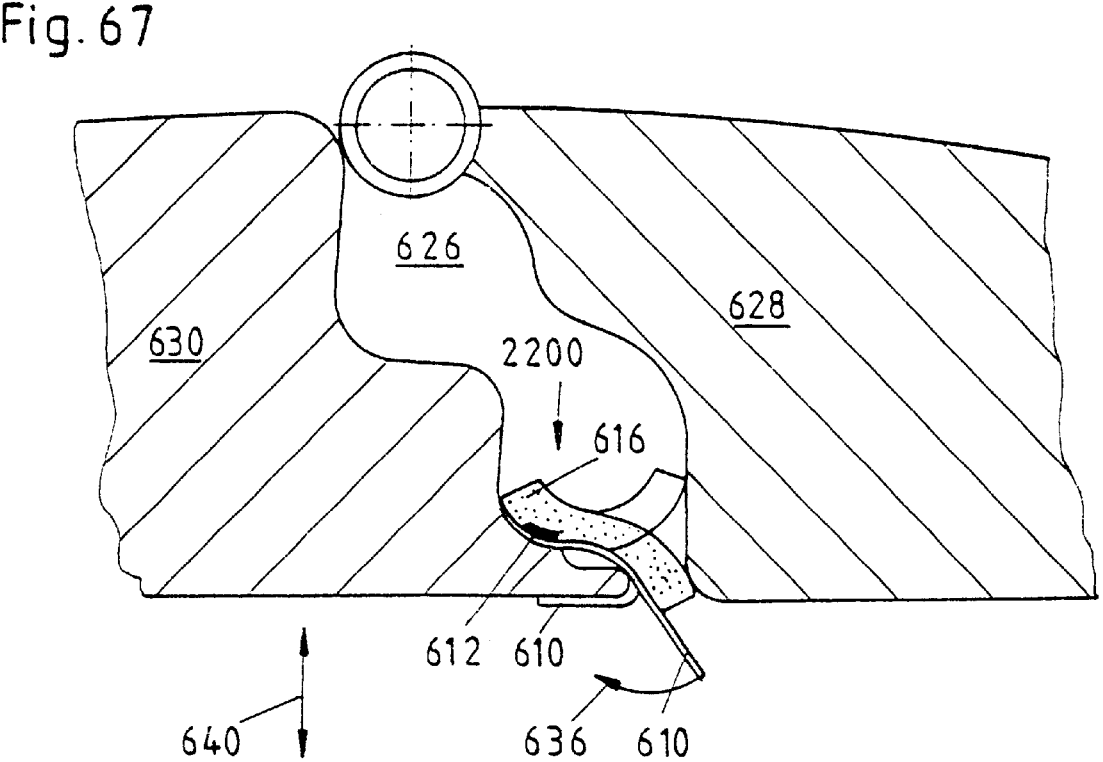

FIG. 67 shows a sectional view of an example of application of a plastic profile in the gap between a door in the area lateral/over the lock and a car body part.

Figure 68:
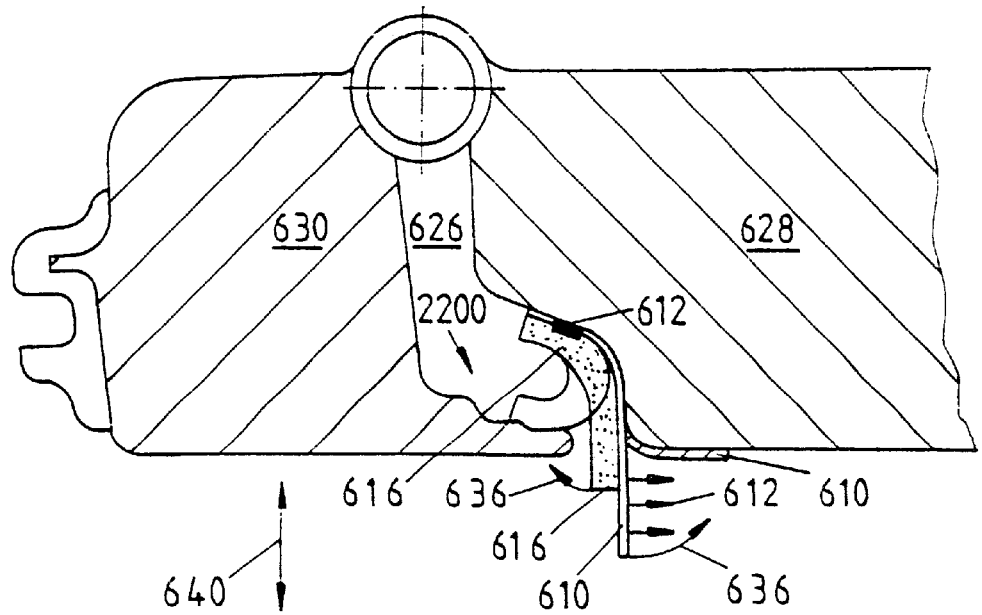

FIG. 68 shows a sectional view of an example of application of a plastic profile in the gap between a door in the area middle/window and a car body part.

Figure 69:
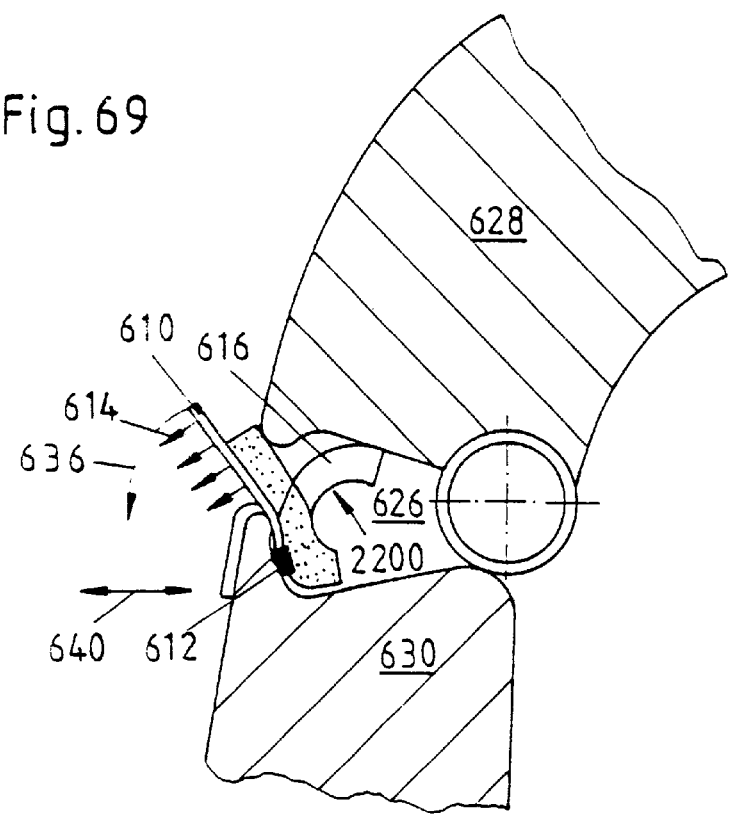

FIG. 69 shows a sectional view of an example of application of a plastic profile in the gap between a door in the upper area and a top body part.

Figure 70:
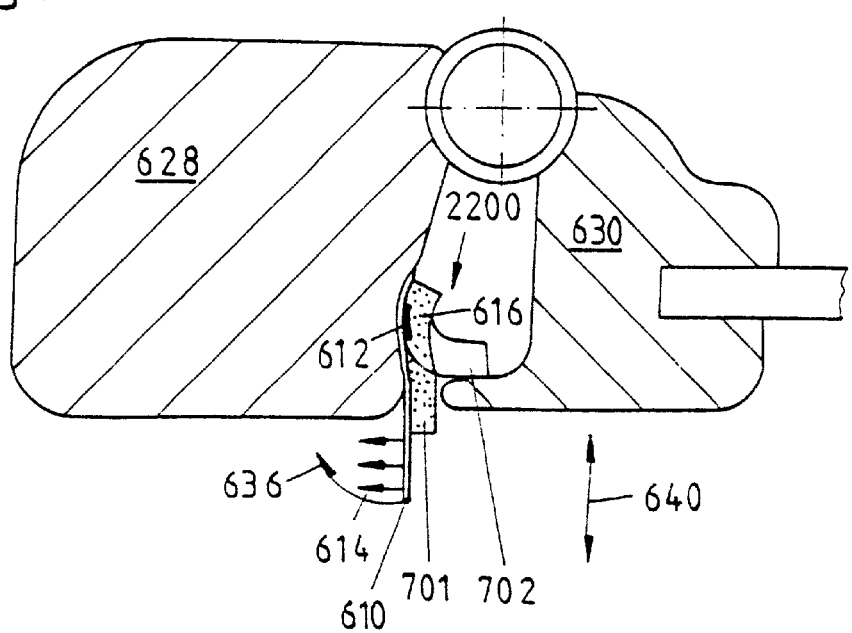

FIG. 70 shows a sectional view of an example of application of a plastic profile in the gap between a door in the upper area and a vertical window pillar.

Figure 71:
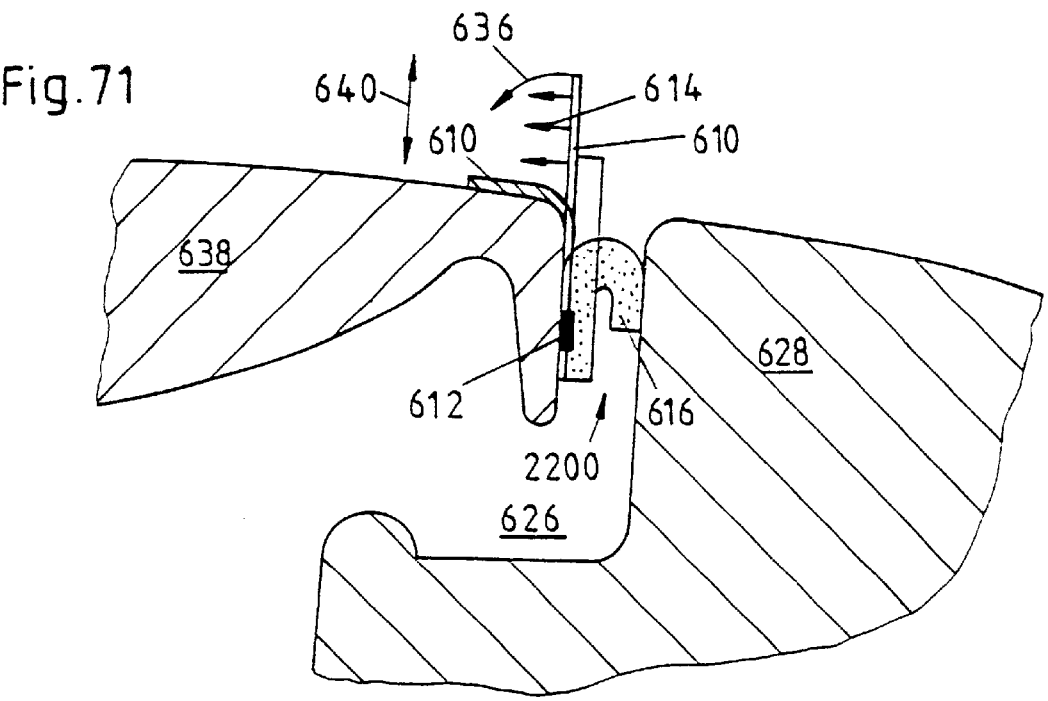

FIG. 71 shows a sectional view of an example of application of a plastic profile in the gap between an engine bonnet and a mud guard.

Figure 72:
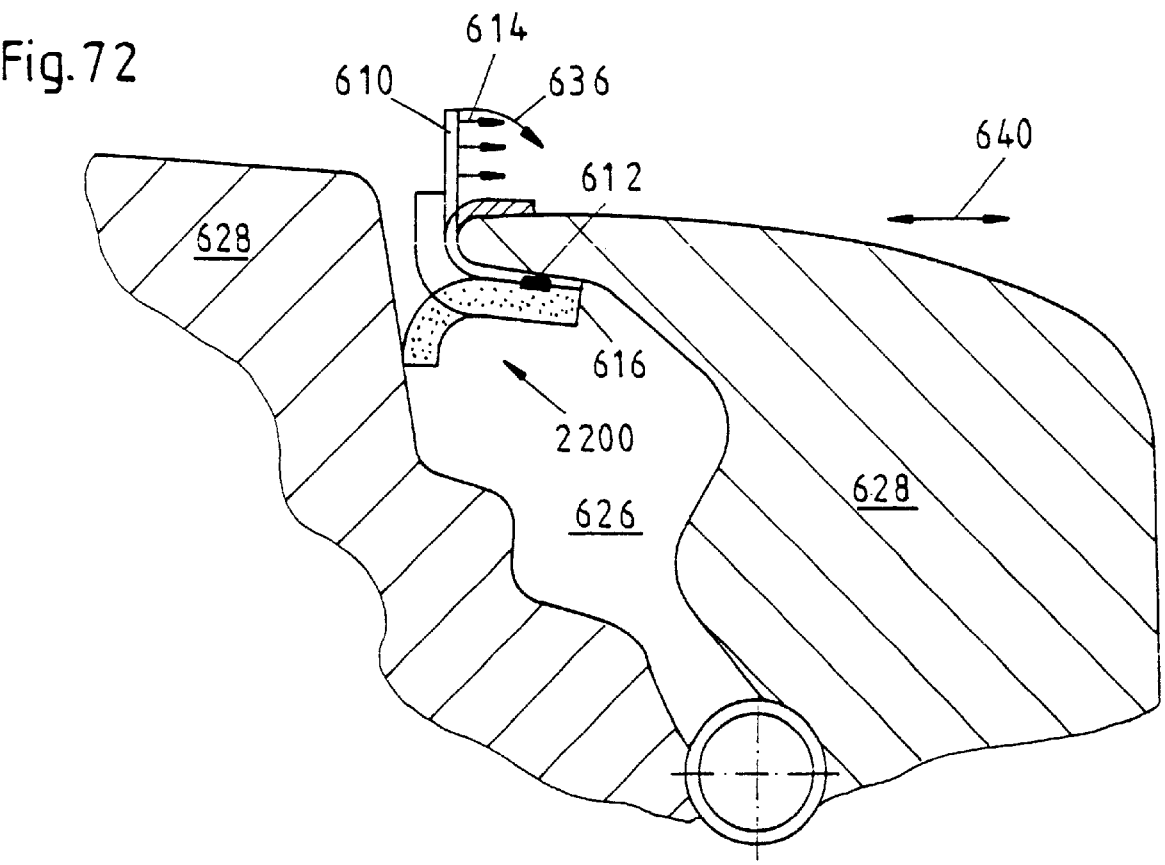

FIG. 72 shows a sectional view of an example of application of a plastic profile in the gap between a back flap in the lateral area and a car body part.

Figure 73:
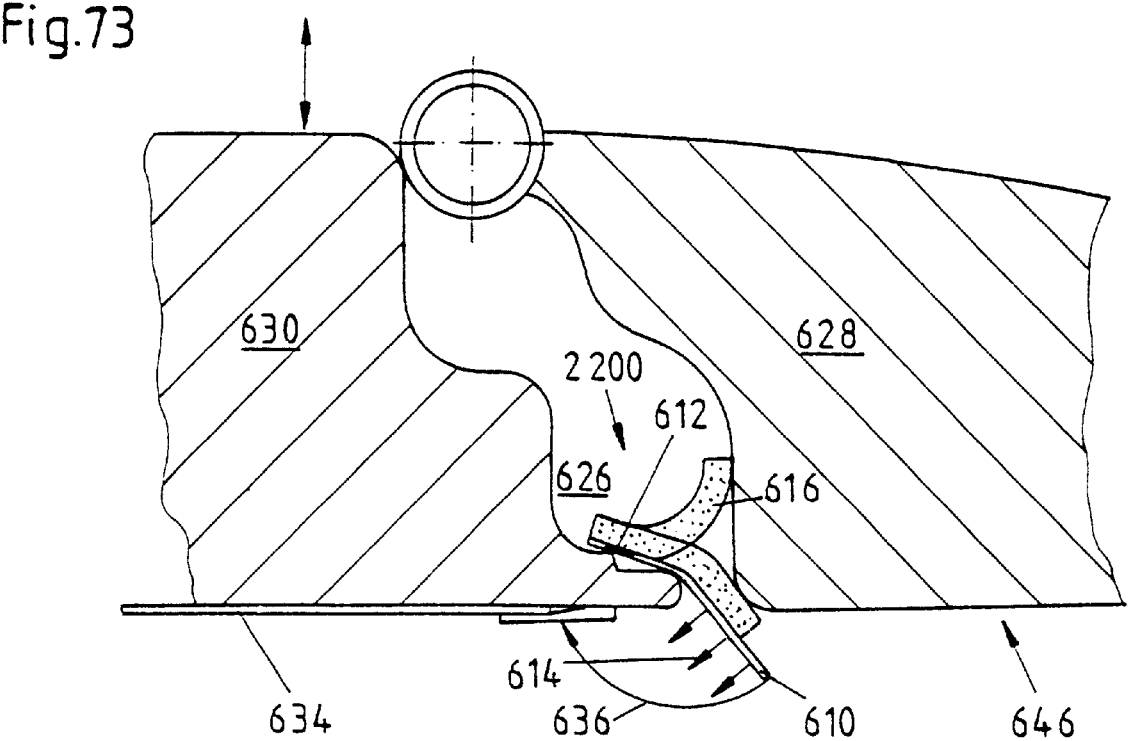

FIG. 73 shows a sectional view of a further example of application of a plastic profile in the gap between a door and a car body part.

Figure 74:
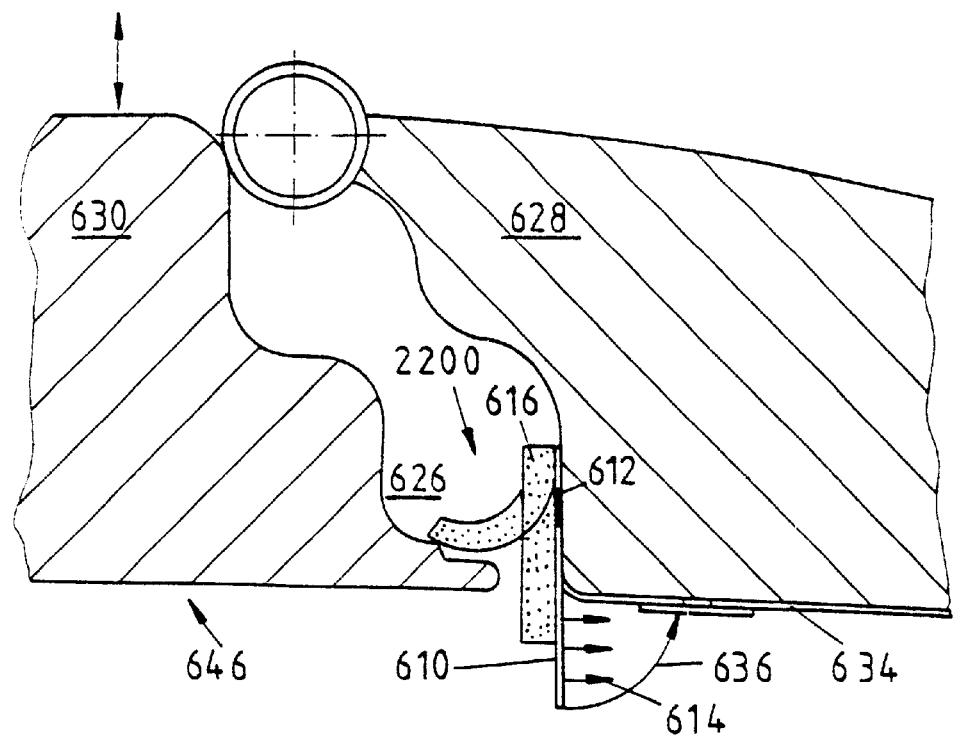

FIG. 74 shows a sectional view of a further example of application of a plastic profile in the gap between a door and a car body part.

Figure 75:
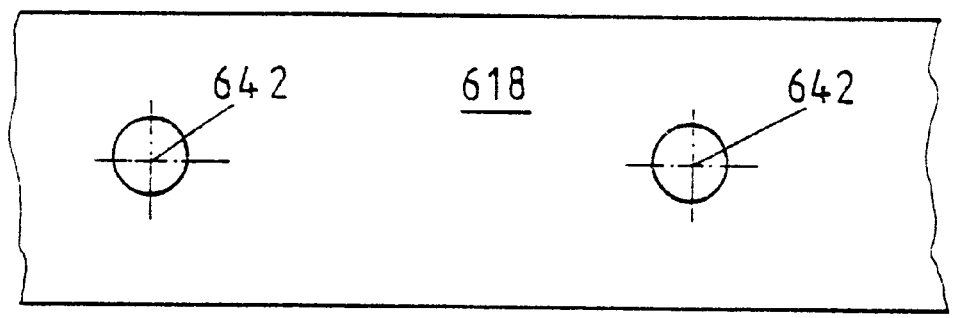

FIG. 75 shows a top view of a silicone paper.

Figure 76:
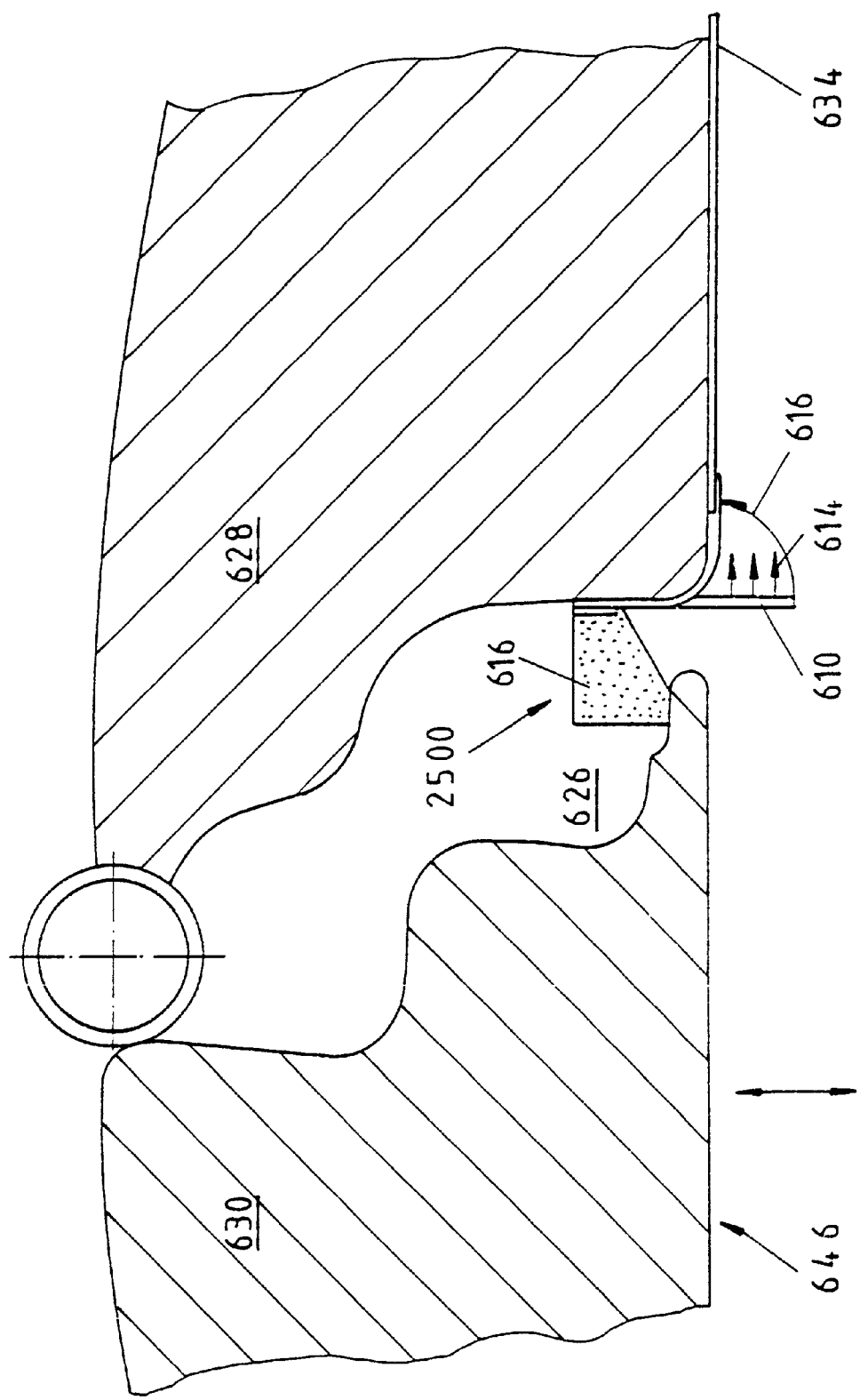

FIG. 76 shows a sectional view of a further example of application in the gap between a door and a car body part.

Figure 76A:
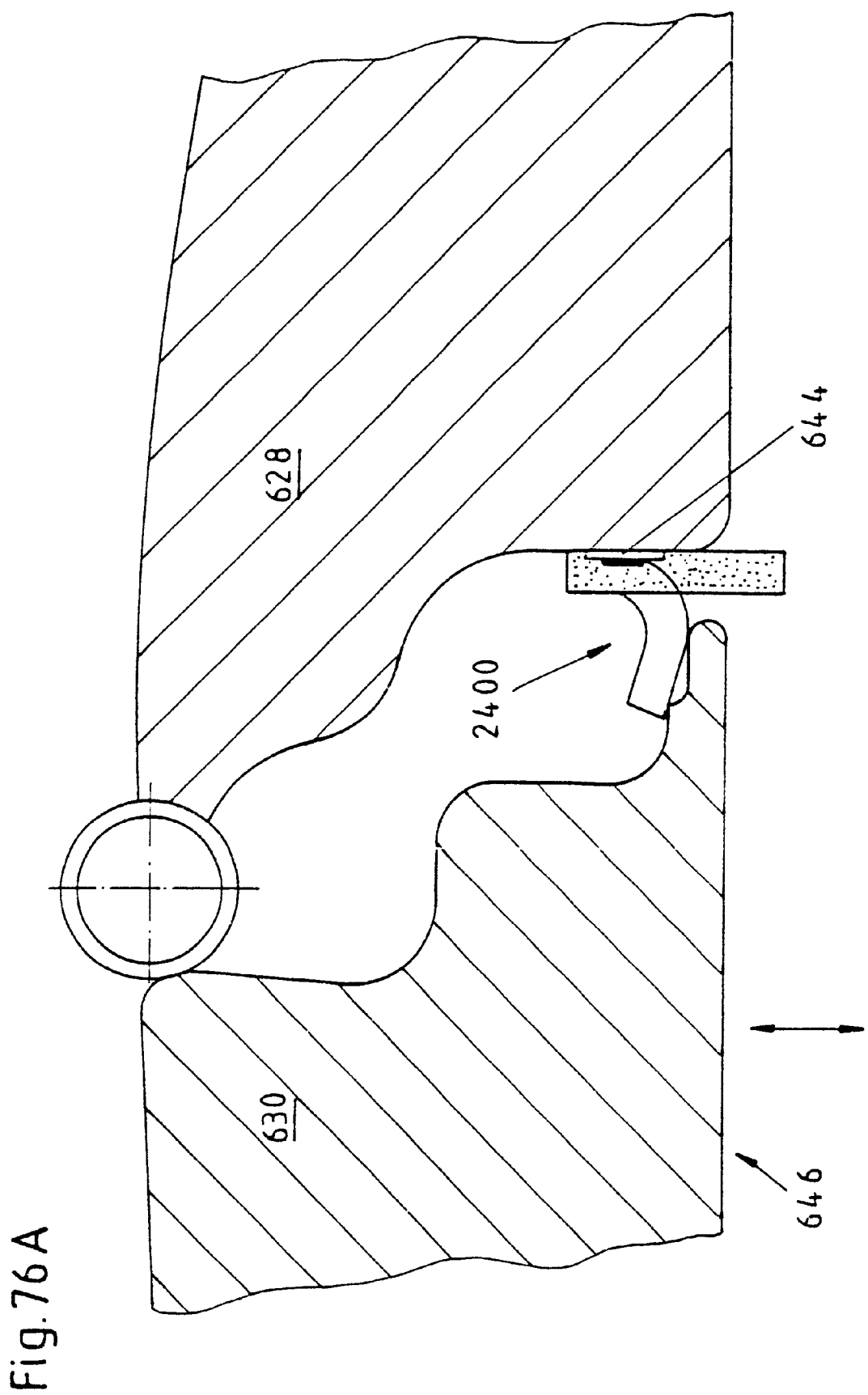
Figure 77:
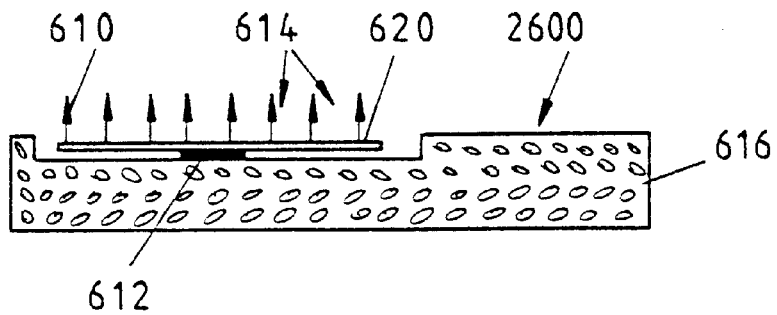
Figure 78:
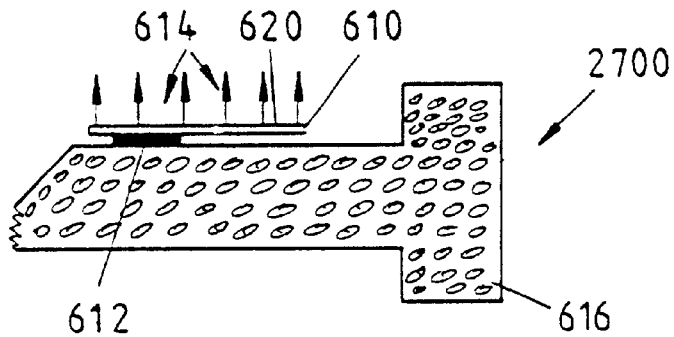

FIG. 76A shows a sectional view of an example of application of a further embodiment of a plastic profile in a gap between two car body parts.

FIGS. 77 to 80 show in sectional views further preferred embodiments of a plastic profile.

FIG. 81 shows a sectional view of a first preferred embodiment of an applicator according to the invention.

FIG. 82 shows a topview of a first preferred embodiment of an applicator according to the invention.

Figure 83:
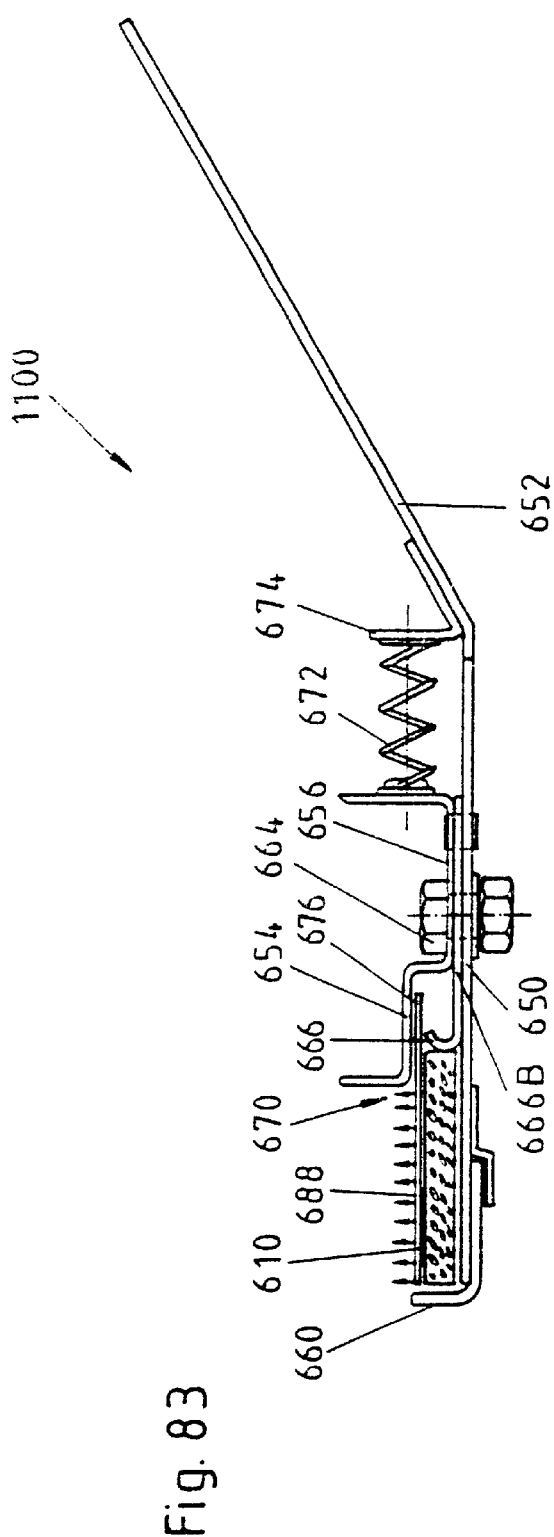

FIG. 83 shows a sectional view of a second preferred embodiment of an applicator according to the invention.

Figure 84:
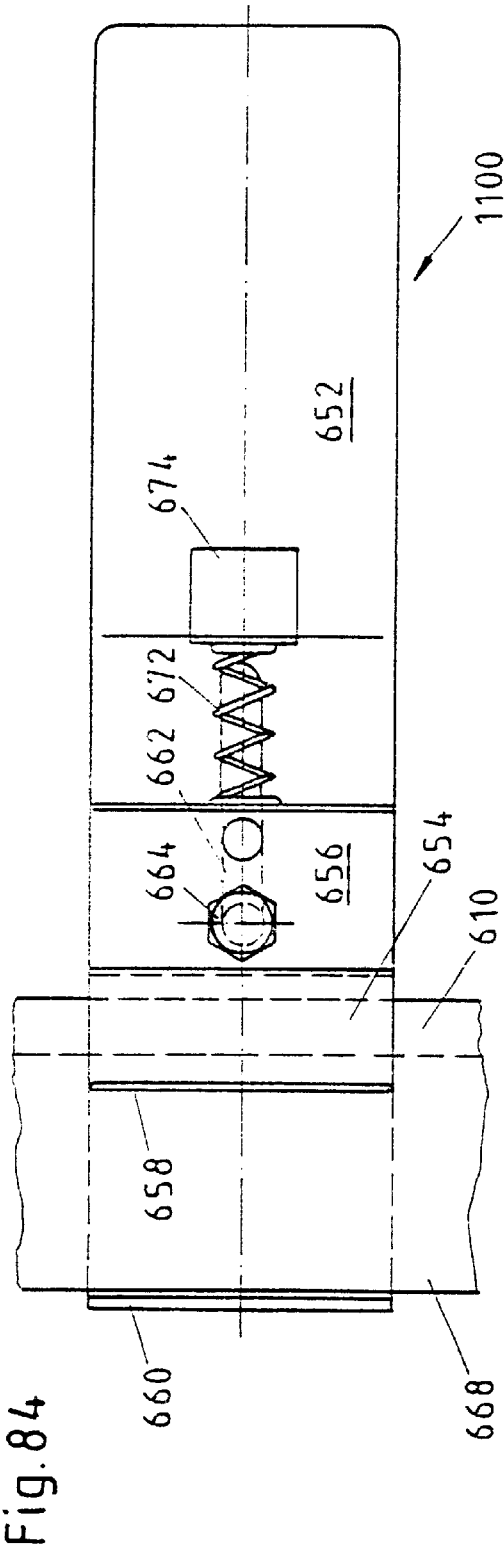

FIG. 84 shows a topview of a second preferred embodiment of an applicator according to the invention.

Figure 85:
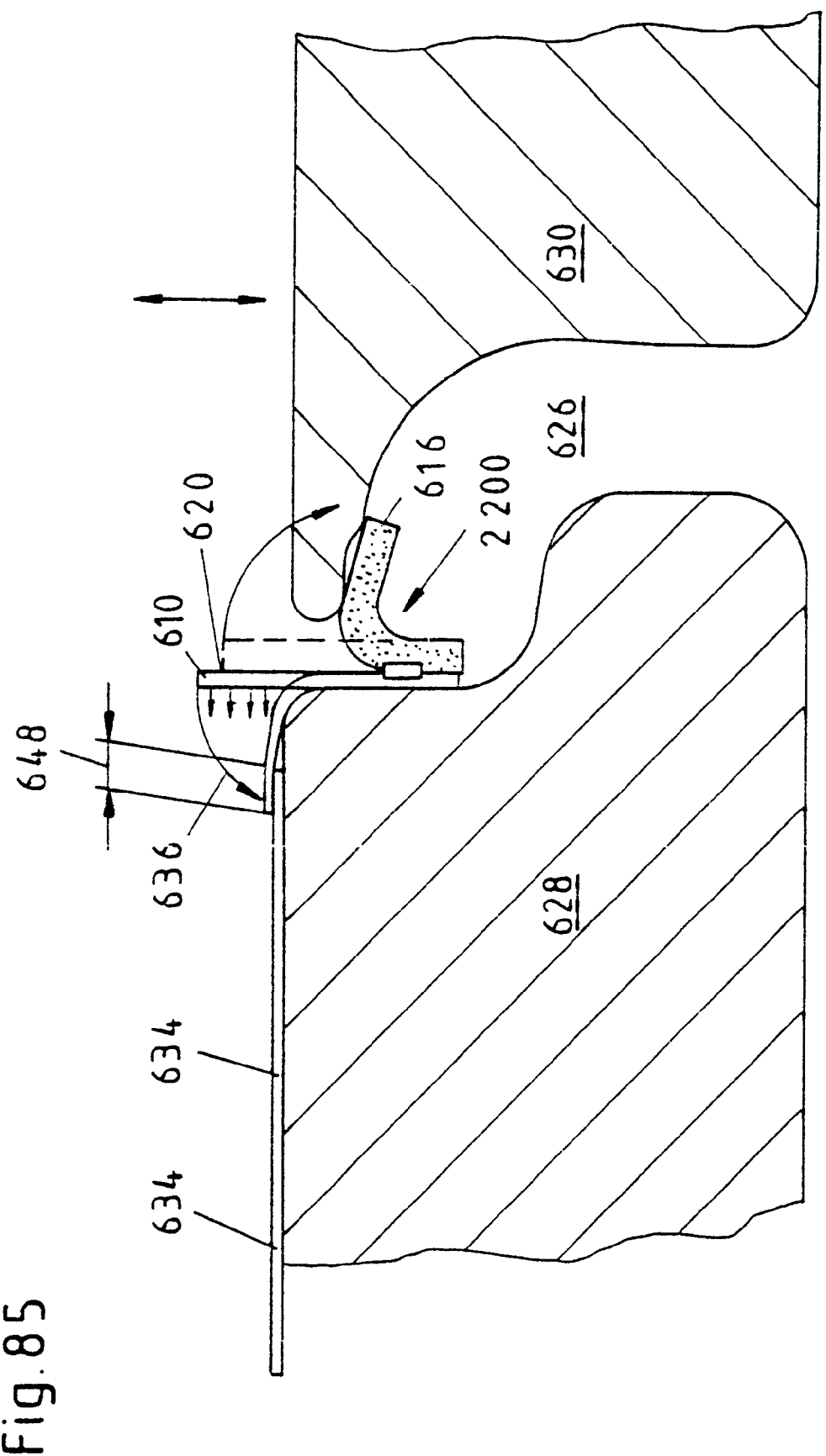

FIG. 85 shows a sectional view of a further example of application of a plastic strip according to the invention in the gap between a door and a car body part.

DESCRIPTION OF THE PREFERRED EMBODIMENT

Figure 1:
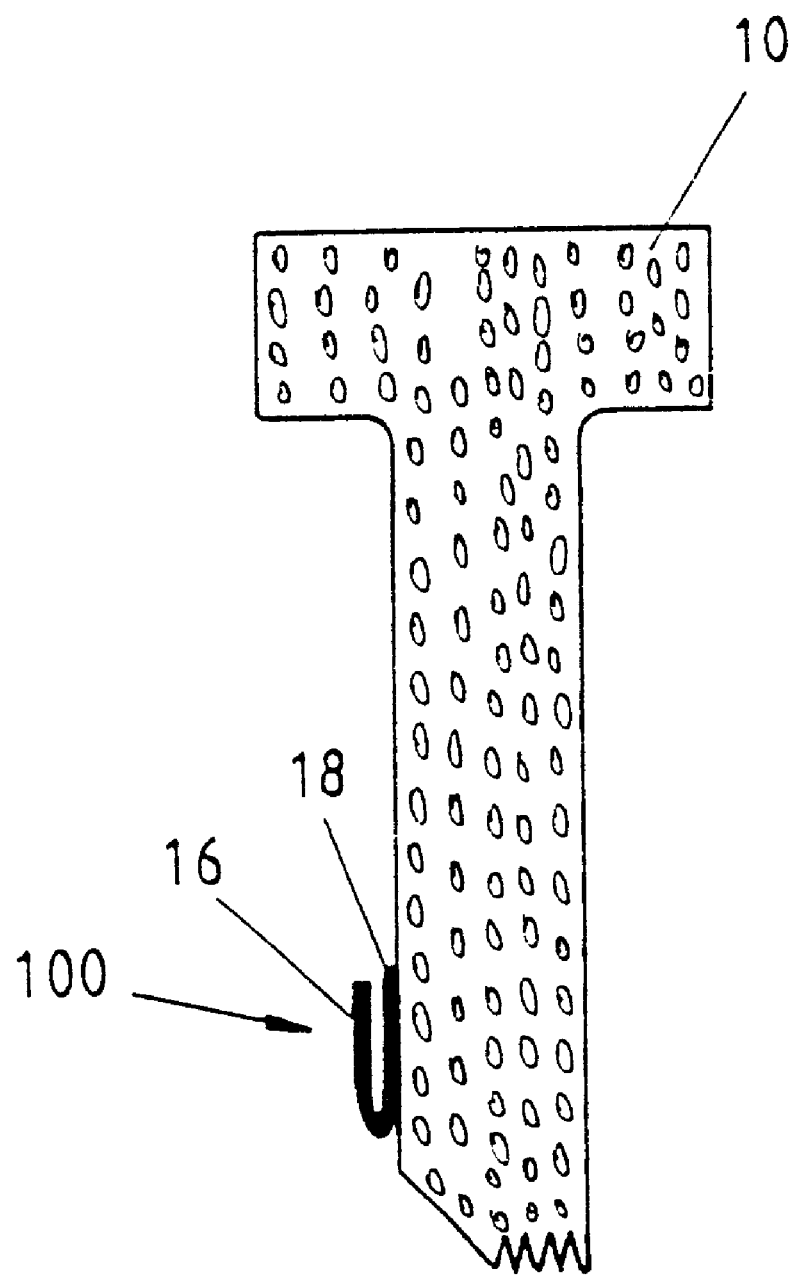
FIG. 1 shows a sectional view of a plastic profile in the form of a T-shaped foam strip with a fixing means according to a first preferred embodiment.

As represented in FIG. 1, a first preferred embodiment of the fixing means 100 has two legs 16 and 18. The leg 18 is connected to an approximately T-shaped foam strip 10 and the leg 16 is connectable to a gap inner side of a gap to be sealed. The foam strip 10 is T-shaped in the represented embodiment; however, other profiles, like for example a rectangular one or a T-shaped one, are also possible.

Figure 3A:
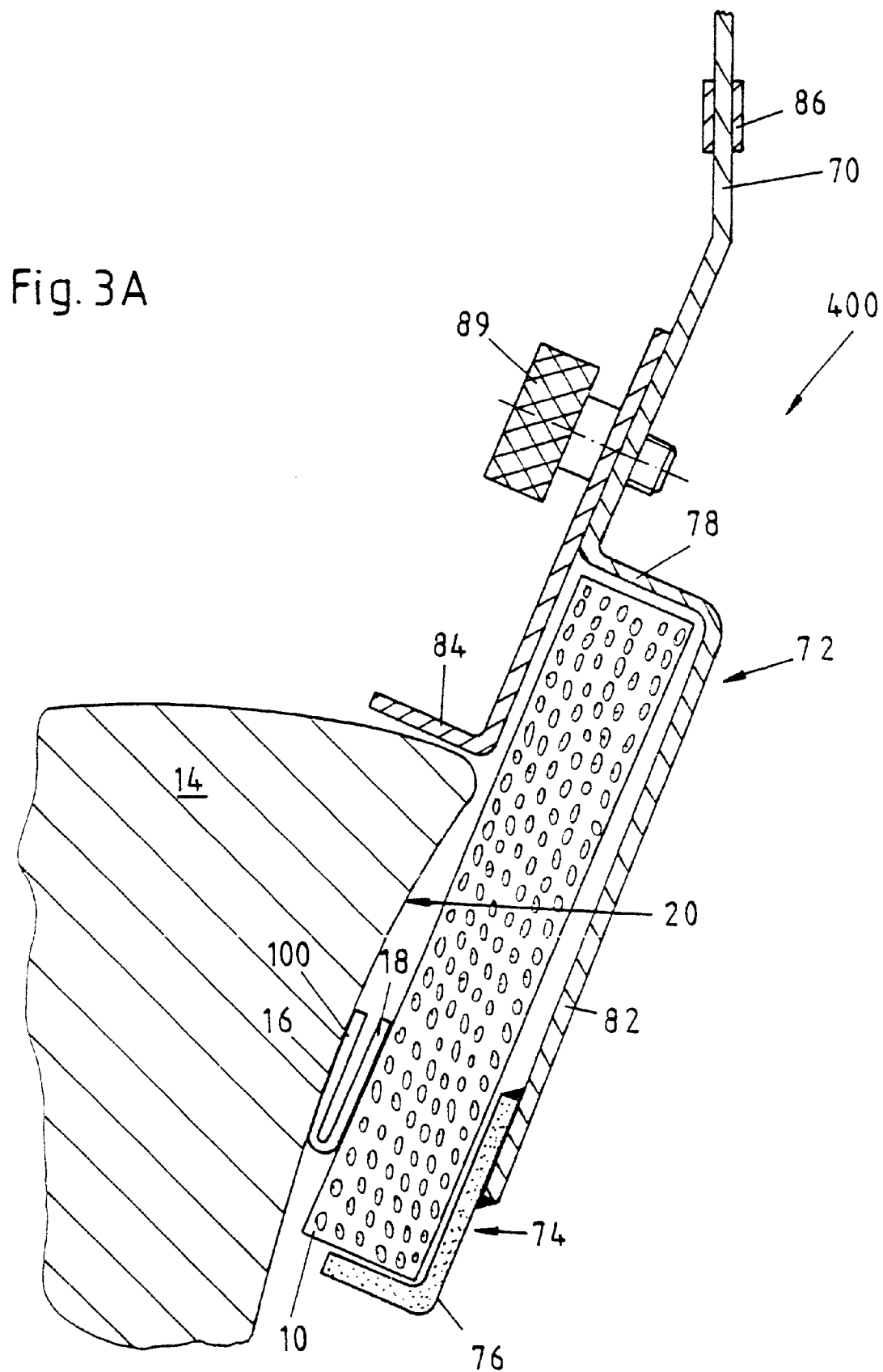
FIGS. 3A and 3B show views similar to FIGS. 2A and 2B, however with another embodiment for the applicator and the foam strip.
Figure 3B:
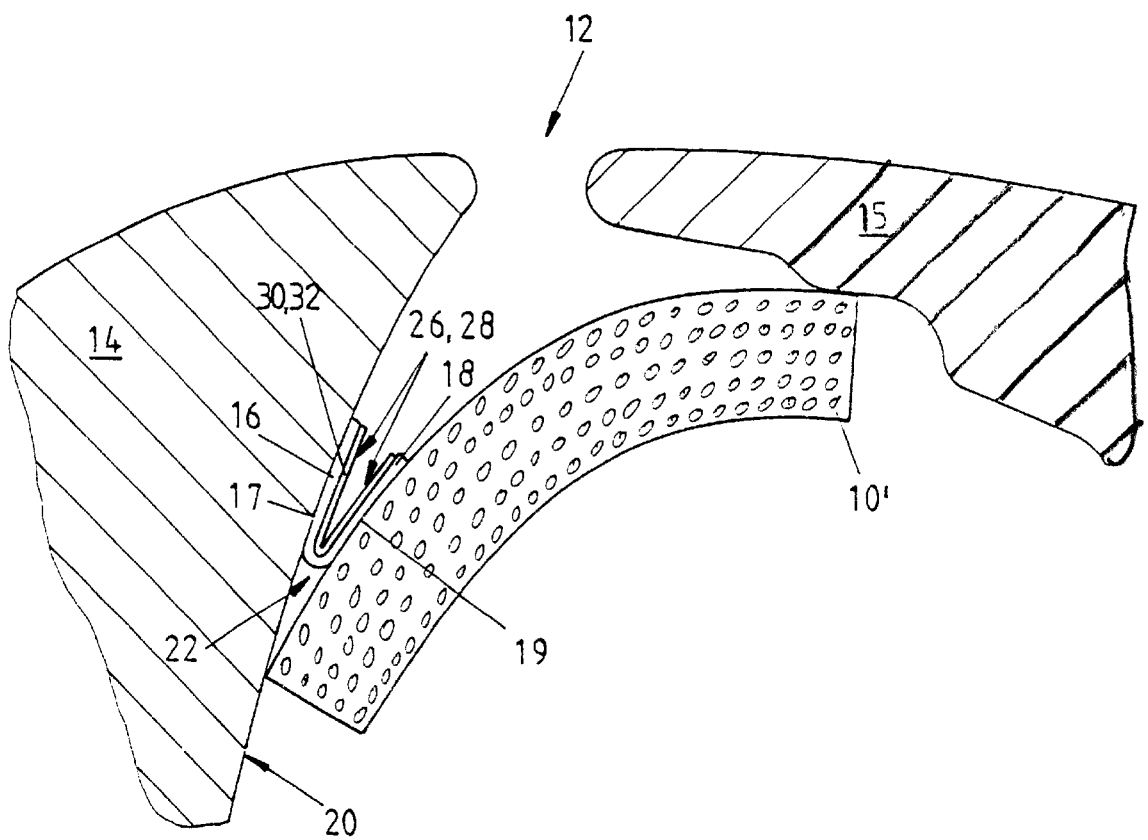

As shown especially in FIG. 3B, the fixing means 100 is provided with strong adhesive layers 17 and 19 on an outer side 22. The adhesive layer 19 on the leg 18 assures a solid bonding with the foam strip 10 and the adhesive layer 17 on the leg 16 creates an adhesive joint with a gap inner side 20 of the gap 12.

Figure 2A:
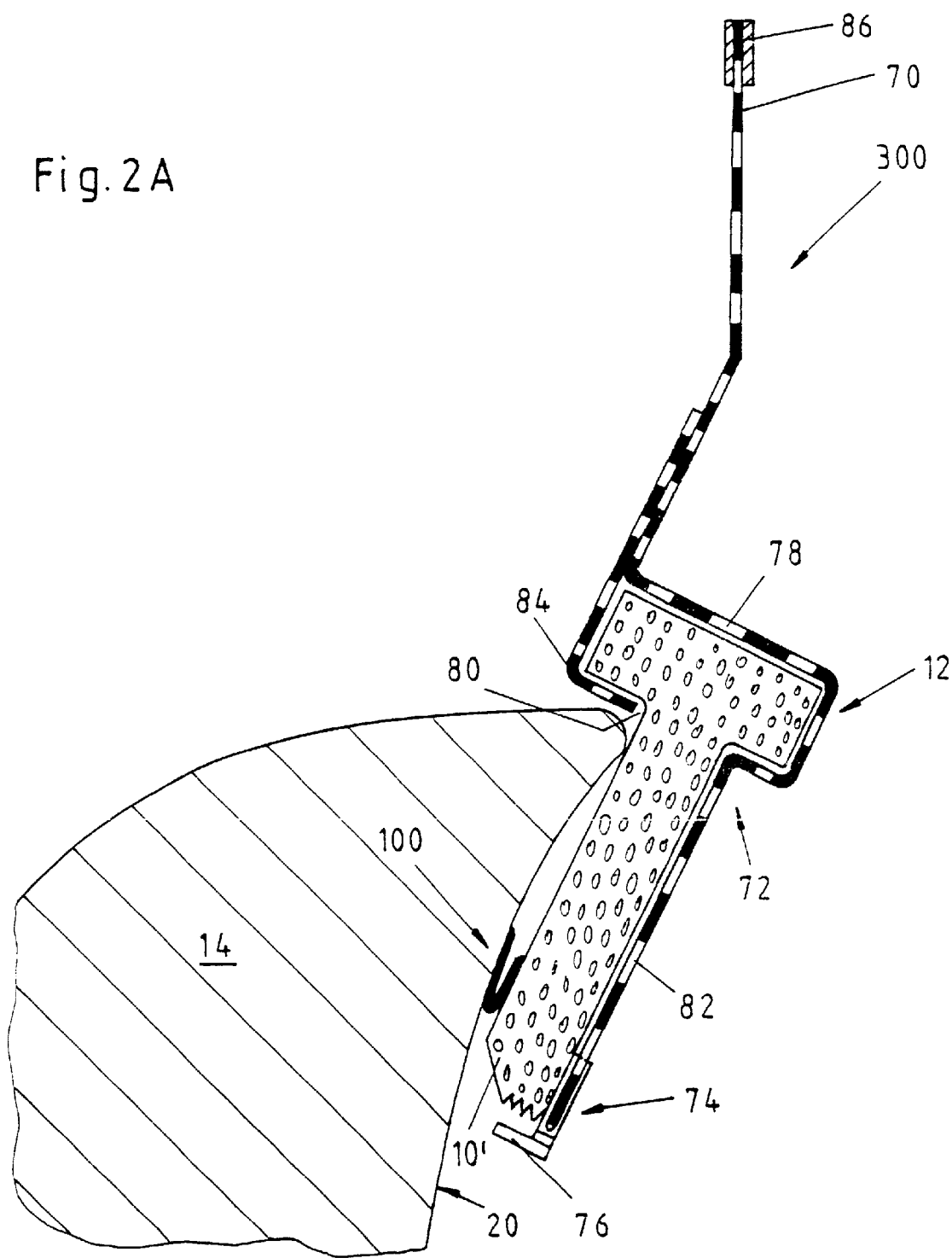
FIG. 2A shows a sectional view of a gap to be sealed when inserting a T-shaped foam strip according to FIG. 1.

FIG. 2A illustrates the arrangement of the T-shaped foam strip 10 by means of a first embodiment 300 of an applicator according to the invention into a gap 12 between car body parts 14 and 15. The applicator has a handle 70 and a receptacle 72 for receiving the foam strip 10. The receptacle 72 has a rail 78 in which the foam profile 10 is held. A portion of the foam profile projects over a slot 80 out of the rail and a first stopper 82 supports the foam profile 10 on one side. A second stopper 84 further assures the right depth adjustment of the applicator 300 in the gap 12.

The foam strip 10 and with it the leg 16 with an adhesive layer 17 is pressed by means of the stopper 82 against the gap inner side 20 of the gap 12 and it comes to an adhesive joint which holds the foam strip in its position. The applicator 100 is pulled off and the second body part, for example a door car, is closed.

Figure 2B:
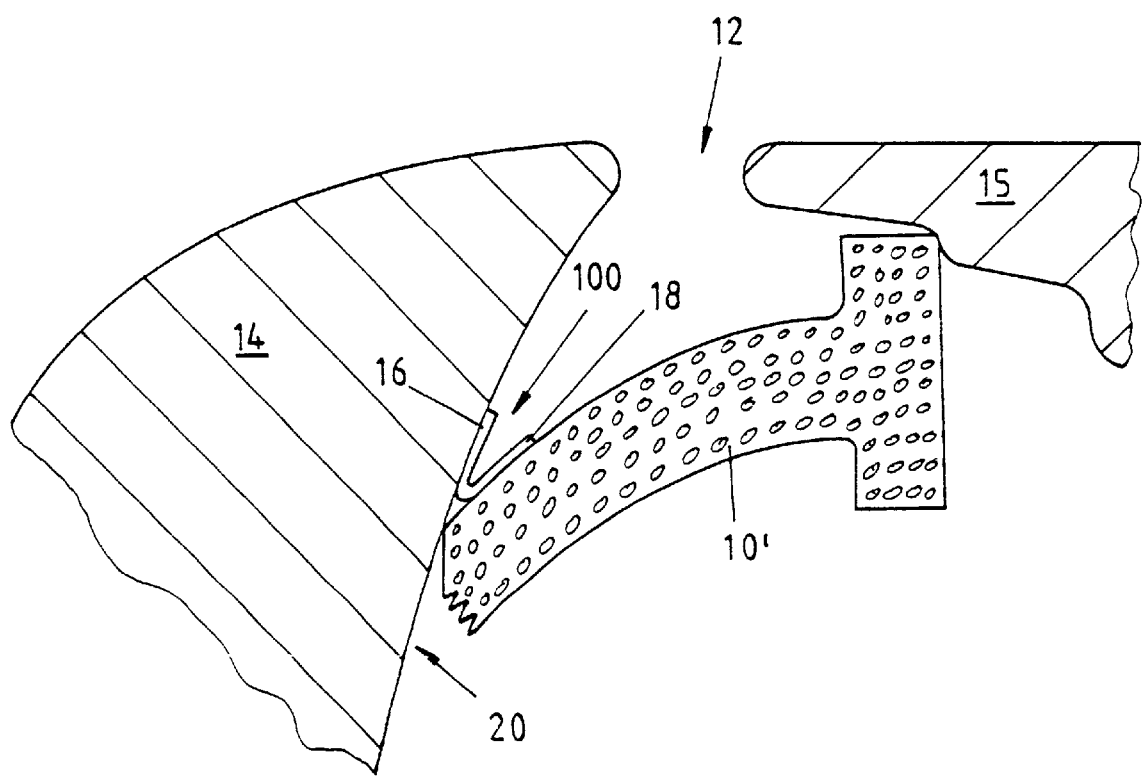
FIG. 2B shows a sectional view of a gap to be sealed with an inserted T-shaped foam strip.

Now the T-shaped foam strip 10 is—as shown in FIG. 2B—squeezed in the gap 12 and seals this gap. The adhesive joint between the leg 16 and the body part 14 is not loaded with the lateral power due to the squeezing of the foam strip 10 because of the hinge type swinging open of the fixing means 100, since the hinge spans the corresponding bending radius on the foam strip 10. Thus, the adhesive joint between the leg 16 and the car body part 14 does not peel off but is permanently assured. FIGS. 3A and 3B illustrate the same process as FIGS. 2a and 2B, however with another embodiment of the foam strip 10. For this embodiment, the foam strip 10' is approximately rectangular. A represented second embodiment of the applicator 400 is appropriately adapted with its rail 78 of the receptacle 72. As may be seen in FIG. 3B, t he hinge type swinging open of the fixing means again assures that the adhesive joint between the leg 16 and the car body part 14 is, as far as possible, free from the lateral power on the foam strip 10 '.

Moreover, the applicator 400 has a second stopper 84, adjustable over a screw 88, and an elastic rubber profile 76 at the lower end in FIG. 3A of the first stopper 82. This rubber profile 76 secures the foam strip 10' in the applicator 400, since a corresponding design of the rail 78 and of the foam strip 10, like in FIG. 2A, is missing. Moreover, the rubber profile 76 supports the realization of the adhesive joint between the leg 16 and the car body part 14, since it bends off when pressing or exerting a pressure against the foam profile 10', as shown with the dotted lines in FIG. 8.

Figure 4:
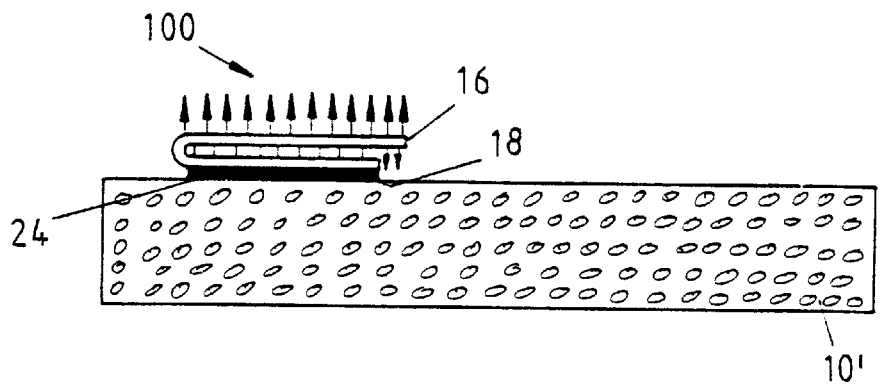
FIGS. 4 and 5 show sectional views of a foam strip with the fixing means according to FIG. 1.
Figure 5:
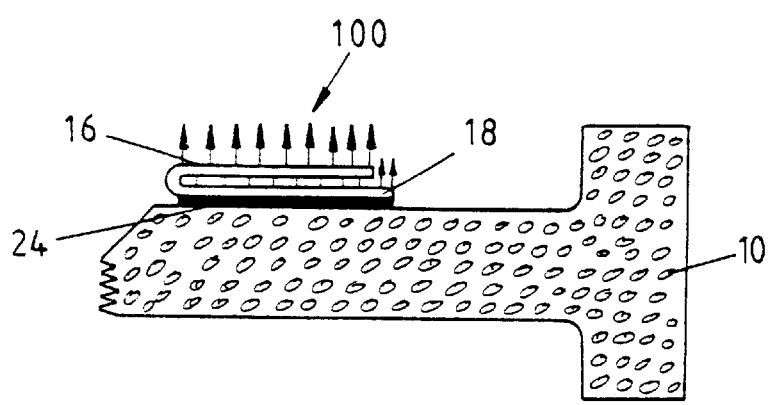

FIGS. 4 and 5 illustrate a preferred improvement of the fixing means 100 of FIG. 1. A nondetachable adhesive layer 24 is additionally placed between the leg 18 and the foam strip 10 or 10'. This adhesive layer is such that it is larger than the inherent strength of the foam strip 10 or 10' and of the fixing means 100. So, a safe and firm joint is made between the fixing means 100 and the foam strip 10 or 10'. T he fixing means also has a redetachable glue layer 30 and 32 with only slight adherence. This assures that the fixing means 100 does not swing open when placing the foam strip 10 in the gap 12, as represented in FIGS. 2A, 3A, but does swing open like a hinge after the foam strip 10 or 10' has been squeezed in the gap 12 or during it is being squeezed so as to derive lateral forces from the adhesive joint with the car body part 14 (FIGS. 2B and 3B).

Figure 6:
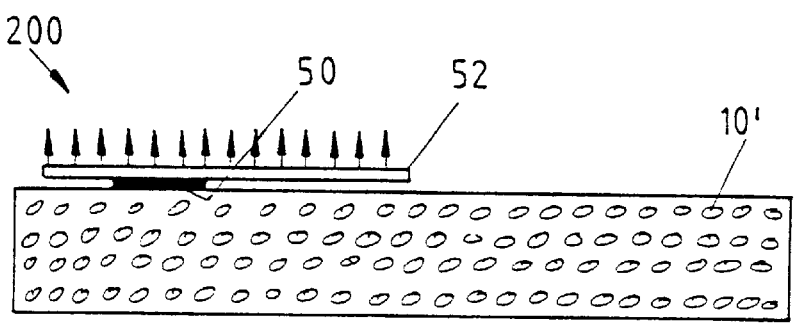
FIGS. 6 and 7 show sectional views of a foam strip with a fixing means according to the invention according to a second preferred embodiment.
Figure 7:
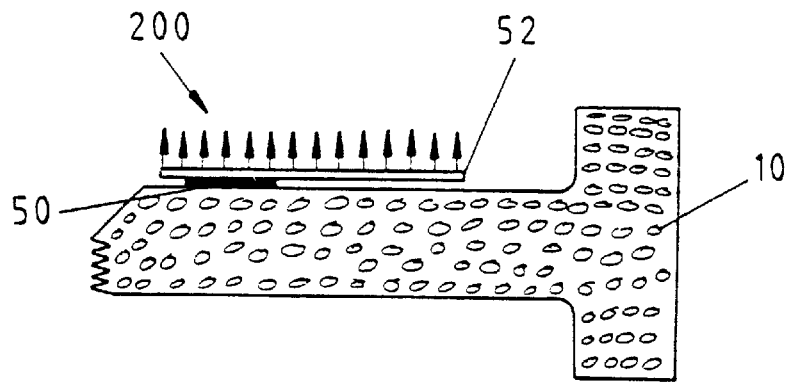

FIGS. 6 and 7 show a further preferred embodiment 200 of the fixing means according to the invention. This fixing means is carried out in two layers, namely with a first layer 50 and a second layer 52. The first layer 50 is a solid nondetachable glue 56 between the second layer 52 and the foam strip 10 or 10'. The first layer 50 constitutes an adhesive joint between the foam strip 10 or 10' and the second layer 52 which is greater than the respective inherent strength of these layers and assures in this way a solid bonding between the fixing means 200 and the foam strip 10 or 10'.

The second layer 52 is preferably a paper or a plastic strip and is sufficiently big dimensioned for a desired adhesive force. The FIGS. 6 and 7 or 4 and 5 only differ from each other by different embodiments of the profile of the plastic strip 10 or 10'. Once a rectangular profile is represented, once a T-shaped profile; however, any other profile, adequate for sealing the gap 12, is also possible or may be used.

Figure 8:
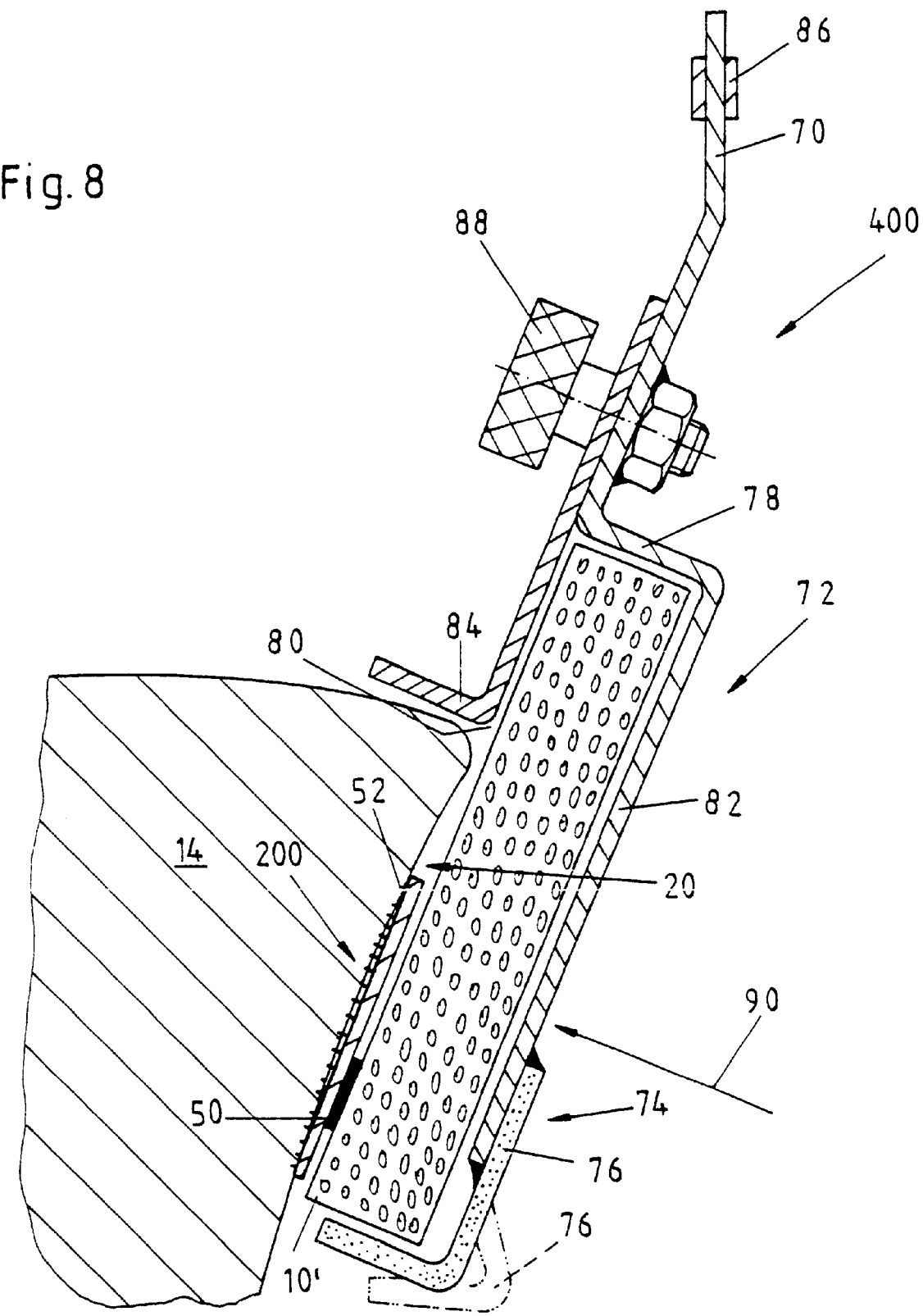
FIGS. 8 and 9 show views similar to FIGS. 3A and 3B, however with the embodiment of the fixing means of FIGS. 6 and 7.
Figure 9:
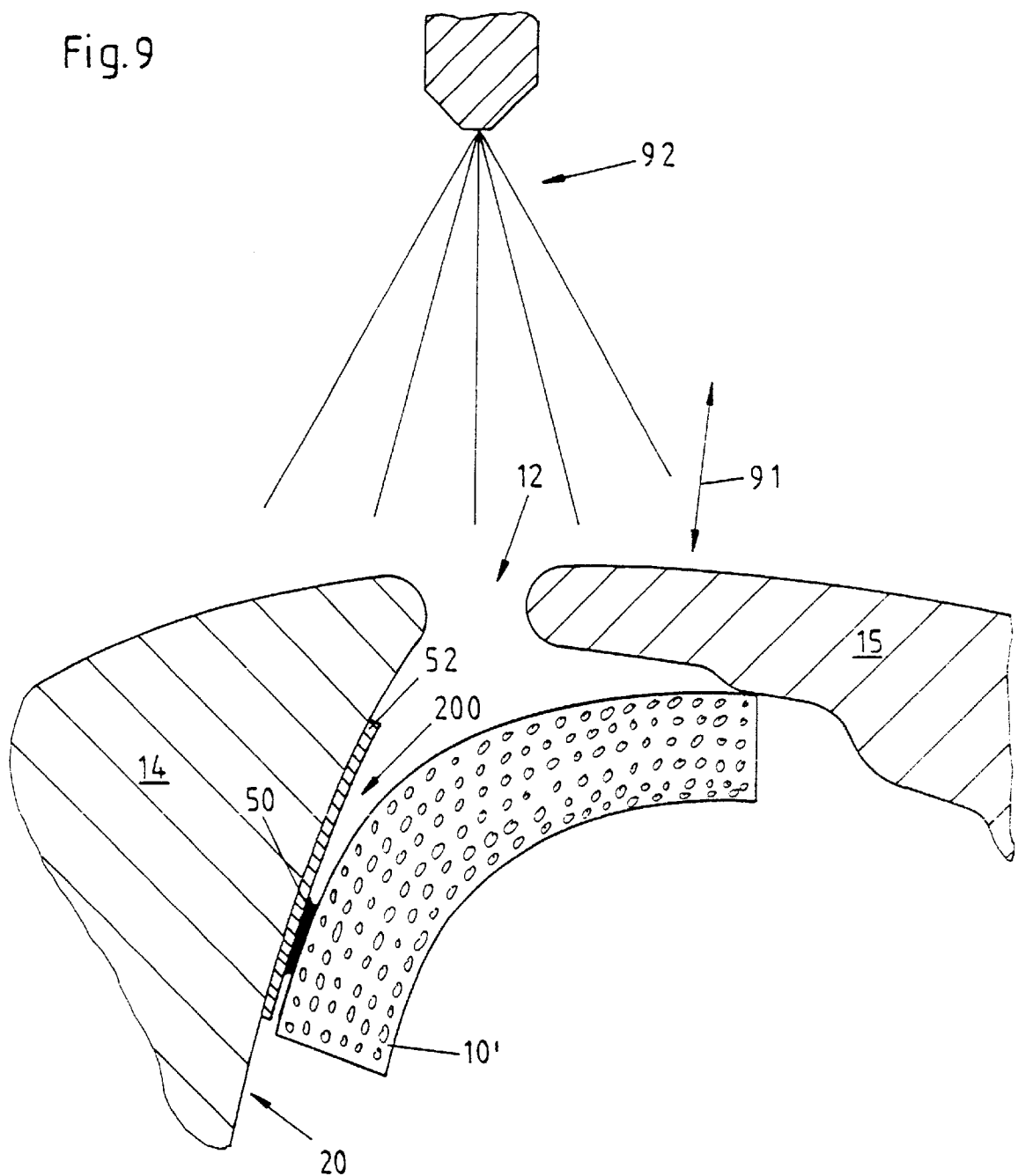

FIGS. 8 and 9 illustrate the setting in of a rectangular foam strip 10' with a fixing means 200 according to the embodiment represented in FIGS. 6 and 7. As for the rest, these representations are similar to FIGS. 3A and 3B. An adhesive joint between the car body part 14 and the paper strip 52 is obtained by pressing the foam strip 10' with the applicator 400 in direction of the arrow 90. The elastic rubber profile 76 supports this operation in bending away (dotted lines).

As represented in FIG. 9, the car body part 15 is movable in the direction of the arrow 91 and squeezes the foam strip 10' in the gap 12 when closing so that a sealing of the gap 12 is achieved by the foam strip 10'. As may be seen on the illustration, no lateral power from the squeezed foam strip 10' loads on the whole surface of the adhesive joint between the car body part 14 and the strip 52. Thereby, a peeling off of this adhesive joint is efficiently avoided and a permanent and reliable adherence is guaranteed.

Then an enamelling operation, for example with an enamelling spray with compressed air 92, may be carried out. The foam sealing strip keeps a position, for example, in a heat cabin of a car body painter in two cycles at approximately 80 degrees centigrade for respectively 30 minutes without working loose.

As it further results from FIGS. 2A, 3A and 8, the applicator has an antiadhesive coating 86 on its handle 70. This coating serves to redetach the adhesive joint between the car body part 14 and the fixing means 100 or 200.

The foam strip 10 or 10' preferably is an elastic open-cell polyurethane foam.

For the joint between the foam strip 10 or 10' and the leg 18 in FIG. and 5 or the second layer 52 in FIGS. 6 and 7, preferably a sewing up with a thread is also possible.

Figure 10:
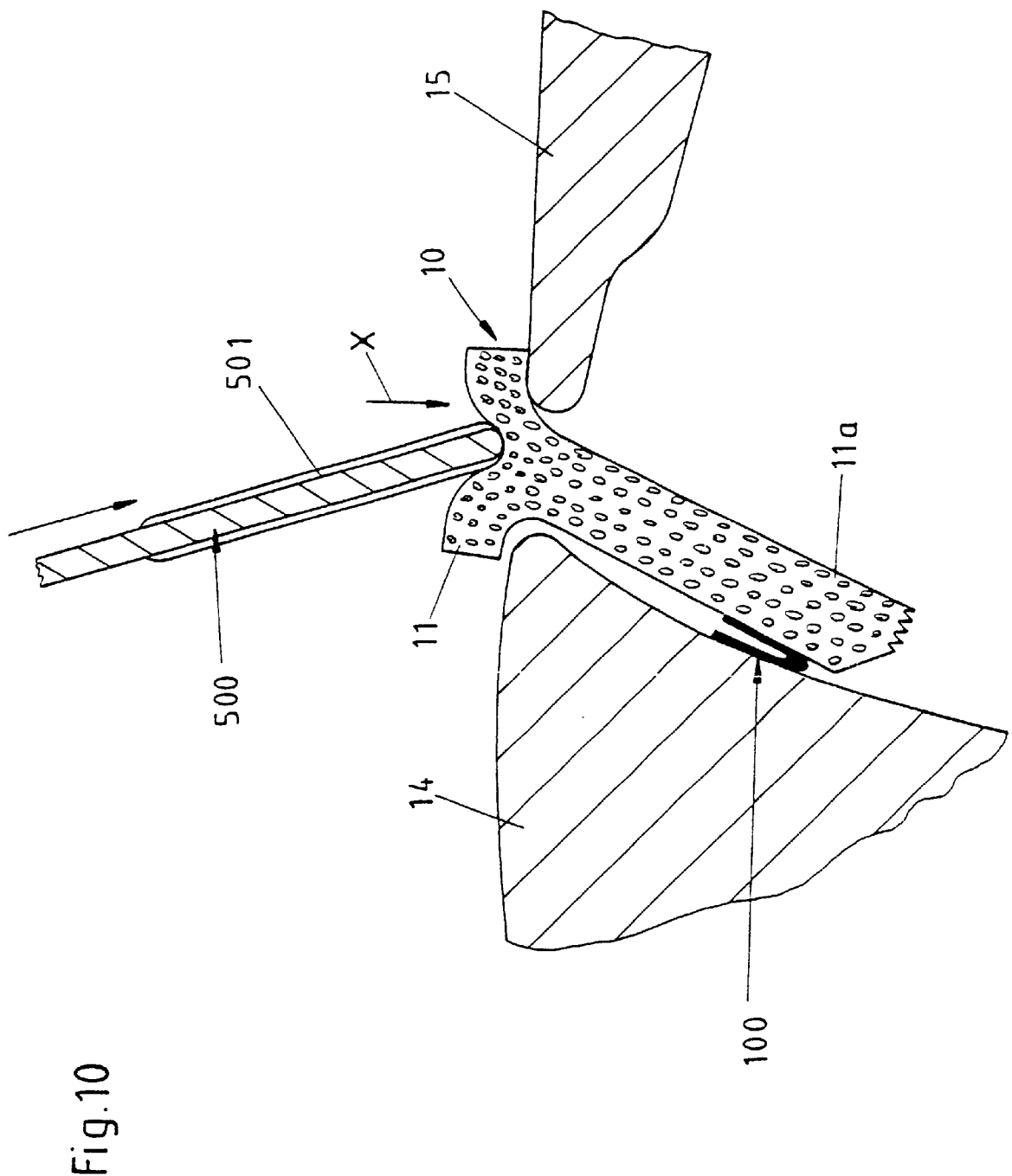
FIG. 10 shows a sectional view of a gap to be sealed between two car body parts during the action of inserting a T-shaped foam strip into the gap by means of an applicator.

FIG. 1 illustrates a simple handle and the easy inserting of a T-shaped foam strip 10 into the gap between two car body parts 14, 15, whereby the foam strip 10 has the configuration represented in FIG. 1 and described above. The foam strip 10 is pushed into the gap with its longer leg 10a, until the laterally protruding legs of the head shaped upper foam strip sections lie on or rest on both car body parts 14, 15. By means of an applicator 500 in form of a spattle which is provided on the outer side with an antiadhesive coating 501, preferably made of an appropriate plastic, the foam strip 10 is pressed into the gap by exerting a pressure in direction of the arrow x, until it takes the position shown in FIG. 10 and adheres to the car body part 14 by means of the fixing means 100.

Figure 11:
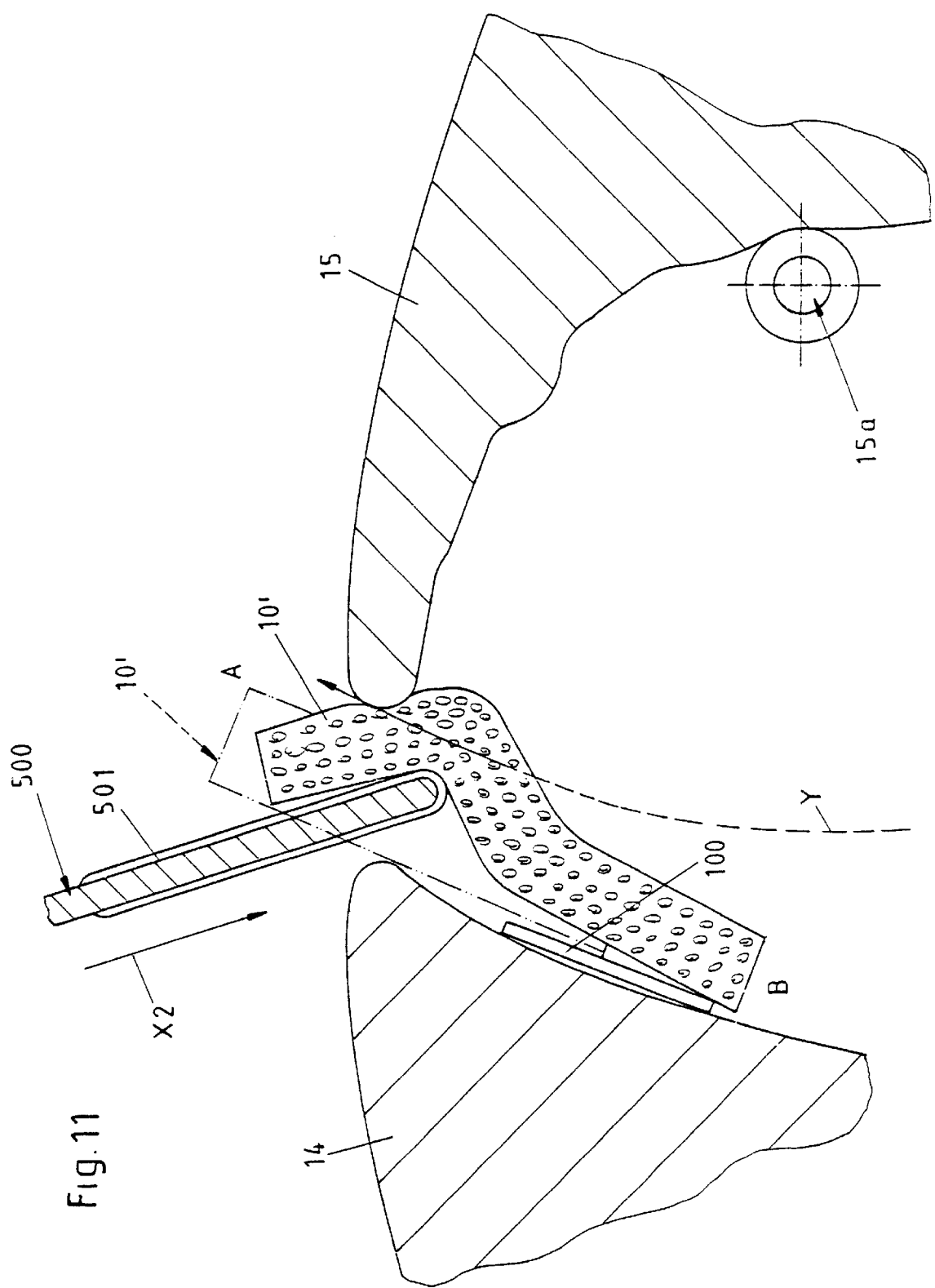
FIG. 11 shows a sectional view of a gap to be sealed between a fixed and a movable car body part during the action of inserting an approximately rectangular foam strip into the gap by means of an applicator.
Figure 12:
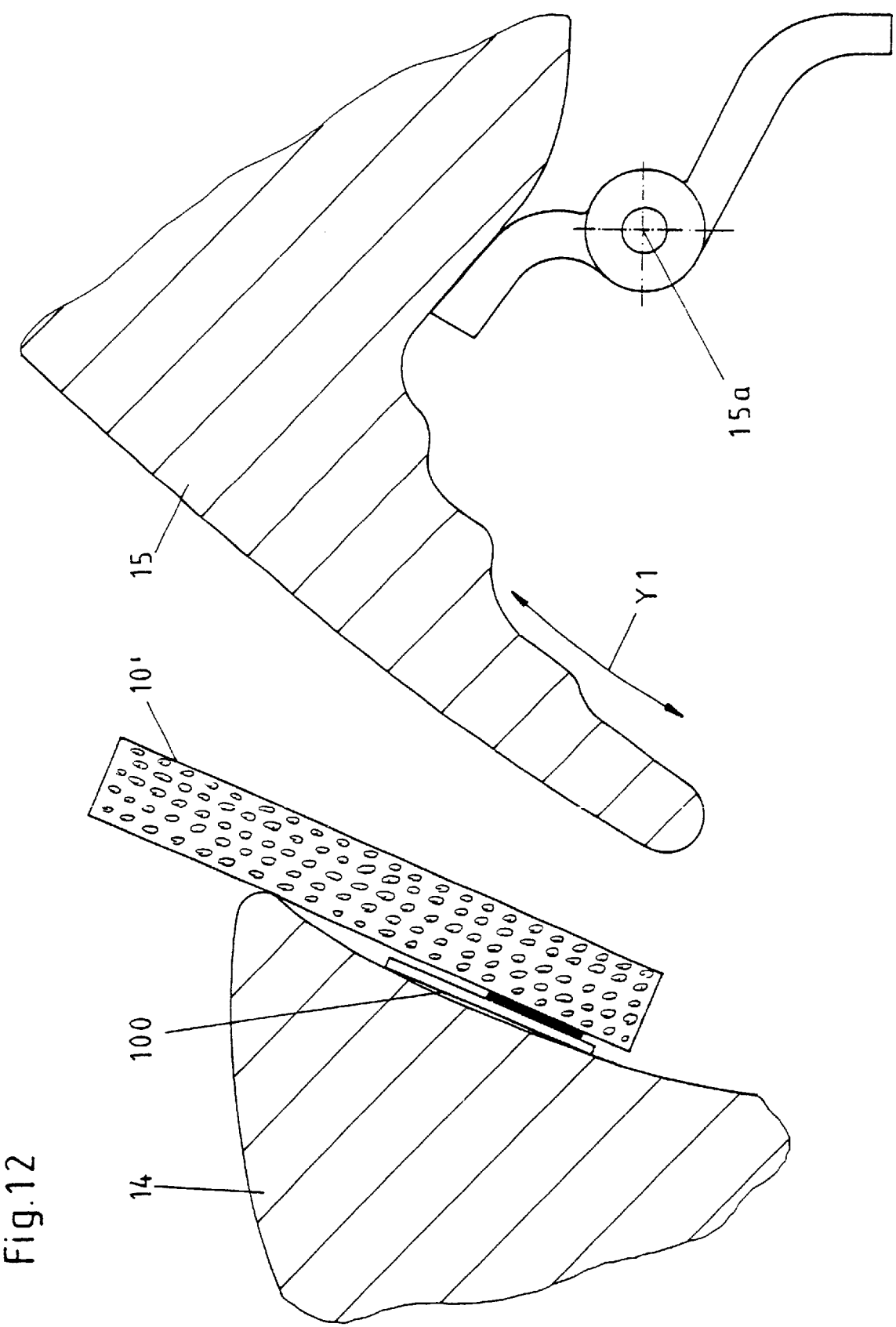
FIG. 12 shows a sectional view of a narrow gap to be sealed between a fixed and a movable car body part (vehicle rear flap) with an approximately rectangular foam strip fixed to the fixed car body part for a maximal gap width.

The sealing of a gap between a fixed car body part 14 and a movable car body part 15, for example a door of a vehicle, with an approximately rectangular foam strip 10' is also carried out by means of the applicator 500 which will be pressed, after having introduced the foam strip 10' into the gap (position A) by means of the applicator 500, by exerting a pressure in direction of the arrow x2 against the movable car body part 15, which is taking the position shown in FIG. 11, in such a way that the fixing means 100 is pressed against the fixed car body part 14 and so that the gap sealing is achieved (position B). The movement contour of the movable car body part 15 is indicated by y so as to demontrate that only a small gap is available for fitting and inserting the foam strip. This is also the case for car body constructions for which the movable car body part 15 (door) turns inward in the front end, which is also the case for the back rear flap (upper area) of a vehicle, since the swivelling hinge 15a of a few vehicle types lays covered inside (FIG. 2). Here, the swivelling movement takes place in direction of the arrow y1. The narrow space is such that a manual sticking of the foam strip 10, 10' is not possible but is only possible by using an applicator.

Figure 13:
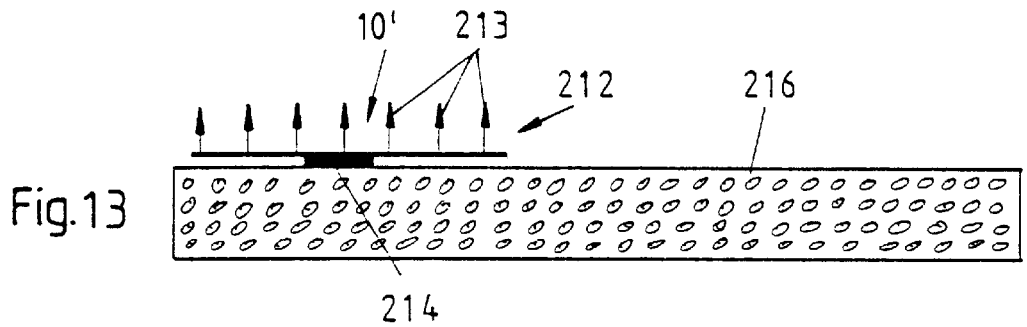
FIG. 13 shows a sectional view of a further embodiment of a plastic profile with a fixing means.

FIG. 13 shows a plastic profile with a fixing means 10'. The fixing means has a paper adhesive strip 10' with a detachable adhesive side 212 and a nondetachable adhesive joint 214 between the paper adhesive strip 10' and a plastic profile 216. The detachable adhesive side 212 is indicated in all figures by arrows 213. The nondetachable adhesive joint 214 is preferably designed in such a way that a removal is not possible without destroying the foam or the paper strip.

FIG. 14 shows in a first preferred embodiment a plastic profile 216 with a fixing means 1100. The fixing means 1100 is a paper adhesive strip which has folded ends 218. These folded ends 218 constitute corresponding prominences which protrude over the adhesive side 212 and which prevent an unintended premature contact with a surface and thus an unintended premature adhering of the adhesive side 212 on a surface.

Figure 15:
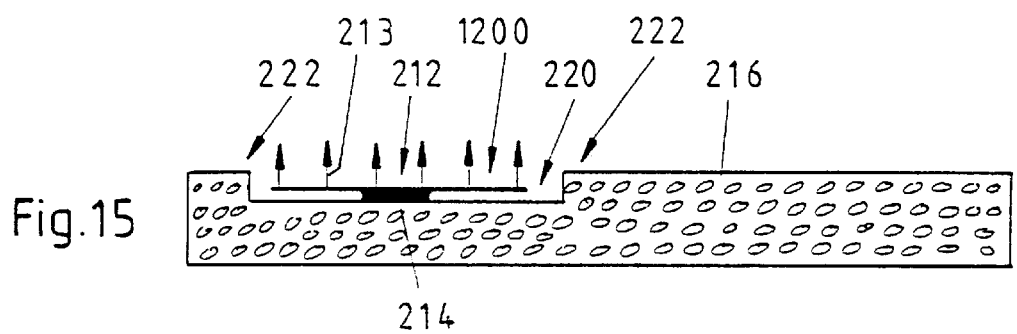

FIG. 15 shows another embodiment of a fixing means 1200 for a plastic profile. Hereby, the fixing means 1200 is designed as a paper adhesive strip like in FIGS. 13 and 14 and is placed in a sunk joint 220 of the plastic profile 216. The border areas 222 of the joint 220 constitute prominences protruding over the adhesive side 212. These prominences avoid an unintended premature contact with a surface and thus an unintended premature adhering of the adhesive side 212 on a surface.

Figure 16A:
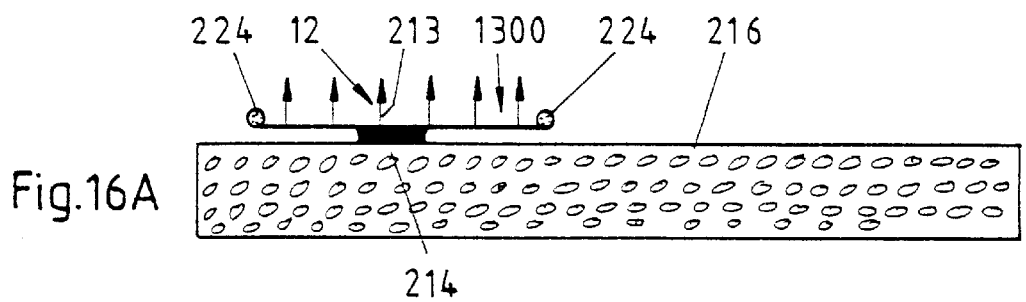

FIG. 16A shows an embodiment of a fixing means 1300 for a plastic profile. Paddings 224, which work as the prominences described above, are placed as prominences laterally on the paper adhesive strip.

Figure 16B:
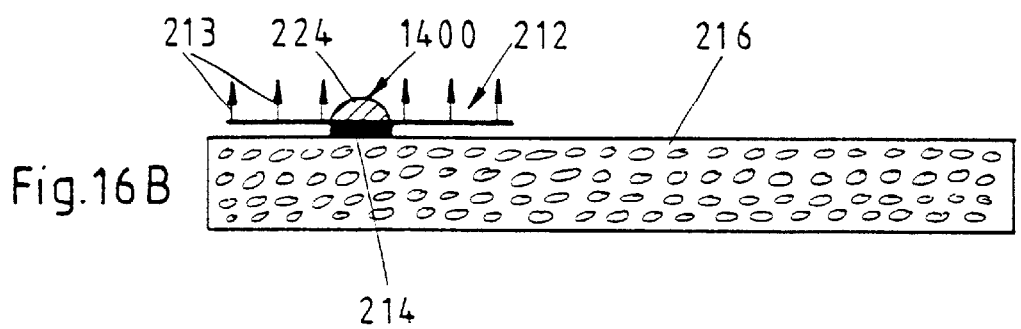

FIG. 16B shows another embodiment of a fixing means 1400. This substantially corresponds to that of FIG. 16A; however, only one padding 224 is placed as a distance piece in the middle of the paper adhesive strip.

FIG. 17 shows an embodiment of a fixing means 1500. This stands out by the fact that the constructions of the prominences according to FIGS. 14 and 15 are combined together, i.e. there are prominences as laterally folded ends 218 as well as border areas 222 of a joint 220.

FIGS. 18 to 28 show different embodiments of the plastic profile 216 combined with different embodiments of the fixing means according to FIGS. 14 to 17. The plastic profiles especially have a T-profile, a circular profile, a trapezoidal profile, a triangular profile, a polygonal profile, a hexagonal profile, a Y-profile or a rectangular profile.

The embodiment 1200 according to FIG. 15 is particularly preferred, since here the fixing means additionaly has a protective function against enamel and its solvents through the sunk joint 220. This is due to the fact that, after the fixing means has adhered to a surface, the lateral borders 222 additionally seal the area of the surface around the adhesive side outwards and thus avoid the penetration of distributed enamel or its solvents. This is represented in FIGS. 31 and 32 for a better illustration.

Because of the spacing through the prominences between the plastic profile and a surface on which the plastic profile adheres, only a tilting over of the prominence first takes place in case of lateral forces acting onto the plastic profile without any additional peeling stress of the adhesive surface. This is illustrated more precisely in FIG. 30 by means of the embodiment 1400 according to FIG. 16B. In the state represented in FIG. 30, the plastic profile 216 is squeezed between two car body parts 226 and 228, and a bending load is acting onto the plastic profile 216. This bending load sweeps around the padding 224 which acts like a pivot and so avoids peeling stresses which would act on to the adhesive side 212 and the adhesive joint between the car body part 226 and the paper adhesive strip.

Therefore, the construction is designed in such a way that a so-called peeling effect does not take place with these plastic profiles. Therewith, a sufficient permanency on the ground is achieved even with a double heating of the car body to 80° degrees centigrade for respectively 20 minutes.

Figure 20:
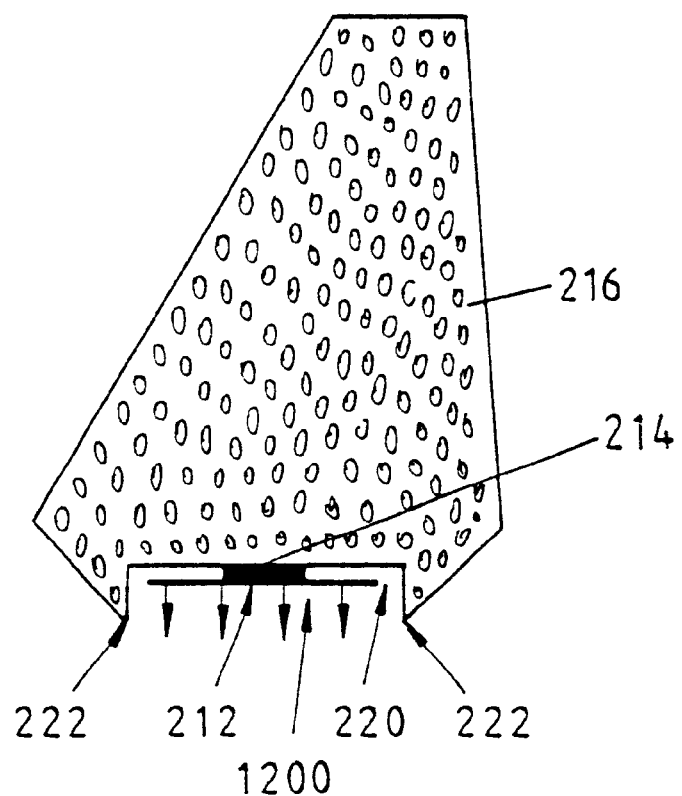
Figure 21:
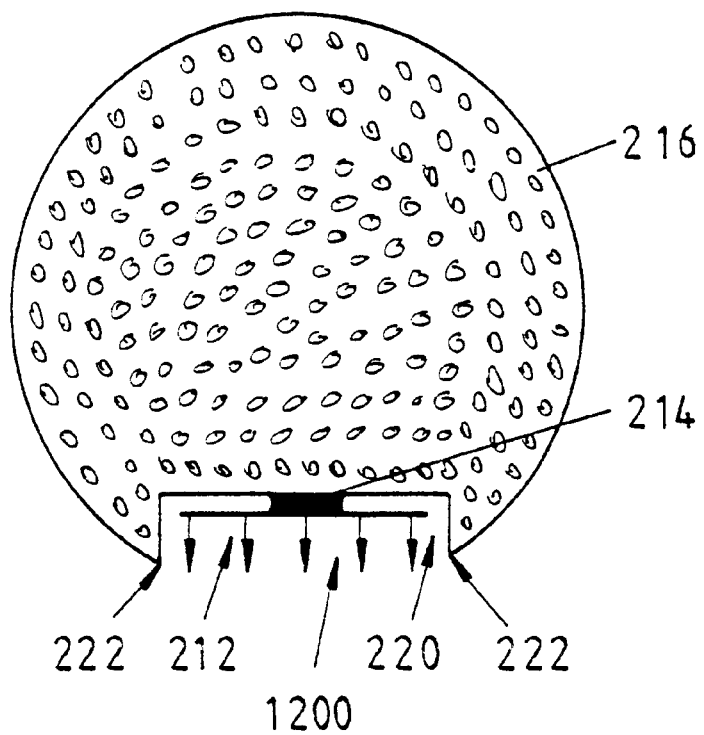
Figure 22:
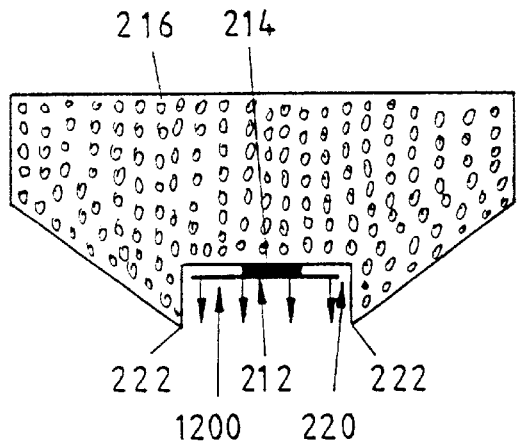
Figure 23:
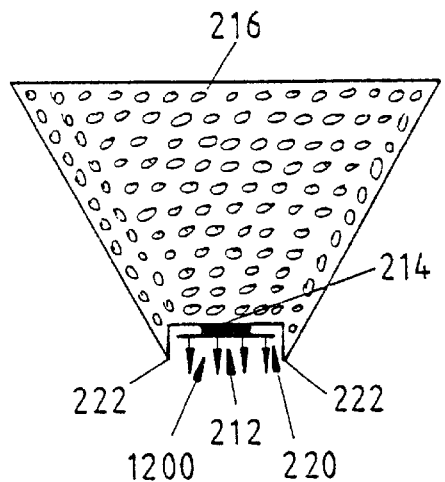
Figure 24:
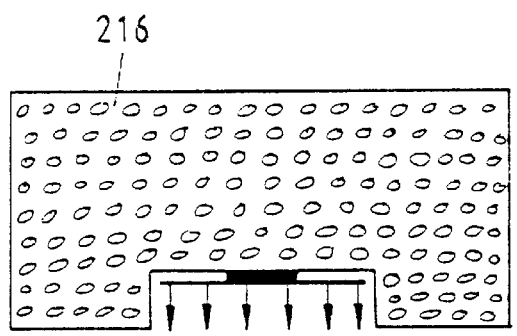
Figure 25:
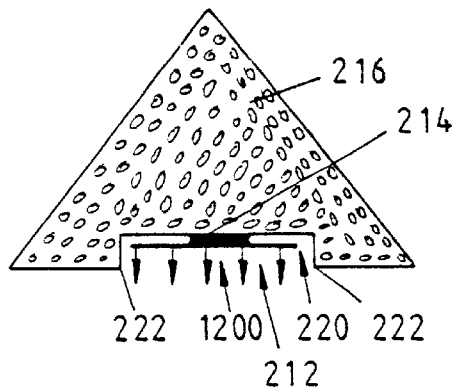
Figure 26:
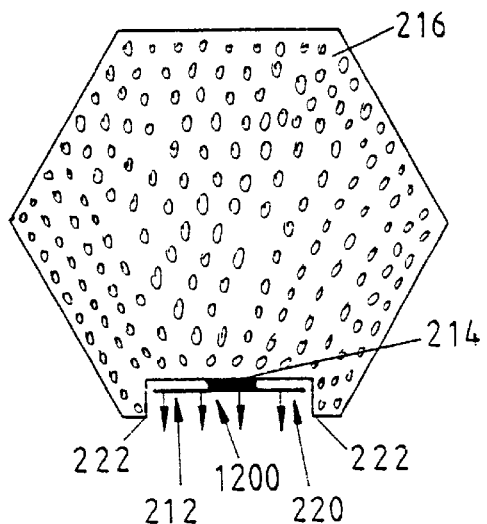
Figure 27:
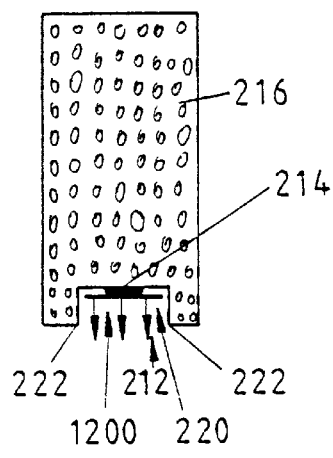
Figure 29:
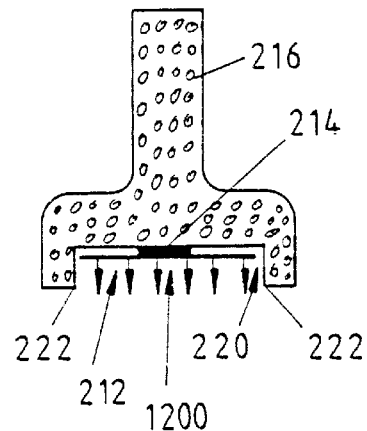
Figure 28:
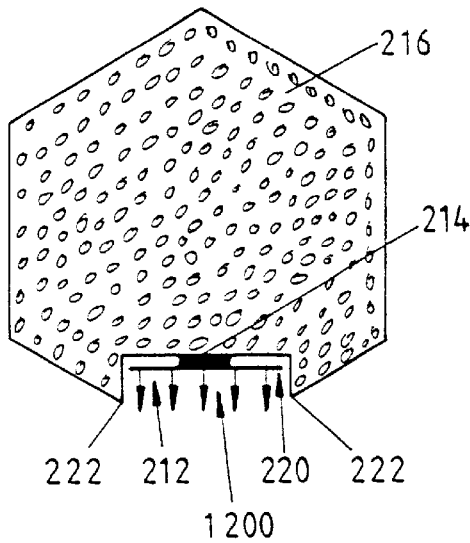

FIGS. 31 and 32 further illustrate a taking up of power by the prominence for a lateral load impact according to the arrows 230 for an embodiment of the fixing means 1200 according to FIG. 15, whereby the profiles are respectively designed according to FIGS. 20 and 21. The power exercised by the car body part 226 in direction of the arrow 230 onto the plastic profile 216 is taken up by the border area 222 which is respectively situated on the right side in FIGS. 31 and 32 by the fact that this border is getting compressed. Simultaneously, the profile turns slightly around the fixed adhesive joint 214. In this way, the adhesive joint 212 between the paper adhesive strip and the car body part 228 remains free from peeling stresses. and the detachable adhesive joint 212 which can be, for example, Tesakrepp (commercial name) has an improved adhesive strength, even if the plastic profile 216 is squeezed for sealing a gap.

When positioning the plastic strip 216 in a gap to be sealed, this plastic strip is also simply laterally movable, also due to the prominence on or adjacent to the adhesive side 212, without any risk that the adhesive side adheres too early. If, however, an adhesive joint with a car body part 226, 228 is to be made, after the final position of the plastic profile in a gap to be sealed has been reached, a force has to be exerted onto the plastic strip so that at least one of the prominences gets compressed and allows for a contact between a surface and the adhesive layer 212.

FIG. 33 shows a plastic profile 350 with a sunk joint 316 with border areas 318 and a paper adhesive strip 310 which is connected with a nondetachable adhesive joint 312 to the plastic profile 350. An adhesive layer 314 for a detachable adhesive joint with a surface is provided for on one side of the paper strip 310 opposite to the nondetachable adhesive joint 312.

The plastic profile 350 has a substantially trapezoidal section and tear-off edges 324 can be seen lateraly. Several plastic profiles 350 were previously connected to each other on these tear-off edges 324, whereby the plastic profiles are delivered arranged in such rows for further processing (FIG. 33).

FIG. 34A shows the plastic profile 350 of FIG. 33 with another profile section, namely with a round section.

As may be seen in FIGS. 33 and 34A, border areas 318 protrude over the adhesive layer 314. By bringing a plastic profile 350 with its end provided with the adhesive layer 314 nearer to a surface, first this border area 318 comes into contact with the surface and prevents an adhering of the adhesive layer 314 onto the surface. The plastic profile 350 can be simply and easily moved to a desired position without the adhering of the adhesive layer 314 on the surface impeding this action or even preventing it.

If an adhesive joint is to be made between the adhesive layer 314 and the surface, the resistance of the border areas 318 has to be overcome merely by means of an appropriate power influence onto the plastic profile so that these border areas are compressed and allow for a contact of the adhesive layer 314 with the surface. This state is represented in FIG. 34B. An adhesive joint between the paper adhesive strip 310 and a car body part 320 is realized at the ends 326 and 327.

Because of their elasticity, the border areas 318 have substantially recovered their original shape and constitute, as a peripheral border area 318, a sealed space 316. This now protects the paper adhesive strip 310 against outer influences, like for example enamels and their solvents, which would impair the adhesive strength between the paper strip 310 and the car body part 320.

FIGS. 35, 36A and 36B show representations respectively corresponding to FIGS. 33, 34A and 34B of a second preferred embodiment of a plastic profile 450. This embodiment substantially corresponds to the embodiment 350 and for the detailed description, reference is made to the above statements about FIGS. 33, 34A and 34B. The essential difference consists in the fact that no paper adhesive strip is used, but a glue 322 which is directly placed on the surface of the plastic profile 350.

This advantageously can have an adhesive coating 314 for a redetachable adhesive joint.

Because of the distance due to the raised border areas 318 between the plastic profile 350, 450 and a surface on which the plastic profile 350, 450 adheres, in case of lateral power onto the plastic profile, only a swivelling through squeezing of one part of the border area 318 first takes place without any additional peeling stress of the adhesive surface 314.

Therefore, the construction is such designed that a so-called peeling effect does not take place with these plastic profiles. Therewith, a sufficient permanency on the ground is achieved even with a double heating of the car body to 80° degrees centigrade for respectively 20 minutes.

FIG. 37 shows a first preferred embodiment of a plastic profile 550. The profile has a rectangular section and a recess 510 in the form of a right parallelepiped as well as two cuneiform recesses 512. The oblique side walls 514 of the cuneiform recesses 512 enclose for example an angle of 30 degrees. The depth of the cuneiform recesses 512 is mainly approximately 2,5 mm and the depth of the recess 510 in the form of a right parallelepiped is approximately 1,5 mm, whereby the profile is approximately 4 cm thick. The cuneiform recesses 512 are placed near to the lateral ends of the plastic profile 550 and the recess 510 in the form of a right parallelepiped is arranged asymetrically adjacent to an end, whereby however one of the cuneiform recesses 512 is arranged between the end and the recess in the form of a right parallelepiped.

In the representation of FIG. 37, a paper adhesive strip 516 is placed in the recess 510 in the form of a right parallelepiped. This paper adhesive strip has a firm adhesive joint 518 between the paper adhesive strip 516 and the plastic profile 550 as well as an adhesive coating 520 for a detachable adhesive joint with a surface. The firm adhesive joint has, for example, a width of 3 mm and the paper adhesive strip protrudes 1 m over this firm adhesive joint on one side and 9 mm on the other side so that the paper adhesive strip 516 has a total length of 13 mm.

FIG. 38 shows an arrangement of plastic profiles 550 in a row. The plastic profiles 550 are delivered in this form for further processing and, if necessary, are torn off the one after the other at tear-off edges 528 (FIG. 37). The respective plastic profiles 550 have, for example, a length of approximately 30 mm. For example, twelve strips 350 of such plastic profiles are arranged in a row with dimensions of 30 mm×4 mm each.

FIG. 39 shows another embodiment of a plastic profile 550. This profile is substantially trapezoidal with tear-off edges 528 and a recess 510 in the form of a right parallelepiped. FIG. 40 shows, similarly to the representation of FIG. 38, an arrangement of plastic profiles 550 according to FIG. 39 in a row. For example, twenty-one or twenty-five strips 550 of such plastic profiles with a width of 17 mm each or 14,28 mm are arranged in a row.

FIG. 41 shows a preferred further development of the embodiment 550 of FIG. 39, whereby a paper adhesive strip 516 is placed in the recess 510 in the form of a right parallelepiped. For the description of the paper adhesive strip 516, reference is made to the corresponding statements about FIG. 34.

FIG. 42 shows, in a schematic representation, the use of a plastic strip 550 according to FIG. 37 for sealing a gap 522 between a rear flap 524 of a vehicle and a car body part 526. The rear flap 524 is movable and is represented in closed position. Dotted lines 530 indicate the position "open" of the rear flap. The plastic strip 550 is placed in the gap 522 and is connected by means of a paper adhesive strip 516 to the car body part 526. Dotted lines 532 indicate the position of the sealing strip 550 after adhering to the car body part 526.

For sealing a gap, the plastic strip 550, 550' is pressed into the gap 522 and comes to rest in the position represented in FIG. 42 under bending stress. In this position, the gap 522 is sealed to outside.

As may be seen in FIG. 42, the sealing strip 550 is subject to a bending load, but not the paper strip 516. Due to the narrow adhesive joint 518 between the paper adhesive strip 516 and the plastic profile 550, the paper adhesive strip remains in the upright position. Thus, the adhesive joint 220 between the paper adhesive strip 516 and the car body part 526 is not exposed to any peeling stress.

During the insertion of the plastic profile 550 into the gap 522, the sunk arrangement of the paper adhesive strip 516 in the recess 510 prevents a premature adhering of the adhesive layer 520 to the car body part 526. In the end position of the plastic profile 550 in the gap 522, to realize an adhesive joint between the paper adhesive strip 516 and the car body part 526, the at least partially squeezes or compresses the border of the recess 510 so that a contact is possible between the adhesive coating 520 and the car body part 526.

The plastic profile preferably has the embodiments represented in the drawings.

FIG. 43 shows an embodiment of a plastic strip 2100. This plastic strip has a rectangular foam profile 616 and a paper adhesive strip 610 with the foam profile 616 and a second adhesive layer 614 to realize a detachable adhesive joint with a surface. The second adhesive layer 614 is preferably covered with a silicone paper 618 for the protection against unintended premature adhering, for example during transport. The adhesive strip 610 substantially extends over the whole length of the foam profile 616. The adhesive joint 612 is only very short between the adhesive strip 10 and the foam profile 16 relative to the length of the adhesive strip 10. In this way, we obtain at least one long free end 620 which can be used for covering gap surroundings as described below.

FIG. 44 shows a further embodiment of a plastic profile 2200. This plastic profile substantially corresponds to the embodiment of FIG. 43, whereby however the free end 620 is prolongated so as to project over the dimensions of the foam profile 616.

FIG. 45 shows an embodiment of a further plastic profile 2300. This plastic profile substantially corresponds to the second embodiment of FIG. 44, whereby however a second adhesive strip 622 is additionally placed at the protruding end 620 of the first adhesive strip. This second adhesive strip 622 has a second adhesive layer 614 which is orientated opposite to the first adhesive layer 614. This second adhesive layer 624 can also be covered with a silicone paper 618 with corresponding dimensions for transport and processing.

The function mode of the plastic profile for gap sealing is schematically represented in FIG. 46 by means of the embodiment 1300 of FIG. 45. The sealing strip or the plastic profile 2300 is inserted into a gap 626 to be sealed and is fixed with the adhesive layer 614 to the car body part 628.

The opposite end 632 of the foam profile 616 is bent off so that the plastic profile tightly seals the gap 626. The position of the foam profile 616 before the end 632 is bent off is indicated by dotted lines.

Through the only narrow adhesive joint 612 between the foam profile 616 and the adhesive strip 610, the adhesive strip substantially remains in the upright position and the end 620 with the second adhesive strip 622 protrudes from the gap 626. In a further processing step, this projecting end 610, 612 is bent off in the opposite direction like the end 632 of the foam profile 616 so that it rests on the surface of the car body part 628. In this position, the strips 610 and 622 cover an area of the car body part outside the gap 626. A further covering is now achieved by means of a covering foil, a paper or another appropriate covering means 634.

By bending down of the projecting end 619, 622 in direction of the arrow 636, the second adhesive layer 624 now rests, upward orientated, on the car body part 628 so that an adhesive joint between the covering means 634 and the adhesive strip 622 is achieved by laying the covering means 634 onto the second adhesive strip 622. The covering runs seamless from the outer surface of the car body part 628 into the gap 626.

Thus, the plastic strip stands out for the fact that it covers, already after being fixed, a partial surface of a car body or of a part to be covered so that the remaining surface can then be covered in a simple way without much expenditure of work.

Such a combination strip brings a considerable work simplification for the user. The plastic profile as such is always bent off to the one side and leads to a total sealing of the gap 626, whereas the paper adhesive strip 610 is bent towards the other side and thus already covers approximately 1 cm or more of the surface to be covered outside the gap 626.

The joint between the foam and the paper adhesive strip is preferably made by a glue, for example a hot-melt glue, which realizes a solid bonding with the foam and the back side of the adhesive strip. Preferably, a glue is used, the strength of which is higher than the inherent strength of the foam.

The FIGS. 47 to 72 illustrate further examples of application of a plastic profile 2100, 2200 or 2300 in a gap 626 respectively between a door 630 and a car body part 628 or between other car body parts 628. In the FIGS. 47 to 53, the sealing strip is used the other way round than in FIGS. 54 to 60. The same applies to FIGS. 61 to 66 relative to FIGS. 67 to 72. Corresponding arrows 640 respectively indicate the movability of car body parts 628, 630 or 638.

In FIG. 70, 701 additionally indicates the state of the plastic profile 2200 after the first step, namely after insertion. Reference numeral 702 indicates the state of the plastic profile 2200 after step two, i.e. after having pressed the plastic profile 2200 into the gap 626. In FIGS. 47 to 69 and 71 and 72, these corresponding states are also illustrated without being additionally provided with reference numerals.

FIGS. 73 to 75 illustrate different mounting alternatives of a plastic profile 220 or 2400 for different enamelling situations.

In FIG. 73, an enamelling situation is represented for which an area 646 of the car body part 628 has to be reenamelled, while the door 630 is appropriately covered with a foil or a paper 634. During the mounting of the plastic profile 2200, this profile is first pushed into position A and is, for example, adhesively connected with the door 630. Then, the adhesive strip 610 is bent off according to the arrow 636 so that its adhesive layer 614 rests on the covering means 634 and adheres to it. Finally, the foam profile 616 is pushed into position B into the gap 626. Now, the door 630 and the gap 626 are sufficiently protected against enamel and the corresponding car body part 628 can be reenamelled.

FIG. 74 shows a situation similar to FIG. 73; however, here the car body part 628 has to be covered and the door 30 reenamelled. The plastic profile 2200 is pushed into the gap 626 into positions A and B the other way round relative to the explanations above referring to FIG. 73 so that the car body part 628 and the gap 626 are protected against the enamel to be applied. This shows the particular advantage of the plastic profile, namely regardless of the area which has to be reenamelled besides the gap, consisting in the fact that always identical shapes of plastic strips can be used, whereby only the orientation of the plastic profile in the gap has to be correspondingly selected.

FIG. 75 shows an example of a silicone strip 618 which has holes 642 at predetermined spaces, for example 100 mm to 2200 mm. Row-type arrangements of plastic profiles 2100, 2200, 2300, 2400 or 2500 can be rolled up by means of these holes, whereby a slight adhering is possible in the rolls over the holes 642 so that the rolls remain steadily rolled up, until they become unrolled by a corresponding manual power influence.

FIG. 76 shows an enamelling situation for a partial enamelling similar to FIG. 74, i.e. the car body is covered and the door 630 has to be enamelled in the area 646. A further advantageous embodiment of a plastic profile 2500 is represented. This plastic profile has the shape of a prismoid or has a trapezoidal section. The adhesive strip 610 can also be lined on.

FIG. 76A shows an embodiment with a plastic profile 400 which has the shape of a strip. The adhesive strip is placed in a recess 44 of the plastic profile. This embodiment is particularly suitable for all-body enamelling operations.

Therefore, the following process course for the fixing of a plastic profile in a gap to be sealed results as a summing-up from the description above and particularly from FIG. 85.

The foam flat strip is applied onto the car body in such a way that the creped paper, joined to the flat strip, protrudes outwardly vertically with approximately 10 mm.

Then, the further covering means 634, for example a polyethylene foil or a covering paper, is applied onto the car body 628 so that the end of this foil vertically abuts against the protruding crepe paper. This crepe paper is then bent off and adheres to the foil 634. In this way, in one operation the foam strip 616 is applied as well as the corresponding side is completely covered so as to prevent the impact of enamel mist. The foam strip 616 is then pressed into the joint 626 so that the gap is completely sealed.

Figure 79:
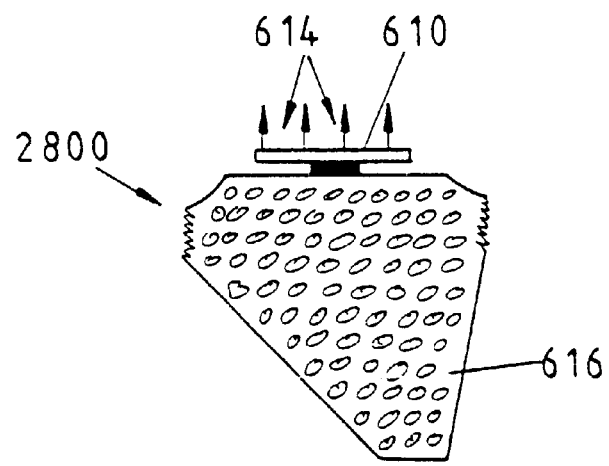
Figure 80:
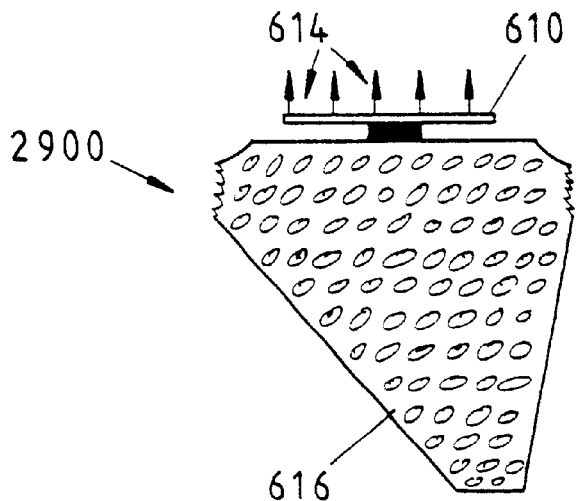

FIGS. 77 to 80 show further preferred embodiments of plastic profiles 2600, 2700, 2800 and 2900 with different sections, like a right parallelepiped shaped section (FIG. 77), a T-shaped section (FIG. 78) or a trapezoidal section (FIGS. 79 and 80). Two preferred embodiments for an applicator 1000 and 1100 are shown in FIGS. 81 to 83. A handle 652 is placed bent on a base plate 650. A guiding rail 654 which is substantially L-shaped is provided for on the base plate 650, whereby the long leg is approximately parallel and the short leg is approximately perpendicular to the base plate 650. An extension piece 656, on which the guiding rail 654 with the base plate 650 a further stopper 658 are designed, is provided for on the short leg. In the represented embodiment 1000 and 1100, the stopper 658, the guiding rail 654 and the extension piece 652 are formed in one piece out of a sheet metal by bending. However, the parts of the applicator can also be casted out of plastic.

Moreover, an additional stopper 660 is provided for on the base plate. This stopper is designed as a flexible part, as indicated in FIG. 83 by means of a dotted line. The additional stropper 660 is, for example, made of rubber. Moreover, a recess 662 is spared in the base plate, recess through which the fixing means 664 grip into the guiding rail 654 or in its extension piece. In this way, the guiding rail 654 is movable relative to the base plate 650. Hereby, the guiding rail is loaded with power by a spring 672, whereby the spring 672 is supported on an abutment 674 on the handle 652. The guiding rail 654 is movable against the spring power for example about 16 mm. In this way, by placing a plastic strip in a gap to be sealed 626, impediments can be overcome without having to set down the applicator 1000, 1100 from the gap. For this purpose, the guiding rail 654 can be easily moved back. Such projecting parts are, for example, parts of ridges or plastic reinforcements on the floor side. The moving back of the guiding rail 654 is carried out manually, whereby the spring 672 then automatically brings the guiding rail 654 back to its starting position.

Moreover, a stopper 666 is provided for in the guiding rail. Thus, the stopper 666, the guiding rail 654, the base plate 650 and the additional stopper 660 constitute a guiding for a plastic profile 668. The long leg of the L-shaped guiding rail 654 encompasses the plastic strip 668 for a safe guiding and so prevents the sliding out of the plastic profile 668.

The difference of the embodiments 1000 of FIGS. 81 and 82 to the embodiment 1100 of FIGS. 83 and 84 substantially consists in the configuration of the stopper 666. The stopper is once configured as an individual rib 666A (see. FIGS. 81 and 82) and once as a continuous L-shaped rail 666B.

A protruding part of the adhesive strip 610 is contained in the gap 670 between the guiding rail 654 and the stopper 666. With this applicator 1000 and 1100, it is possible to fix flat strips 668 with a laterally protruding portion on the side of the car body as well as on the side of the door.

For a nonadhesive guiding of the plastic strip 668 in the guiding rail 654, the guiding rail is provided on its surfaces turned to the plastic strip 668 with an antiadhesive coating 676. This is for example a metal strip which is sticked in with an antiadhesive coating.

What is claimed is:

1. A plastic profile in the form of a foam strip (10, 10') for sealing the air gap between two body parts (14, 15) of motor vehicles, wherein the plastic profile comprises a fixing means (100) for securing the plastic profile in the air gap, wherein the fixing means (100) is a strip comprising two legs (16, 18) which are hinged together and configured to be folded to a U-shape in a position of use of the fixing means, wherein the first leg (16) and the second leg (18) have an adhesive coating, respectively, on the same side of the strip, wherein the first leg (16) is connected to the foam strip (10, 10') with the first adhesive layer (17) and the second leg (18) is connected with the second adhesive layer (19) to a gap inner side (20) of the air gap.

2. A plastic profile according to claim 1, wherein an additional nondetachable adhesive joint (24) is placed between the fixing means (100) and the foam strip (10, 10').

3. A plastic profile according to claim 2, wherein the nondetachable adhesive joint (24) is stronger than the inherent strength of the foam strip (10, 10') and of the fixing means (100).

4. A plastic profile according to claim 1, wherein the foam strip (10, 10') has a rectangular profile, a L-shaped profile or a T-shaped profile.

5. A plastic profile according to claim 1, wherein sides (26, 28) of the legs (16, 18) of the fixing means (100) which are opposite to the first and to the second adhesive layer (17, 19), are respectively provided with a third and a fourth adhesive layer (30, 32).

6. A plastic profile according to claim 5, wherein the third and the fourth adhesive layer (30, 32) is configured redetachable or at least easier redetachable than the first and second adhesive layer (17, 19).

* * * * *